(12) United States Patent
Yamaoka et al.

(10) Patent No.: US 11,718,157 B2
(45) Date of Patent: Aug. 8, 2023

(54) AIR DISCHARGE DEVICE

(71) Applicant: DENSO CORPORATION, Kariya (JP)

(72) Inventors: Jun Yamaoka, Kariya (JP); Masaharu Sakai, Kariya (JP); Yasuhiko Niimi, Kariya (JP); Takahito Nakamura, Kariya (JP); Yusuke Komatsubara, Kariya (JP); Marie Nagahama, Kariya (JP); Yasuki Omori, Kariya (JP); Shogo Hayakawa, Kariya (JP); Satoshi Takotani, Kariya (JP); Yuuji Okamura, Kariya (JP); Tatsuya Yoshida, Kariya (JP)

(73) Assignee: DENSO CORPORATION, Kariya (JP)

( * ) Notice: Subject to any disclaimer, the term of this patent is extended or adjusted under 35 U.S.C. 154(b) by 358 days.

(21) Appl. No.: 17/065,267

(22) Filed: Oct. 7, 2020

(65) Prior Publication Data
US 2021/0016635 A1 Jan. 21, 2021

Related U.S. Application Data

(63) Continuation of application No. PCT/JP2019/014657, filed on Apr. 2, 2019.

(30) Foreign Application Priority Data

Apr. 11, 2018 (JP) .................................. 2018-076325
Oct. 23, 2018 (JP) .................................. 2018-199383
Dec. 25, 2018 (JP) .................................. 2018-240805

(51) Int. Cl.
*B60H 1/34* (2006.01)
*F24F 13/072* (2006.01)

(52) U.S. Cl.
CPC ......... *B60H 1/3407* (2013.01); *B60H 1/3457* (2013.01); *F24F 13/072* (2013.01)

(58) Field of Classification Search
CPC .... B60H 1/3407; B60H 1/3457; B60H 1/345; F24F 13/072; F24F 2013/0612; F24F 13/06
See application file for complete search history.

(56) References Cited

U.S. PATENT DOCUMENTS 10,065,475 B2 * 9/2018 Humburg ........... B60H 1/00457
11,370,275 B2 * 6/2022 Komatsubara ....... B60H 1/3457
2015/0300385 A1 10/2015 Akagi et al.

FOREIGN PATENT DOCUMENTS

CN 203823891 U 9/2014
JP S60256747 A 12/1985
(Continued)

*Primary Examiner* — Jessica Yuen
(74) *Attorney, Agent, or Firm* — Harness, Dickey & Pierce, P.L.C.

(57) ABSTRACT

An air discharge device is configured to discharge an air flow. The air discharge device includes a main hole for discharging an air flow as a working air flow, an auxiliary hole provided around the main hole to discharge a support air flow, and a vortex suppression structure configured to suppress development of vortices generated in a velocity boundary layer of the working air flow at a downstream side of an outlet of the main hole. This vortex suppression structure is configured to make a central portion of the thickness of the velocity boundary layer of the working air flow at the downstream side of the outlet of the main hole to be closer to a mainstream of the support air flow, at the downstream side of the outlet of the main hole.

3 Claims, 29 Drawing Sheets

(56) References Cited

FOREIGN PATENT DOCUMENTS

| | | |
|---|---|---|
| JP | H0573449 U | 10/1993 |
| JP | H08201216 A | 8/1996 |
| JP | H08210943 A | 8/1996 |
| JP | H08318176 A | 12/1996 |
| JP | H10122638 A | 5/1998 |
| JP | 2009034604 A | 2/2009 |
| WO | WO-2014017208 A1 | 1/2014 |

* cited by examiner

AIR DISCHARGE DEVICE

CROSS REFERENCE TO RELATED APPLICATIONS

The present application is a continuation application of International Patent Application No. PCT/JP2019/014657 filed on Apr. 2, 2019, which designated the U.S. and claims the benefit of priority from Japanese Patent Applications No. 2018-076325 filed on Apr. 11, 2018, Japanese patent application No. 2018-199383 filed on Oct. 23, 2018 and Japanese patent application No. 2018-240805 filed on Dec. 25, 2018, the entire contents of which are incorporated herein by reference.

TECHNICAL FIELD

The present disclosure relates to an air discharge device having an air discharge unit configured to discharge an air flow.

BACKGROUND

Conventionally, an air nozzle is known in which an auxiliary air outlet is provided around a main air outlet forming a main air flow, so as to form a support air flow that can prevent a suction of the air drawn into the main air flow.

SUMMARY

An object of the present disclosure is to provide an air discharge device capable of increasing a reaching distance of a working air flow discharged from a main hole.

According to an aspect of the present disclosure, an air discharge device includes an air discharge unit configured to discharge an air flow. The air discharge unit includes at least a main hole from which an air stream as a working air flow is discharged, and at least an auxiliary hole provided around the main hole to discharge a support air flow which suppresses an air suction due to the working air flow discharged from the main hole. The air discharge unit includes a vortex suppression structure configured to suppress development of lateral vortices generated in a velocity boundary layer of the working air flow at a downstream side of an outlet of the main hole. This vortex suppression structure is configured to make a central portion of the thickness of the velocity boundary layer of the working air flow at the downstream side of the main hole to be closer to a mainstream of the support air flow, at the downstream side of the outlet of the main hole.

According to another aspect of the present disclosure, an air discharge device includes an air discharge unit configured to discharge an air flow. The air discharge unit includes at least one main hole configured to discharge an air stream as a working air flow. The main hole has a plurality of edges that define an open edge of the main hole. The plurality of edges adjacent to each other have a different curvature, and are connected to have a roundness at a connection portion of the adjacent edges.

Thus, it is possible to effectively increase the reaching distance of the working air flow discharged from the main hole of the air discharge device.

BRIEF DESCRIPTION OF THE DRAWINGS

The above and other objects, features and advantages of the present disclosure will become more apparent from the following detailed description made with reference to the accompanying drawings.

DETAILED DESCRIPTION

Figure 1:
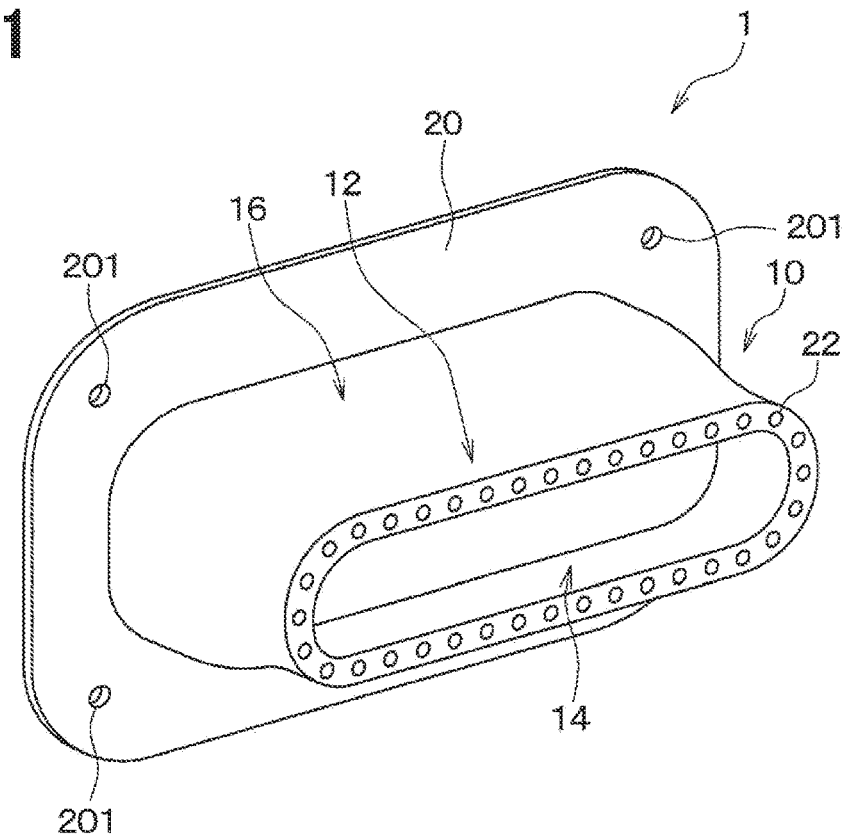
FIG. 1 is a schematic perspective view of an air discharge device according to a first embodiment.

The inventors of the present disclosure have deeply studied an air suction action when a main air flow is discharged from a main air outlet in an air discharge device, in order to further increase a reaching distance of the main air flow. As a result, it was found that the air suction action is caused by a lateral vortex generated by a shear force due to a velocity gradient of the main air flow when the working air flow is blown from the main air outlet. The lateral vortex is a vortex having the center of the vortex perpendicular to the flow direction of the main air flow.

Further studies by the inventors of the present disclosure have known that, in the vicinity on a downstream side of the main air outlet, innumerable lateral vortices generated in the velocity boundary layer are combined and developed in a center area of the velocity boundary layer into a large-scale vortex, thereby making the air suction action to be stronger.

However, in a conventional technique, only an auxiliary air outlet around the main air outlet is disclosed, but the findings of the inventors of the present disclosure are not disclosed at all. For this reason, it may be difficult to expect a further improvement in the reaching distance of the air flow.

According to an aspect of the present disclosure, an air discharge device includes an air discharge unit configured to discharge an air flow. The air discharge unit includes at least a main hole from which an air stream as a working air flow is discharged, and at least an auxiliary hole provided around the main hole to discharge a support air flow which suppresses an air suction due to the working air flow discharged from the main hole. The air discharge unit includes a vortex suppression structure configured to suppress development of lateral vortices generated in a velocity boundary layer of the working air flow at a downstream side of an outlet of the main hole. This vortex suppression structure is configured to make a central portion of the thickness of the velocity boundary layer of the working air flow at the downstream side of the main hole to be closer to a mainstream of the support air flow, at the downstream side of the outlet of the main hole.

In this way, if the central portion of the thickness of the velocity boundary layer formed downstream of the outlet of the main hole and the mainstream of the support air flow blown from the auxiliary hole are made close to each other, development of lateral vortices in the velocity boundary layer can be effectively suppressed by the support air flow blown from the auxiliary hole. As a result, the air suction from the surroundings of the working air flow blown out of the main hole is suppressed, and attenuation of the flow velocity of the working air flow blown out of the main hole can be reduced. Therefore, a reaching distance of the working air flow discharged from the main hole can be made longer.

If the open edge of the main hole has a corner, a lateral vortex tends to develop into a large scale at the corner. This is a factor that shortens the reaching distance of the working air flow discharged from the main flow.

According to another aspect of the present disclosure, an air discharge device includes an air discharge unit configured to discharge an air flow. The air discharge unit includes at least one main hole configured to discharge an air stream as a working air flow. The main hole has a plurality of edges that define an open edge of the main hole. The plurality of edges adjacent to each other have a different curvature, and are connected to have a roundness at a connection portion of the adjacent edges.

Because the connection portion of the respective edges, which is the change point of the curvature at the open edge of the main hole, has a roundness, the main hole is an open shape with no corners. Thus, development of the lateral vortex in the vicinity of the downstream side of the outlet of the main hole can be sufficiently suppressed, and the reaching distance of the working air flow discharged from the main hole can be lengthened.

Here, "the connecting portion of the adjacent edges connected to have a roundness" may be interpreted as a state in which the adjacent edges are connected such that tangents of the respective connection portions of the adjacent edges are matched each other.

Hereinafter, embodiments of the present disclosure will be described with reference to the drawings. In the following embodiments, portions that are the same as or equivalent to those described in the preceding embodiments are denoted by the same reference numerals, and a description of the same or equivalent portions may be omitted. In addition, when only a part of the components is described in the embodiment, the components described in the preceding embodiment can be applied to other parts of the components. The following embodiments may be partially combined with each other even if such a combination is not explicitly described as long as there is no disadvantage with respect to such a combination.

First Embodiment

The present embodiment will be described with reference to FIGS. 1 to 8. An air discharge device 1 of the present embodiment is used for an air outlet of an air conditioning unit that air-conditions a passenger compartment. The air conditioning unit not shown is disposed, for example, inside an instrument panel provided at the foremost portion in the passenger compartment. The air outlet of the air conditioning unit is provided inside an instrument panel or at the instrument panel.

Figure 2:
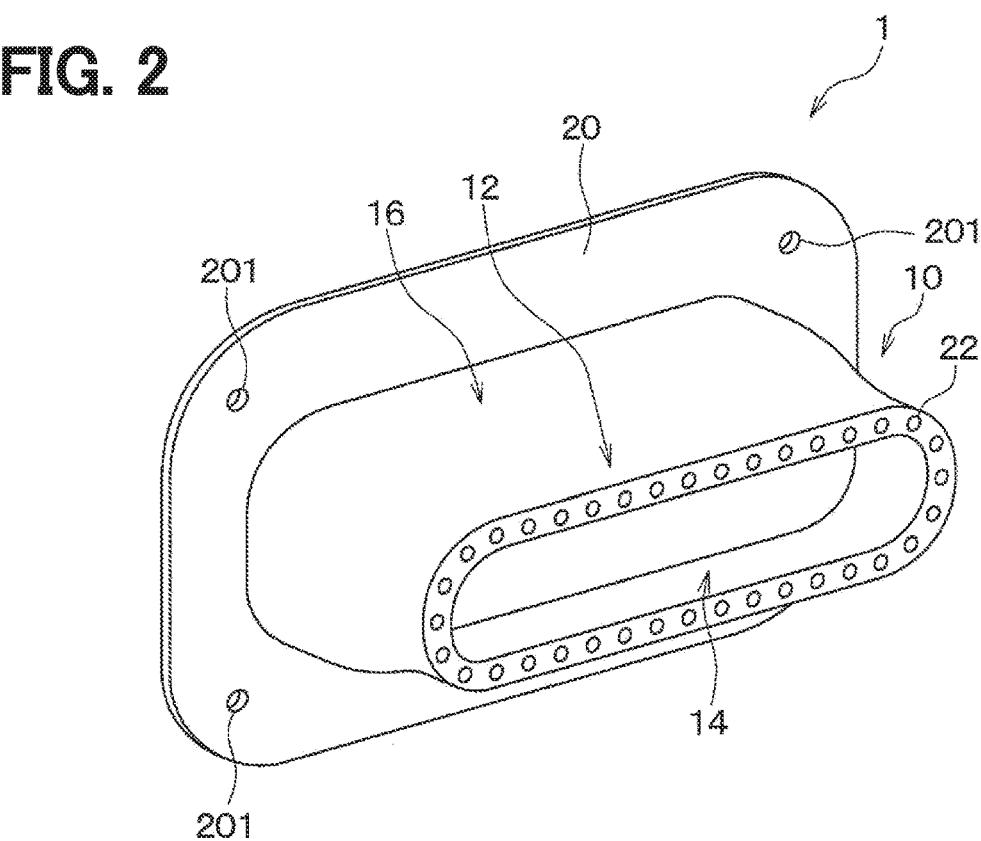
FIG. 2 is a schematic front view of the air discharge device according to the first embodiment.

As shown in FIGS. 1 and 2, the air discharge device 1 includes an air discharge unit 10 for discharging an air flow. The air discharge unit 10 defines an air passage therein, which guides an air flow adjusted to a desired temperature by the air conditioning unit into the interior of the passenger compartment. The air discharge unit 10 is configured to include a duct 16, a hole forming member 12 that forms a main hole 14 from which an air flow as a working air flow is discharged, and a flange 20 that is provided outside the duct 16.

The duct 16 is a member that define a flow passage through which an air flow to be blown into the interior of the passenger compartment passes. The duct 16 is made of a tubular member, for example. The duct 16 has a flat shape in which a horizontal dimension is larger than a vertical dimension when viewed from an air flow direction. Further, the duct 16 has a shape that is narrowed along the air flow direction from an upstream side toward a downstream side.

Figure 3:
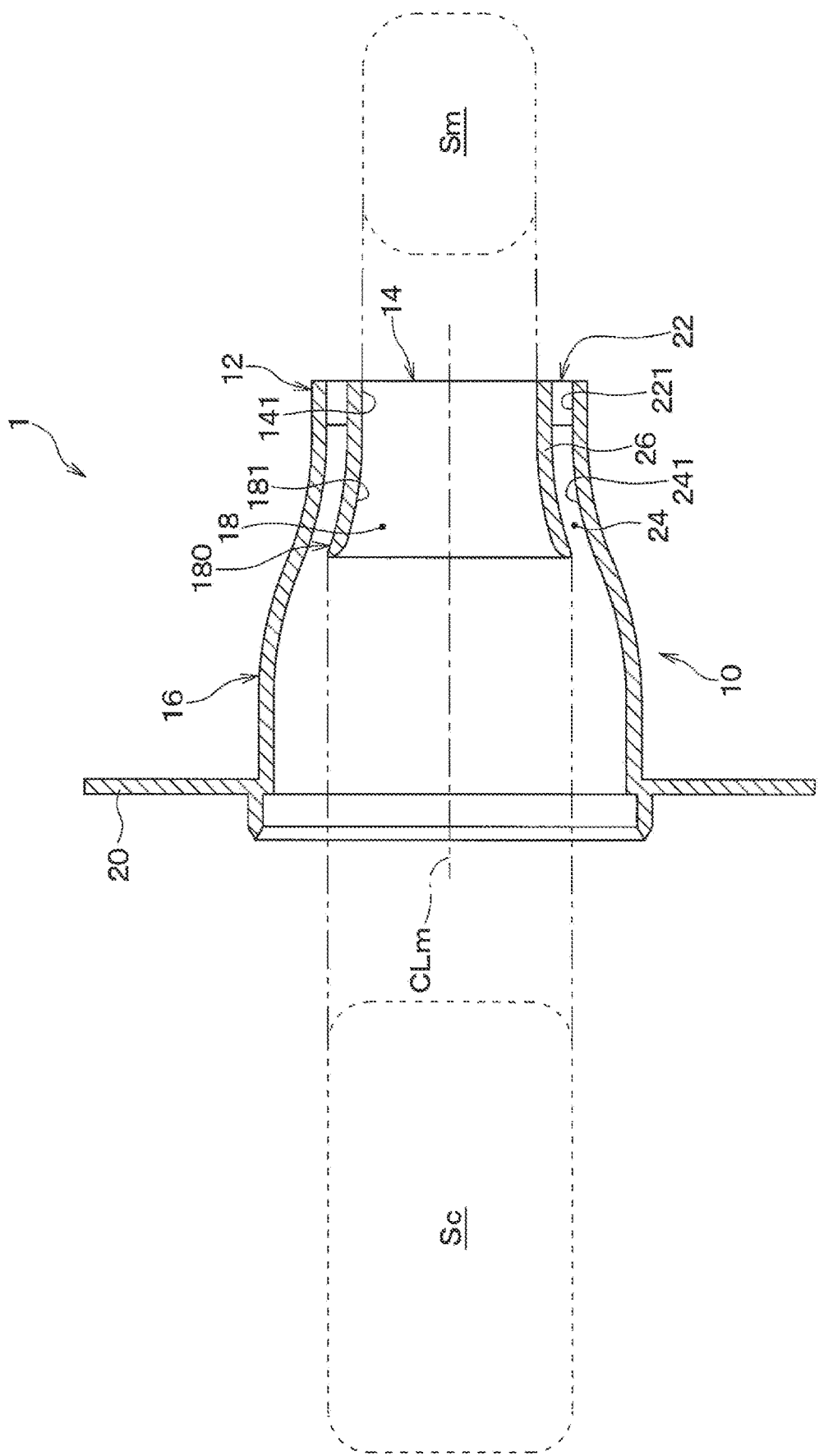
FIG. 3 is a cross-sectional view taken along III-III line in FIG. 2.

As shown in FIG. 3, a partition portion 26 is provided inside the duct 16 in an area nearer a downstream position than an upstream portion. The partition portion 26 is formed in a tubular shape, and is arranged inside the duct 16 so that a predetermined gap is formed between the partition portion 26 and the duct 16. Inside the duct 16, an inner flow passage and an outer flow passage are formed by the partition portion 26. That is, the duct 16 has a double flow structure by disposing the partition portion 26 inside thereof.

Inside the duct 16, a main flow passage 18 is formed in a central area thereof. The main flow passage 18 is formed by a space inside the partition section 26. The main flow passage 18 is a flow path through which a working air flow to be blown from the main hole 14 described later passes.

In addition, an auxiliary flow passage 24 is formed inside the duct 16 and outside the main flow passage 18. The auxiliary flow passage 24 is formed by the gap formed between the partition portion 26 and the duct 16. The auxiliary flow passage 24 is a flow path through which a support air flow to be blown from auxiliary holes 22 passes.

The main flow passage 18 and the auxiliary flow passage 24 are partitioned by the partition portion 26 described above. The main flow passage 18 and the auxiliary flow passage 24 communicate with each other at a portion of the duct 16 upstream from an upstream end of the partition portion 26 within the duct 16.

The duct 16 is fitted into an air outlet of an air conditioning unit (not shown), at an upstream position of the duct 16 in an air flow direction. Further, the duct 16 has a downstream portion in the air flow direction, which is connected to an outer periphery of the hole forming member 12.

The hole forming member 12 is positioned at a downstream end of the duct 14 in the air flow direction. The hole forming member 12 is a plate-shaped member that configures a downstream end surface of the duct 16 at the downstream air side, and has a predetermined thickness in the air flow direction. The hole forming member 12 is also used as a connector that connects the duct 16 and the partition portion 26 to each other at a downstream end area. The hole forming member 12 is formed in a tubular shape so that air can be blown out. The hole forming member 12 has a flat shape in which a horizontal dimension is larger than a vertical dimension when viewed from the air flow direction. The main hole 14 is opened as a single hole in a central portion of the hole forming member 12. The main hole 14 is an open hole for blowing conditioned air, the temperature of which is adjusted by the air conditioning unit, into the passenger compartment as a working air flow.

The main hole 14 has an oval shape with a horizontal dimension larger than a vertical dimension when viewed from the air flow direction. Specifically, the main hole 14 has a shape in which parallel line segments having the same length are connected by a pair of curved curves curved in an arc shape.

The main hole 14 is a hole communicating with the main flow passage 18. The main hole 14 is provided in a range from the downstream end of the partition portion 26 to an upstream position by the thickness of the hole forming member 12, in an air flow direction. The main hole 14 has an inner wall surface 141 extending along the air flow direction.

Further, in the hole forming member 12, a plurality of auxiliary holes 22 are formed to surround a periphery of the main hole 14. The auxiliary hole 22 is an open hole for blowing out a support air flow configured to suppress a suction action of air drawn by the working air flow discharged from the main hole 14.

As shown in FIG. 2, a plurality of auxiliary holes 22 are formed in the hole forming member 12 to surround the main hole 14. The plurality of auxiliary holes 22 are formed in the hole forming member 12 at a position outside of the outer edge of the main hole 14. The plurality of auxiliary holes 22 are formed so that the intervals between adjacent auxiliary holes 22 are equal. The plurality of auxiliary holes 22 are formed as round holes having a smaller cross-sectional area than that of the main hole 14.

The auxiliary holes 22 are holes communicating with the auxiliary flow passage 24. The auxiliary holes 22 are provided in a range from the downstream end of the partition portion 26 and the duct 16 to an upstream position by the thickness of the hole forming member 12, in the air flow direction. The auxiliary hole 22 has an inner wall surface 221 extending along the air flow direction.

The flange 20 is a member for attaching the air discharge unit 10 to an instrument panel (not shown). The flange 20 is a rectangular member provided on an outer periphery of the duct 16 to project outside from the duct 16. The flange 20 is attached to the instrument panel by a connecting member such as a screw, in a state where an upstream side portion of the duct 16 is fitted into the air outlet of the air conditioning unit. The flange 20 is provided with through holes 201 through which a connecting member such as a screw is inserted in the vicinity of the four corners.

Each of the hole forming member 12, the duct 16, the flange 20, and the partition portion 26 that configure the air discharge unit 10 is made of resin. The hole forming member 12, the duct 16, the flange 20 and the partition portion 26 are formed as an integrally molded product that is integrally molded by a molding technique such as an injection molding. However, the hole forming member 12, the duct 16, the flange 20 and the partition portion 26 may be partly configured separately. The air discharge unit 10 configured as described above is installed in the instrument panel (not shown) as described above.

Generally, the instrument panel is required to be miniaturized in a vehicle up-down direction from the viewpoint of the design and the expansion of the vehicle interior space. In addition, in the instrument panel, a large-sized information device, for informing various information showing a driving state of the vehicle or the like to an occupant, tends to be installed in a central portion in the vehicle width direction or/and a portion facing the occupant in the vehicle front-rear direction. In the air conditioning unit, it is necessary to take measures such as thinning the air outlet. However, when the air outlet is made thin, a core portion of the air flow blown from the air outlet is easily disturbed by a lateral vortex Vt generated downstream of the air outlet, and a reaching distance of the air flow reaching into the passenger compartment becomes shorter. Therefore, the air discharge device 1 is required to increase the reaching distance of the air flow blown into the passenger compartment.

The inventors of the present disclosure have deeply studied the air suction action of the air flow when the air flow is blown out from the main hole 14, in order to further increase the reaching distance of the air flow blown into the passenger compartment. As a result, it was found that the air suction action is caused by a lateral vortex Vt generated by a shear force due to a velocity gradient of the working air flow when the working air flow is blown from the main hole 14. Hereinafter, the air suction action will be described with reference to FIGS. 4 and 5.

Figure 4:
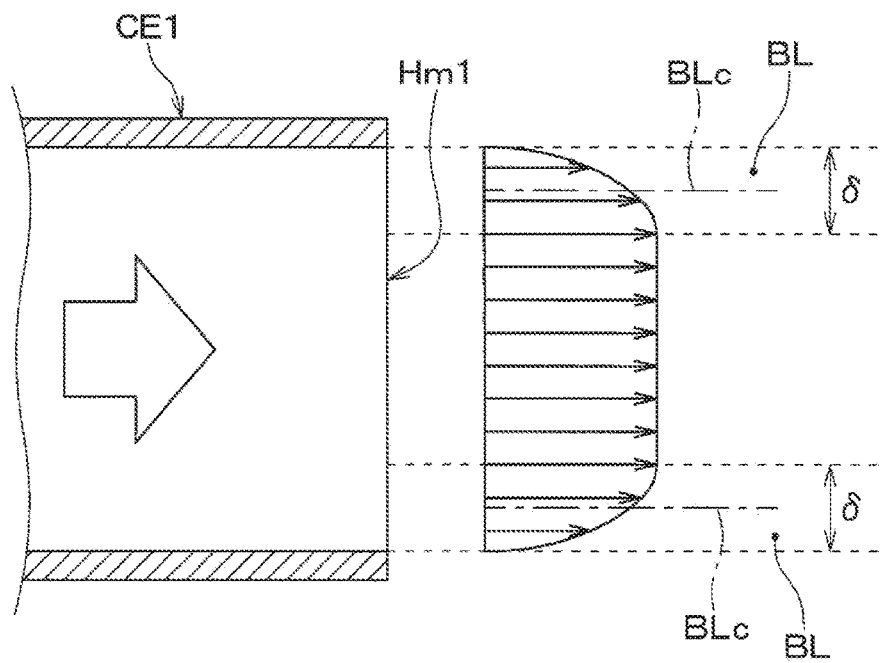
FIG. 4 is a diagram for explaining a velocity gradient of an air flow at a downstream area of a first nozzle, according to a first comparative example.

FIG. 4 is a schematic diagram showing a first nozzle CE1 that is a first comparative example, with respect to the air discharge device 1 of the present embodiment. The first nozzle CE1 is formed of a cylindrical tube having a substantially constant cross-sectional area, and the open at one end of the first nozzle CE1 forms a main hole Hm1.

As shown in FIG. 4, when the air flow is blown out from the main hole Hm1 of the first nozzle CE1, a difference in speed between the air flow from the main hole Hm1 and the air that is stationary around the main hole Hm1 is caused downstream of the main hole Hm1. As a result, a velocity boundary layer BL is formed. The velocity boundary layer BL is a layer that is affected to stationary air, in the air flow blown from the main hole Hm1 of the first nozzle CE1.

Figure 5:
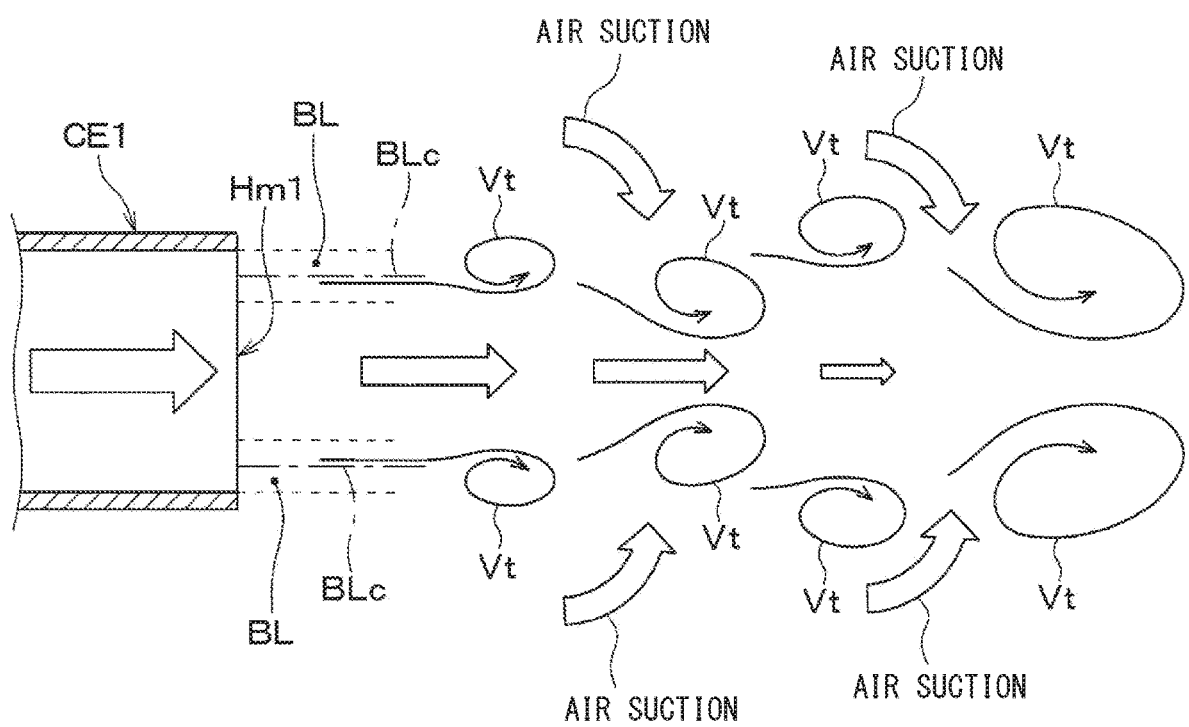
FIG. 5 is a diagram for explaining a state of an air flow at the downstream area of the first nozzle, according to the first comparative example.

In the velocity boundary layer BL, as shown in FIG. 5, an infinite number of lateral vortices Vt are generated by the shearing force due to the velocity gradient. According to the study by the present inventors, the infinite of lateral vortices Vt generated in the velocity boundary layer BL are synthesized near a central portion BLc of the thickness δ of the velocity boundary layer BL, and develops into a large-scale one, so that the air suction action is likely to become stronger.

Here, the thickness δ of the velocity boundary layer BL is defined as a dimension from the wall surface to a position where the velocity U∞ of the main flow (that is, the potential flow) flowing inside the velocity boundary layer BL is 99% (that is, 0.99×U∞). The thickness δ of the velocity boundary layer BL is calculated, for example, based on the following formula F1.

$$\delta = 5 \times (v \times p/U\infty)^{1/2} \quad (F1)$$

In the formula F1, v represents the kinematic viscosity coefficient, p represents the position of the main flow in the air flow direction, and U∞ represents the velocity of the main flow (that is, uniform flow velocity). As the definition equation of the thickness δ of the velocity boundary layer BL, other than the above-mentioned equation F1, for example, a definition equation based on the excluded thickness or a definition equation based on the momentum thickness can be used.

Figure 6:
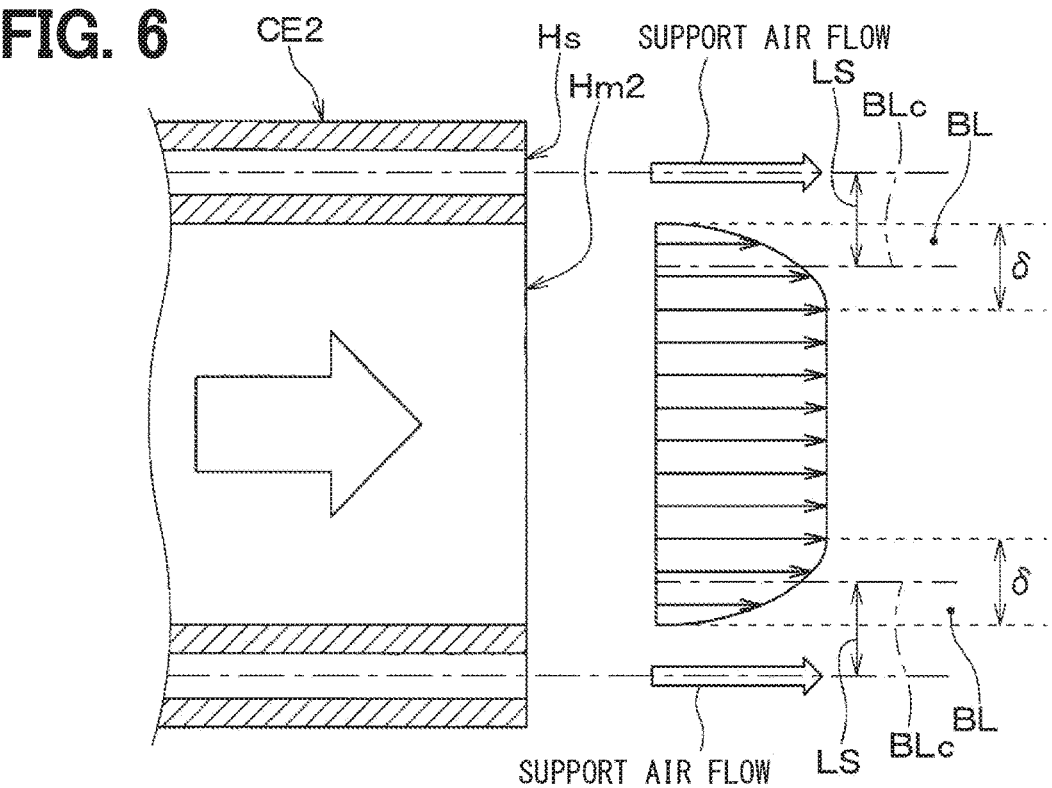
FIG. 6 is a diagram for explaining a velocity gradient of an air flow at a downstream area of a second nozzle, according to a second comparative example.

FIG. 6 is a schematic diagram showing a second nozzle CE2 that is a second comparative example, with respective to the air discharge device 1 of the present embodiment. The second nozzle CE2 is configured by a cylindrical tube having a main hole Hm2 and a plurality of auxiliary holes Hs surrounding the main hole Hm2 at one end side thereof. As shown in FIG. 6, when the air flow is discharged from the main hole Hm2 and the auxiliary holes Hs of the second nozzle CE2, the velocity boundary layer BL of the working air flow along the inner wall surface of the main hole Hm2 is formed downstream of the outlet of the main hole Hm2. It is considered that a lateral vortex Vt is likely to occur in the velocity boundary layer BL near the central portion BLc of the thickness δ.

On the other hand, the mainstream of the support air flow is blown out from the auxiliary hole Hs in parallel with the working air flow blown from the main hole Hm2, in a state with a predetermined distance LS from the central portion BLc of the thickness δ of the velocity boundary layer BL. That is, in the second nozzle CE2, the mainstream of the support air flow blown out of the auxiliary hole Hs flows in a state away from the central portion BLc of the thickness δ of the velocity boundary layer BL.

In such a case, because the mainstream of the support air flow is separated from the vortex center of the lateral vortex Vt generated in the velocity boundary layer BL, the lateral vortex Vt may be difficult to be effectively disturbed by the support air flow, and an effective suppression relative to the development of the lateral vortex Vt generated in the velocity boundary layer BL may be difficult to be obtained.

The inventors of the present disclosure found that the effect of suppressing the development of the lateral vortex Vt generated in the velocity boundary layer BL can be obtained by making the main stream of the support air flow to be closer to the vortex center of the lateral vortex Vt generated in the velocity boundary layer BL of the working air flow. In accordance with this, a vortex suppression structure is added to the air discharge device 10.

As shown in FIG. 3, in the air discharge portion 10 of the present embodiment, as the vortex suppression structure, an enlarged portion 180 having a cross-sectional area Sc larger than the open area Sm of the main hole 14 is provided with respect to the main flow passage 18 of the duct 16.

The inner wall surface 181 of the partition portion 26 defining the main flow passage 18 has a shape in which the wall surface is tapered from the position of the enlarged portion 180 having the largest cross-sectional area toward the main hole 14. The enlarged portion 180 is configured in a range of the inner wall surface 181 of the partition portion 26 defining the main flow passage 18, in which the cross-sectional area of the inner wall surface 181 decreases from the upstream side to the downstream side in the air flow direction. For example, the enlarged portion 180 has a cross-sectional area that continuously decreases as toward the main hole 14, so as to be continuously connected to the main hole 14. The enlarged portion 180 is set such that a ratio of the maximum sectional area Sc to the open area Sm of the main hole 14 is, for example, 7:2. The cross-sectional area Sc of the enlarged portion 180 is the cross-sectional area at the position where the passage cross-sectional area is largest in the main flow passage 18. Specifically, the cross-sectional area Sc of the enlarged portion 180 is the cross-sectional area at the upstream end of the partition portion 26 the air flow direction. The opening area Sm of the main hole 14 is the cross-sectional area of the end portion of the partition portion 26 on the downstream side of the air flow.

Figure 7:
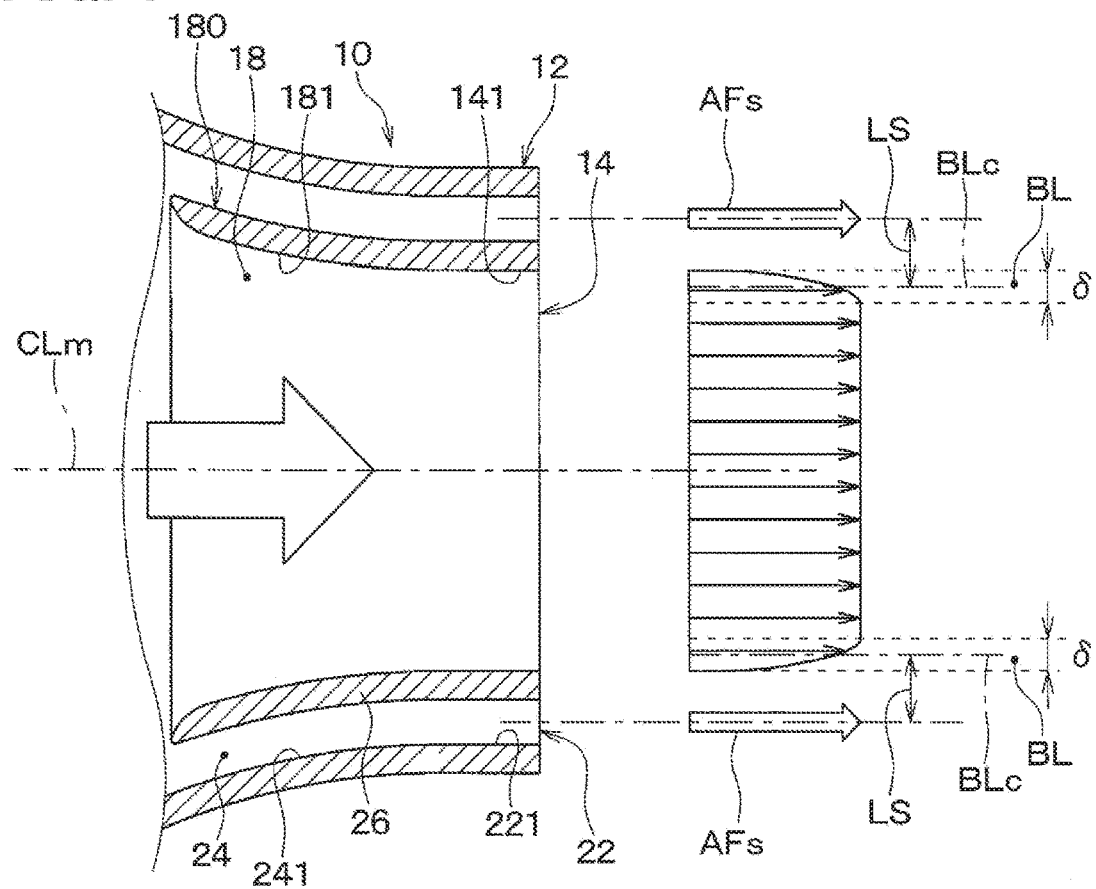
FIG. 7 is a diagram for explaining a velocity gradient of a working air flow at a downstream area of a main hole of the air discharge device, according to a first embodiment.
Figure 8:
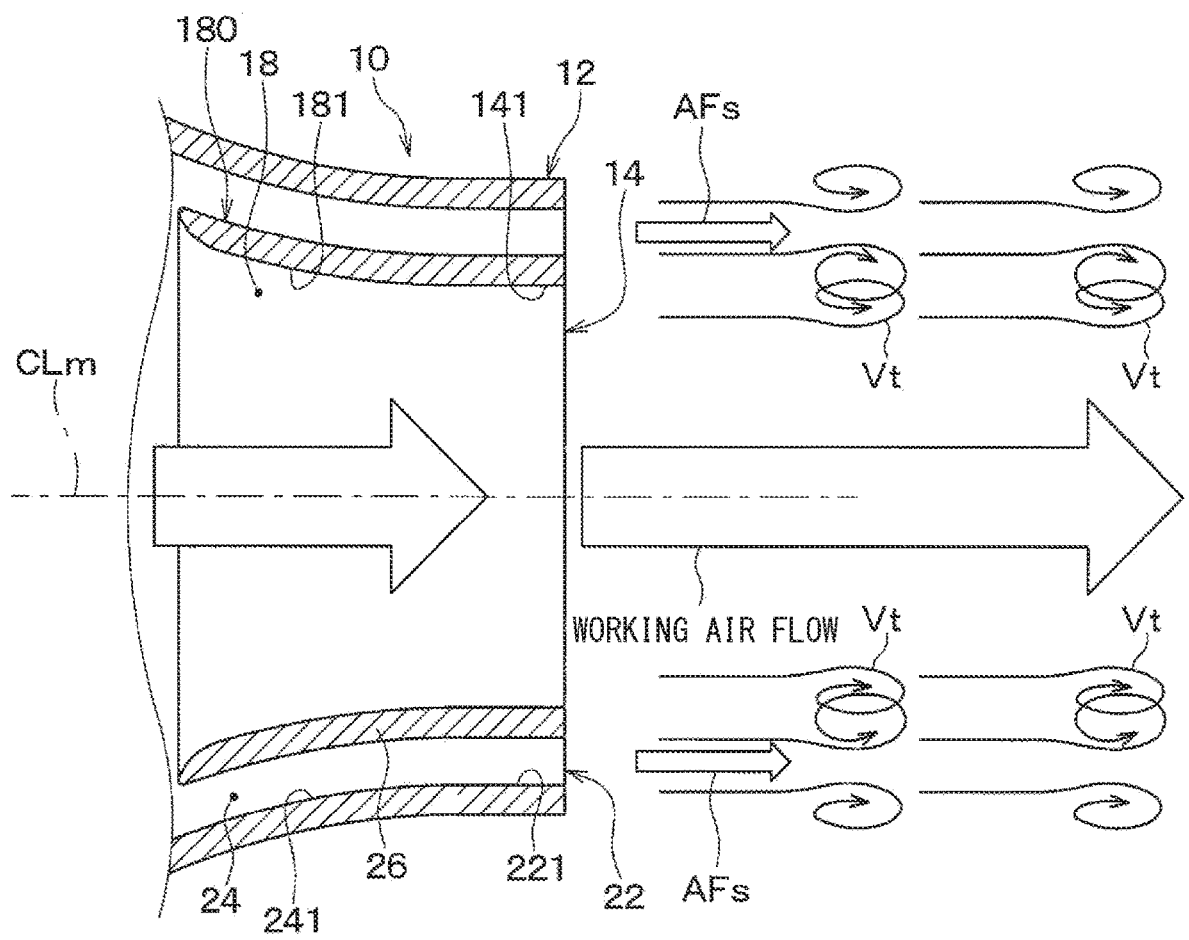
FIG. 8 is a diagram for explaining a state of the working air flow at the downstream area of the main hole of the air discharge device, according to a first embodiment.

In the air discharge unit 10 of the present embodiment configured as described above, when the conditioned air temperature-adjusted by the air conditioning unit flows into the duct 16, the conditioned air passes through the main flow passage 18 and flows into the main hole 14, as shown in FIG. 7.

Since the main flow passage 18 is provided with the enlarged portion 180 having a cross-sectional area Sc larger than the open area Sm of the main hole 14, a contraction flow is generated from the enlarged portion 180 to the main hole 14. As a result, in the main flow passage 18, a flow velocity difference between the vicinity of the center line CLm of the main hole 14 and the vicinity of the inner wall surface 181 defining the main flow passage 18 becomes small. The reason why the flow velocity of the air flow near the inner wall surface 181 defining the main flow passage 18 becomes higher is that a centrifugal force acts on the air flow along the inner wall surface 181 due to the action of the curvature of the inner wall surface 181 defining the main flow passage 18. The contraction flow is a phenomenon in which the difference between the flow velocity near the wall surface of the flow passage and the flow velocity of the main flow is reduced by reducing the flow passage cross section.

When the air flow is blown out from the main hole 14 and the auxiliary hole 22, a velocity boundary layer BL of the working air flow is formed along the inner wall surface 141 of the main hole 14 at a downstream side of the outlet of the main hole 14. The thickness δ of the velocity boundary layer BL becomes smaller than that in the second comparative example due to the contraction flow in the main flow passage 18.

If the thickness δ of the velocity boundary layer BL of the working air flow formed downstream of the outlet of the main hole 14 is small, the central portion BLc of the thickness δ of the velocity boundary layer BL becomes closer to the mainstream of the support air flow blown out from the auxiliary hole 22 at the downstream side of the outlet of the main hole 14. That is, in the air discharge unit 10 of the present embodiment, the mainstream AFs of the support air flow blown out of the auxiliary hole 22 flows in a state of approaching the central portion BLc of the thickness δ of the velocity boundary layer BL. Specifically, a lateral distance LS between the mainstream of the support air flow and the central portion BLc of the thickness δ of the velocity boundary layer BL is smaller than that in the second comparative example.

In such a case, because the mainstream of the support air flow is closer to the vortex center of the lateral vortex Vt generated in the velocity boundary layer BL, the lateral vortex Vt can be easily disturbed by the support air flow, and a suppression relative to the development of the lateral vortex Vt generated in the velocity boundary layer BL can be effectively obtained.

As described above, in the air discharge device 1 of the present embodiment, it is possible to suppress the development of the lateral vortex Vt generated in the velocity boundary layer BL on the downstream side of the outlet of the main hole 14 by the enlarged portion 180 provided in the main flow passage 18. In the present embodiment, the enlarged portion 180 provided in the main flow passage 18 functions as a vortex suppression structure. More specifically, the enlarged portion 180 functions as a layer reduction structure that reduces the thickness δ of the velocity boundary layer BL formed along the inner wall surface 141 of the main hole 14.

In the air discharge device 1 described above, the vortex suppression structure is realized by the enlarged portion 180 provided in the main flow passage 18. According to this, the air stream blown from the central portion BLc of the thickness δ of the velocity boundary layer BL formed downstream of the outlet of the main hole 14 and the air stream blown from the auxiliary holes 22 are closer to each other at the downstream side of the outlet of the main hole 14. That is, if the main channel 18 is provided with the enlarged portion 180, the flow contraction is caused near the main hole 14, thereby reducing the difference in flow velocity between the center line CLm of the main hole 14 and the inner wall surface 141, and reducing the thickness δ of the velocity boundary layer BL formed downstream of the outlet of the main hole 14.

As a result, the development of the lateral vortex Vt in the velocity boundary layer BL can be sufficiently suppressed by the support air flow blown out from the auxiliary hole 22. As a result, the air suction from the surroundings of the working air flow blown out of the main hole 14 is suppressed, and attenuation of the flow velocity of the working air flow blown out of the main hole 14 can be reduced. Therefore, the reaching distance of the working air flow discharged from the main hole 14 can be made longer.

In particular, when the conditioned air whose temperature has been adjusted by the air conditioning unit is blown out of the main hole 14 as the working air flow, it is possible to suppress the air suction from the surroundings into the working air flow blown out of the main hole 14, thereby reducing a temperature change of the working air flow due to the air suction. Thus, according to the air discharge device 1 of the present embodiment, it is possible to make the air stream having an appropriate temperature can reach a desired location in the passenger compartment. This is particularly effective in realizing spot air-conditioning in the passenger compartment.

Second Embodiment

Next, a second embodiment will be described with reference to FIGS. 9 to 12. The present embodiment is different from the first embodiment in that a contraction fin 28 configured to contract an air flow flowing through a main flow passage 18 is provided inside the duct 6. In the present embodiment, a difference part different from the first embodiment will be mainly described, and description for a part similar to the first embodiment will be omitted.

Figure 9:
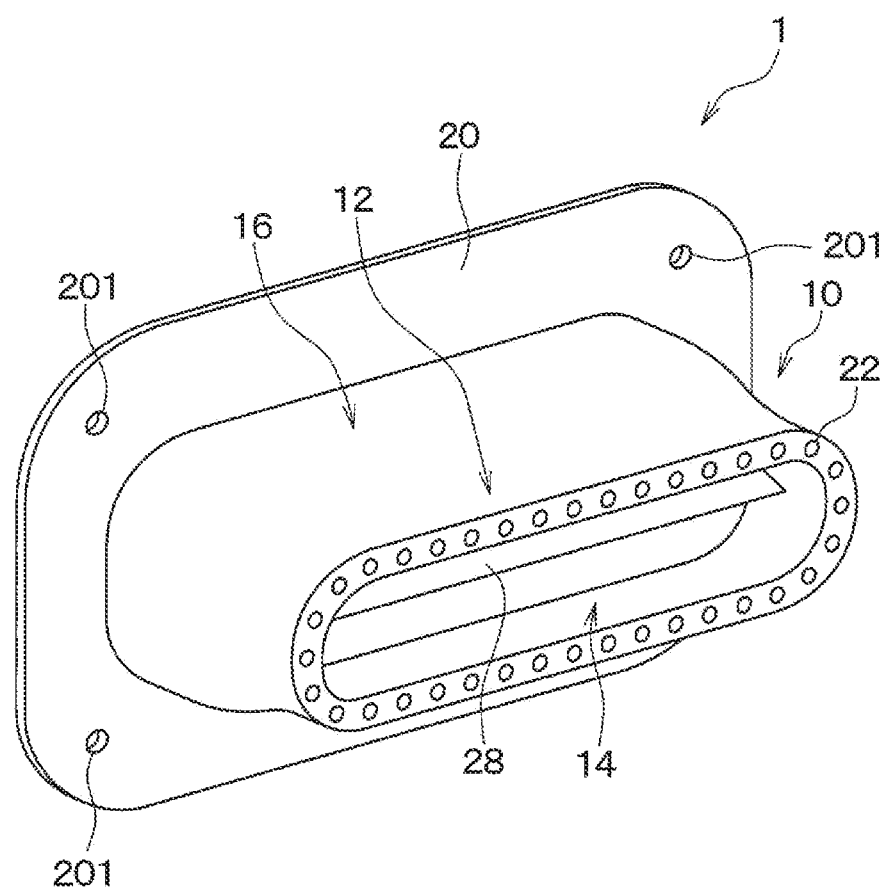
FIG. 9 is a schematic perspective view of an air discharge device according to a second embodiment.
Figure 10:
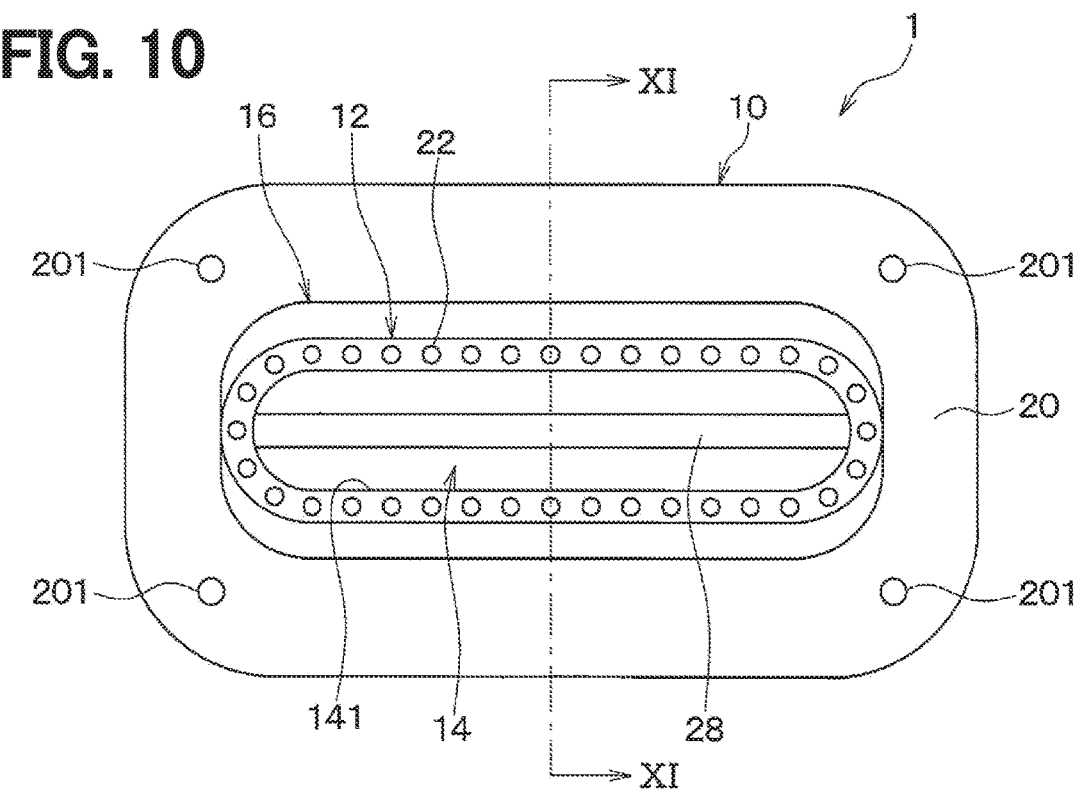
FIG. 10 is a schematic front view of the air discharge device according to the second embodiment.

As shown in FIG. 9, the contraction fin 28 is provided inside the duct 16 in the air discharge unit 10 of the present embodiment. As shown in FIG. 10, the contraction fin 28 is provided in the central portion of the short edge sides of the inner wall surface 141 of the main hole 14 to extend in a direction parallel to the long edge sides of inner wall surface of the main hole 14, so that the main flow passage 18 formed inside of the duct 16 is divided into an upper part and a lower part. Although not shown, two ends of the contraction fin 28 in a longitudinal direction of the contraction fin 28 are connected to the inside of the duct 16.

Figure 11:
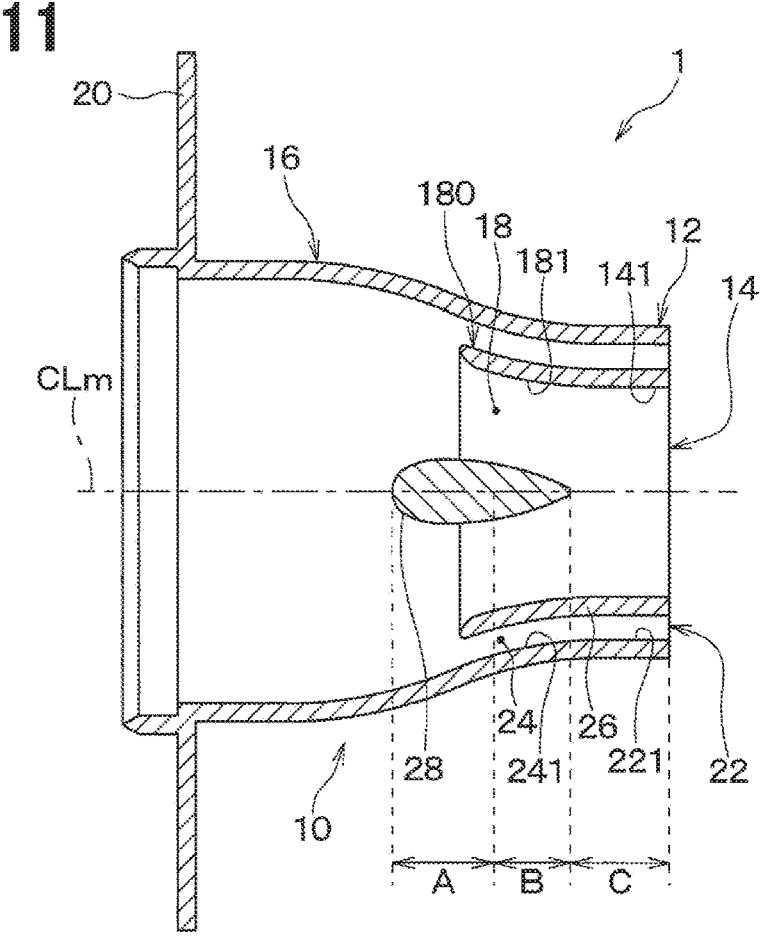
FIG. 11 is a cross-sectional view taken along line XI-XI in FIG. 10.

As shown in FIG. 11, the contraction fin 28 is positioned in a portion forming the main flow passage 18 inside the duct 16 so as not to protrude outside from the main hole 14. Specifically, the contraction fin 28 is located inside the duct 16 at a position overlapping a part of the partition portion 26 and without overlapping with the wall surface 141, in the direction perpendicular to the center line CLm of the main flow passage 18.

The cross section of the contraction fin 28 has a teardrop shape with excellent aerodynamic characteristics. That is, the front edge portion of the contraction fin 28 positioned at an upstream area of the air flow has a rounded curved surface, and the rear edge portion thereof positioned at a downstream area of the air flow has a sharp curved surface as compared with the front edge portion. Further, the contraction fin 28 has a maximum cross-sectional thickness at a position closer to the front edge portion than to the rear edge portion.

Figure 12:
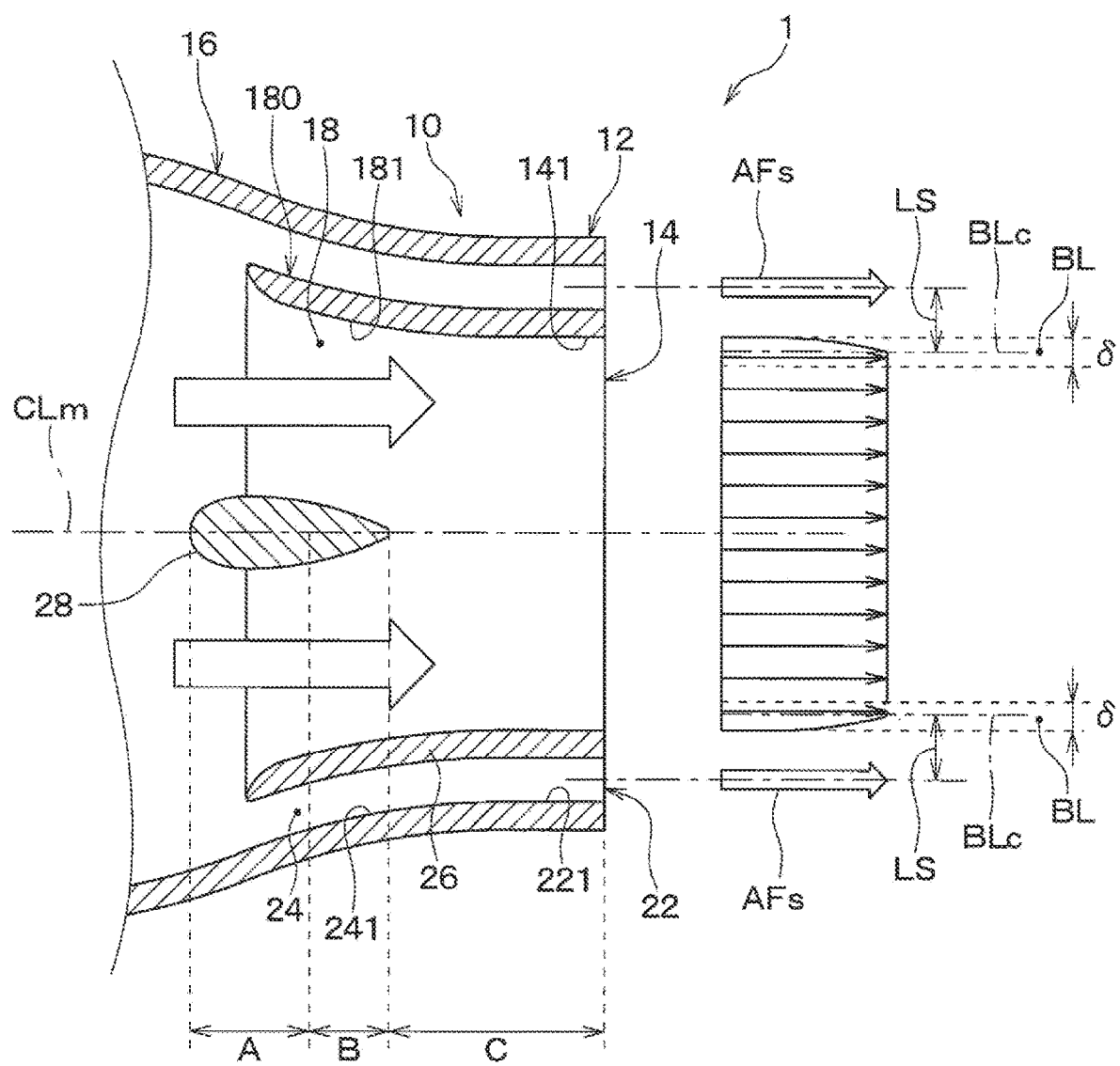
FIG. 12 is a diagram for explaining a velocity gradient of a working air flow at a downstream area of a main hole of the air discharge device, according to the second embodiment.

In the air discharge unit 10 of the present embodiment configured as described above, when the conditioned air temperature-adjusted by the air conditioning unit flows into the duct 16, the conditioned air passes through the main flow passage 18 and flows into the main hole 14, as shown in FIG. 12.

The main air passage 18 is provided with the enlarged portion 180 having a larger cross-sectional area Sc than the open area Sm of the main hole 14. Therefore, a contraction flow is generated from the enlarged portion 180 to the main hole 14. In addition, the main flow passage 18 is branched by the contraction fin 28, so that a contraction flow is generated before reaching the main hole 14.

As described above, the contraction fin 28 is positioned in a portion forming the main flow passage 18 inside the duct 16 so as not to protrude outside from the main hole 14. Therefore, the duct 16 is provided therein with an upstream section A in which the flow passage cross-sectional area is reduced by the contraction fin 28, an intermediate section B in which the flow passage cross-sectional area is enlarged by the contraction fin 28 compared to the upstream section A, and a downstream section C in which the flow passage cross-sectional area is almost not changed.

In the upstream section A, the flow passage cross-sectional area is reduced by the contraction fin 28, and the air flow is compressed, so that the flow velocity between the vicinity of the center line CLm of the main hole 14 and the vicinity of the inner wall surface 181 forming the main flow passage 18 is made sufficiently small. Thus, in the upstream section A, the thickness δ of the velocity boundary layer BL near the inner wall surface 181 defining the main flow passage 18 decreases as toward the downstream side due to the contraction flow effect of the contraction fin 28.

On the other hand, in the intermediate section B and the downstream section C, which are on the downstream side of the upstream section A, because the flow passage cross-sectional area is not small as toward downstream, the thickness δ of the velocity boundary layer BL near the inner wall surface 181 defining the main flow passage 18 becomes larger as toward downstream.

Specifically, in the intermediate section B, because the flow passage cross-sectional area is enlarged, the thickness δ of the velocity boundary layer BL near the inner wall surface 181 defining the main flow passage 18 gradually increases as toward the downstream side. However, in the contraction fin 28, the amount of change in the thickness of the cross section on the rear edge side positioned at the downstream side of the air flow is smaller than that on the front edge side. Therefore, the change in the flow passage cross-sectional area in the intermediate section B becomes slower than the change in the upstream section A, and the increase amount of the thickness δ of the velocity boundary layer BL in the intermediate section B is sufficiently smaller than the amount of decrease in the thickness δ in the upstream section A. Further, in the downstream section C which is the downstream side of the intermediate section B, because the flow passage cross-sectional area is constant, the thickness δ of the velocity boundary layer BL near the inner wall surface 181 defining the main flow passage 18 slightly increases as toward the downstream side. However, the increase amount of the thickness δ of the velocity boundary layer BL in the downstream section C is extremely smaller than the decrease amount of the thickness δ of the velocity boundary layer BL in the upstream section A.

As described above, the reduction amount of the thickness δ of the velocity boundary layer BL in the upstream section A by the contraction fin 28 is sufficiently larger than the total increase amount of the thickness δ of the velocity boundary layer BL in the intermediate section B and the downstream section C.

As a result, in the main flow passage 18, a flow velocity difference between the vicinity of the center line CLm of the main hole 14 and the vicinity of the inner wall surface 181 defining the main flow passage 18 becomes sufficiently small. When the air flow is blown out from the main hole 14 and the auxiliary hole 22, a velocity boundary layer BL of the working air flow is formed along the inner wall surface 141 of the main hole 14 at a downstream side of the outlet of the main hole 14. In this case, the thickness δ of the velocity boundary layer BL can be smaller than that in the first embodiment.

That is, in the air discharge unit 10 of the present embodiment, the mainstream AFs of the support air flow blown out of the auxiliary hole 22 flows in a state of approaching the central portion BLc of the thickness δ of the velocity boundary layer BL. In such a case, because the mainstream of the support air flow is closer to the vortex center of the lateral vortex Vt generated in the velocity boundary layer BL, the lateral vortex Vt can be disturbed by the support air flow, and a suppression relative to the development of the lateral vortex Vt generated in the velocity boundary layer BL can be effectively obtained. In the present embodiment, the enlarged portion 180 and the contraction fin 28 provided in the main flow passage 18 functions as a vortex suppression structure. More specifically, the enlarged portion 180 and the contraction fin 28 function as a layer reduction structure that reduces the thickness δ of the velocity boundary layer BL formed along the inner wall surface 141 of the main hole 14.

Although the air discharge device 1 of the present embodiment described above has the contraction fin 28 added to the main flow passage 18, the other configurations may be common to the first embodiment. For that reason, the air discharge device 1 according to the present embodiment can obtain the same advantages as those in the first embodiment, based on the configuration in common with the first embodiment.

In particular, in the present embodiment, the layer reduction structure includes not only the enlarged portion 180 but also the contraction fin 28. According to this, it is possible to reduce the thickness δ of the velocity boundary layer BL due to the contraction flow while suppressing the increase in the size of the device due to the expansion of the main flow passage 18. Such a configuration is suitable when an installation space is greatly limited, for example in a moving body such as a vehicle.

Modification to the Second Embodiment

In the above-described second embodiment, the contraction fin 28 has a teardrop shape in cross section, but the present disclosure is not limited to this. The contraction fin 28 may have, for example, an oval shape whose cross-sectional shape extends along the air flow of the main flow passage 18. Moreover, as the contraction fin 28, for example, a member having a lattice shape may be adopted.

In the above-described second embodiment, an example in which the enlarged portion 180 is provided in the main flow passage 18 has been described, but the present disclosure is not limited to this. The air outlet device 1 may have a configuration in which only the contraction fin 28 is arranged with respect to the main flow passage 18 and the enlarged portion 180 may be not provided with respect to the main flow passage 18. In this case, the contraction fin 28 functions as the layer reduction structure that reduces the thickness δ of the velocity boundary layer BL formed along the inner wall surface 141 of the main hole 14.

Third Embodiment

Next, a third embodiment will be described with reference to FIGS. 13 to 15. The present embodiment is different from the first embodiment in that an uneven portion 30 is provided on the inner wall surface 181 defining the main flow passage 18. In the present embodiment, a difference part different from the first embodiment will be mainly described, and description for a part similar to the first embodiment will be omitted.

Figure 13:
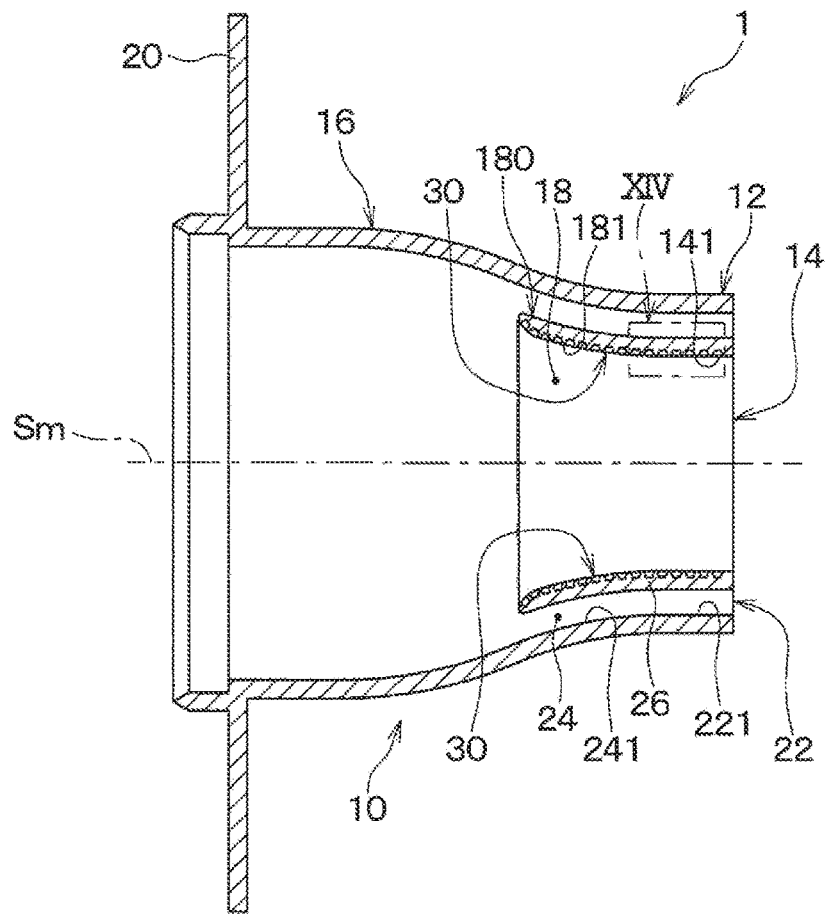
FIG. 13 is a schematic sectional view of an air discharge device according to a third embodiment.

As shown in FIG. 13, in the air discharge unit 10 of the present embodiment, the uneven portion 30, in which concave portions and convex portions are alternately arranged on the inner wall surface 181 defining the main flow passage 18, is provided along the flow direction of the air in the main flow passage 18. Specifically, the uneven portion 30 is formed inside of the duct 16 in substantially in an entire area of an inner surface of the partition portion 26 that partitions the main flow passage 18 and the auxiliary flow passage 24 from each other.

Figure 14:
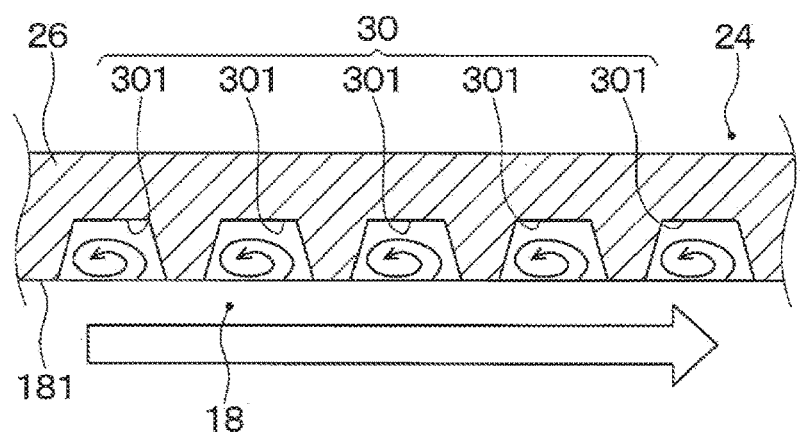
FIG. 14 is an enlarged view of a portion XIV in FIG. 13.

As shown in FIG. 14, the uneven portion 30 is configured by a plurality of grooves 301 provided on the inner wall surface 181 defining the main flow passage 18. The plurality of grooves 301 are arranged at a predetermined interval along the flow direction of the air flow in the main flow passage 18. The groove 301 is made of a circular or polygonal depression. In addition, the groove 301 may be configured by, for example, a slit groove having a V-shaped cross section that extends to intersect the flow direction of the air flow in the main flow passage 18.

Figure 15:
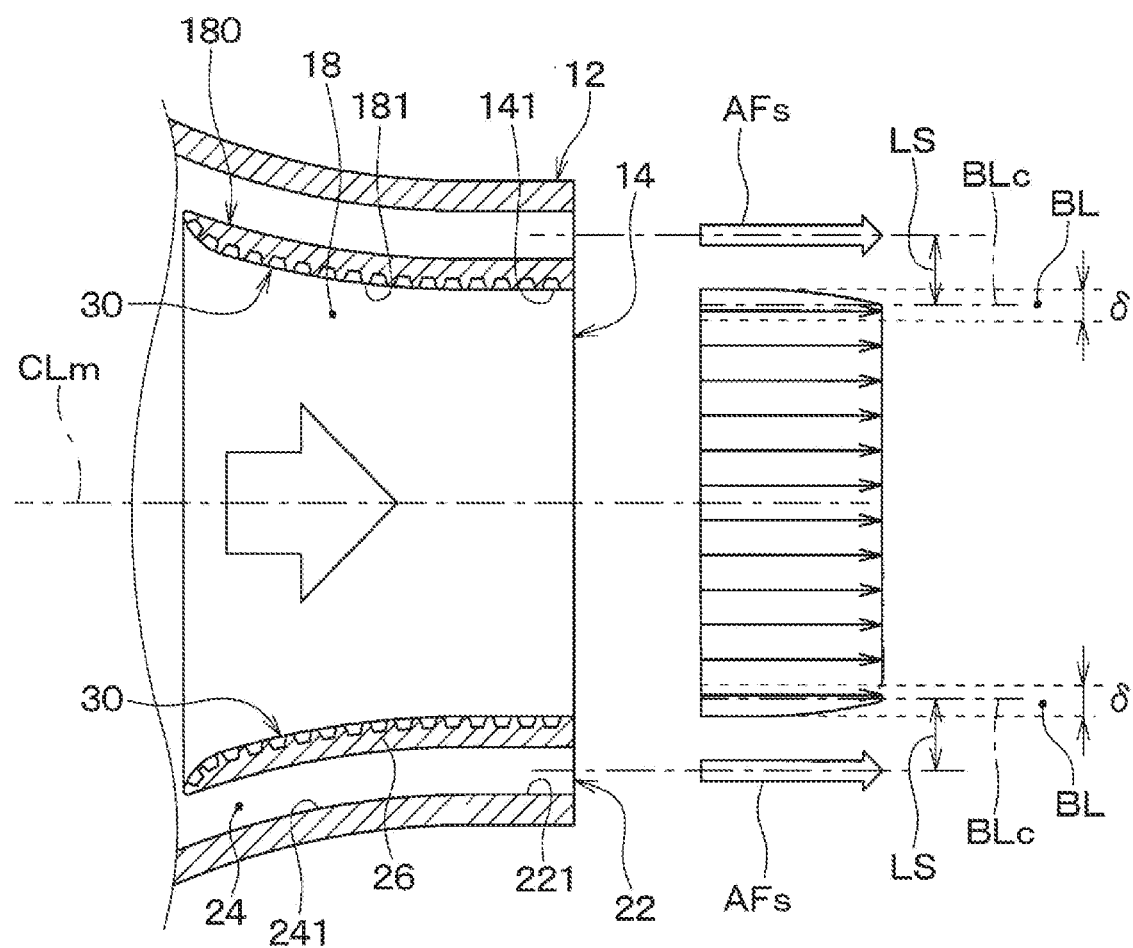
FIG. 15 is a diagram for explaining a velocity gradient of a working air flow at a downstream area of a main hole of the air discharge device, according to the third embodiment.

In the air discharge unit 10 of the present embodiment configured as described above, when the conditioned air temperature-adjusted by the air conditioning unit flows into the duct 16, the conditioned air passes through the main flow passage 18 and flows into the main hole 14, as shown in FIG. 15.

Since the main flow passage 18 is provided with the enlarged portion 180 having a cross-sectional area Sc larger than the open area Sm of the main hole 14, a contraction flow is generated from the enlarged portion 180 to the main hole 14. In addition, the inner wall surface 181 defining the main flow passage 18 is provided with the uneven portion 30 in which the concave portions and the convex portions are alternately arranged in the main flow direction of the main flow passage 18.

As shown in FIG. 14, the uneven portion 30 is configured to generate vortices within the plurality of grooves 301 when the airflow passes near the inner wall surface 181 forming the main flow passage 18. Because the vortex generated inside the uneven portion 30 plays a role of a ball bearing, the coefficient of friction of the inner wall surface 181 defining the main flow passage 18 becomes small. As a result, in the main flow passage 18, a flow velocity difference between the vicinity of the center line CLm of the main hole 14 and the vicinity of the inner wall surface 181 defining the main flow passage 18 becomes small.

When the air flow is blown from the main hole 14 and the auxiliary hole 22, a velocity boundary layer BL of the working air flow is formed along the inner wall surface 141 of the main hole 14 at a downstream side of the outlet of the main hole 14. The thickness δ of the velocity boundary layer BL becomes smaller than that in the first embodiment due to the reduction in the friction coefficient by the uneven portion 30.

That is, in the air discharge unit 10 of the present embodiment, the mainstream AFs of the support air flow blown out of the auxiliary hole 22 flows in a state of approaching the central portion BLc of the thickness δ of the velocity boundary layer BL. Specifically, a lateral distance LS between the mainstream of the support air flow and the central portion BLc of the thickness δ of the velocity boundary layer BL becomes smaller than that in the first embodiment. In such a case, because the mainstream of the support air flow is closer to the vortex center of the lateral vortex Vt generated in the velocity boundary layer BL, the lateral vortex Vt can be disturbed by the support air flow, and a suppression relative to the development of the lateral vortex Vt generated in the velocity boundary layer BL can be effectively obtained. In the present embodiment, the enlarged portion 180 and the uneven portion 30 provided in the main flow passage 18 functions as a vortex suppression structure. More specifically, the enlarged portion 180 and the uneven portion 30 function as a layer reduction structure that reduces the thickness δ of the velocity boundary layer BL formed along the inner wall surface 141 of the main hole 14.

Although the air discharge device 1 of the present embodiment described above has the uneven portion 30 provided on the inner wall surface 181 defining the main flow passage 18, the other configurations are common to the first embodiment. For that reason, the air discharge device 1 according to the present embodiment can obtain the same advantages as those in the first embodiment, based on the configuration in common with the first embodiment.

In the present embodiment, the layer reduction structure includes not only the enlarged portion 180 but also the uneven portion 30. According to this, it is possible to sufficiently reduce the thickness δ of the velocity boundary layer BL by the effect of reducing the friction coefficient of the inner wall surface 181 defining the main flow passage 18 as well as the contraction effect of the enlarged portion 180.

In particular, in this embodiment, the uneven portion 30 is formed by the plurality of grooves 301 provided on the inner wall surface 181 of the main flow passage 18. According to this, the size of the main flow passage 18 can be secured, and the pressure loss in the main flow passage 18 can be reduced, as compared with a case where the uneven portion 30 is configured by a plurality of protrusions. This greatly contributes to the improvement of the reaching distance of the working air flow.

(Modification of the Third Embodiment)

In the above-described third embodiment, the uneven portion 30 is configured by the plurality of grooves 301, but the present disclosure is not limited to this. The uneven portion 30 may be formed by a plurality of protrusions, for example. When the uneven portion 30 is formed by a plurality of protrusions, vortices are generated in the gaps between the plurality of protrusions when the airflow passes near the inner wall surface 181 forming the main flow passage 18. Since this vortex plays a role of a ball bearing, the same effects as those of the above-described third embodiment can be obtained by this modification.

In the above-described third embodiment, the uneven portion 30 is formed inside of the duct 16 substantially in the entire area of the inner surface of the partition portion 26 that partitions the main passage 18 and the auxiliary passage 24 from each other, but the present disclosure is not limited to this. The uneven portion 30 may be formed in a part area of the inner surface of the partition portion 26. In the above-described third embodiment, an example in which the enlarged portion 180 is provided in the main flow passage 18 has been described, but the present disclosure is not limited to this. The air discharge device 1 may have a configuration in which only the uneven portion 30 is arranged with respect to the main flow passage 18 but the enlarged portion 180 may be not provided with respect to the main flow passage 18. In this case, the uneven portion 30 functions as the layer reduction structure that reduces the thickness δ of the velocity boundary layer BL formed along the inner wall surface 141 of the main hole 14.

Further, in the above-described third embodiment, the structure including the enlarged portion 180 and the uneven portion 30 is illustrated as the layer reduction structure, but the layer reduction structure is not limited to this. The layer reduction structure may be, for example, a structure including the enlarged portion 180, the contraction fin 28 and the uneven portion 30, or a structure including the contraction fin 28 and the uneven portion 30.

Fourth Embodiment

Next, a fourth embodiment will be described with reference to FIGS. 16 to 18. The present embodiment is different from the first embodiment in that a main hole 14 is expanded in a trumpet shape. In the present embodiment, a difference part different from the first embodiment will be mainly described, and description for a part similar to the first embodiment will be omitted.

Figure 16:
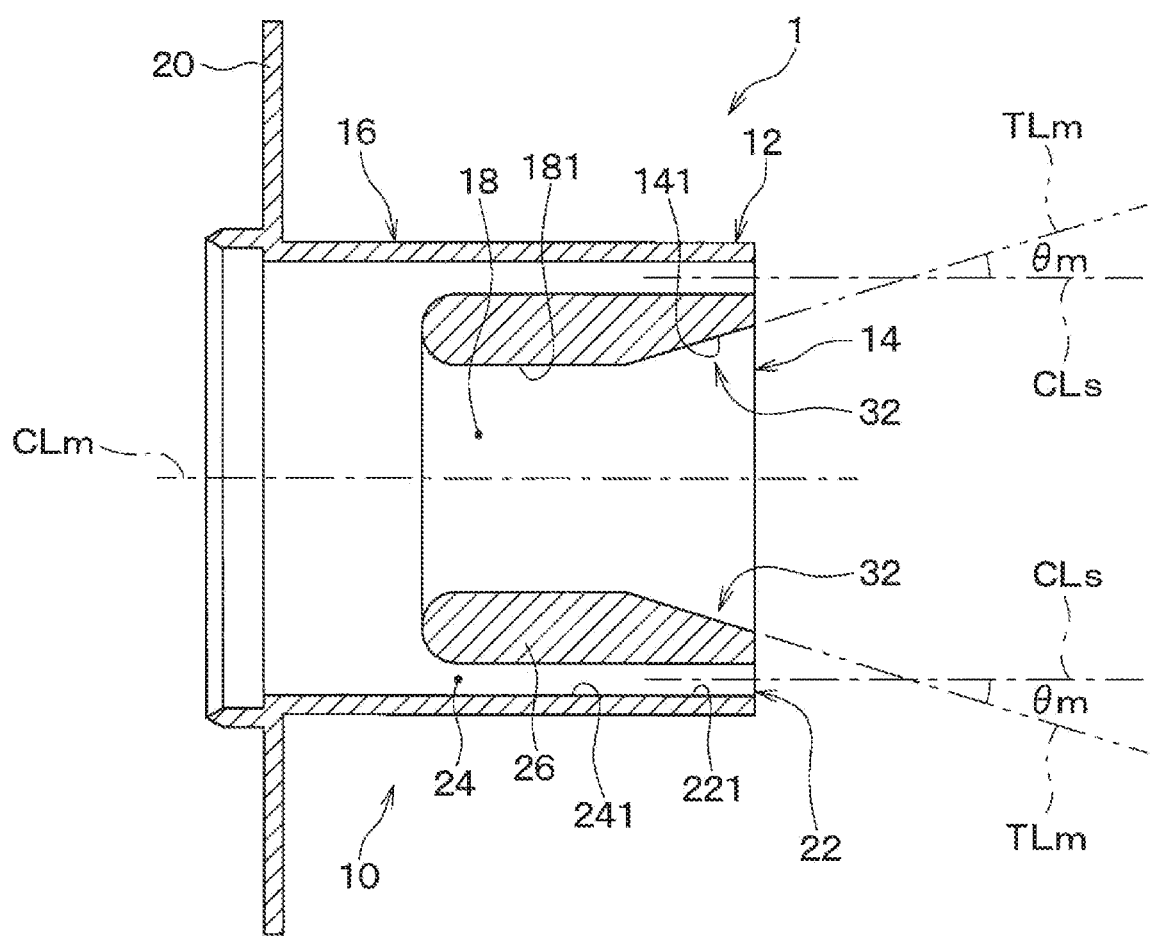
FIG. 16 is a schematic sectional view of an air discharge device according to a fourth embodiment.

As shown in FIG. 16, in an air discharge unit 10 of the present embodiment, the main hole 14 is expanded at a downstream side in a trumpet shape. Specifically, an inner wall surface 141 of the main hole 14 is provided with a main inclined structure 32 inclined with respect to the center line CLs of the auxiliary hole 22 such that a tangent line TLm extending along the inner wall surface 141 of the main hole 14 intersects with the center line CLs of the auxiliary hole 22 downstream of the outlet of the auxiliary hole 22. In other words, the inner wall surface 141 of the main hole 14 is inclined in a downstream area so that the tangent line TLm extending along the inner wall surface 141 intersects the center line CLm of the main hole 14 over the entire circumference. Specifically, the tangent line TLm is a tangent line extending along the inner wall surface 141 at a downstream end portion of the inner wall surface 141 of the main hole 14.

Here, in the velocity boundary layer BL formed on the downstream side of the outlet of the main hole 14, the lateral vortex Vt tends to start and generate at a position apart from the main hole 14, not immediately after the main hole 14. For example, the lateral vortex Vt may start to be generated at a position separated by at least twice the minor diameter of the main hole 14. Therefore, it is desirable that the inner wall surface 141 of the main hole 14 is set within a range where the angle θm formed by the tangent line TLm and the center line CLs is an acute angle (for example, within a range of 1° to) 30°.

Further, in the air discharge unit 10 of the present embodiment, the cross-sectional area Sc of the main flow passage 18 at an upstream end is smaller than the open area Sm of the main hole 14. That is, the air discharge unit 10 of the present embodiment is not provided with a configuration corresponding to the enlarged portion 180 of the first embodiment. The cross-sectional area Sc of the main flow passage 18 is the cross-sectional area at the upstream end of the partition portion 26.

Figure 17:
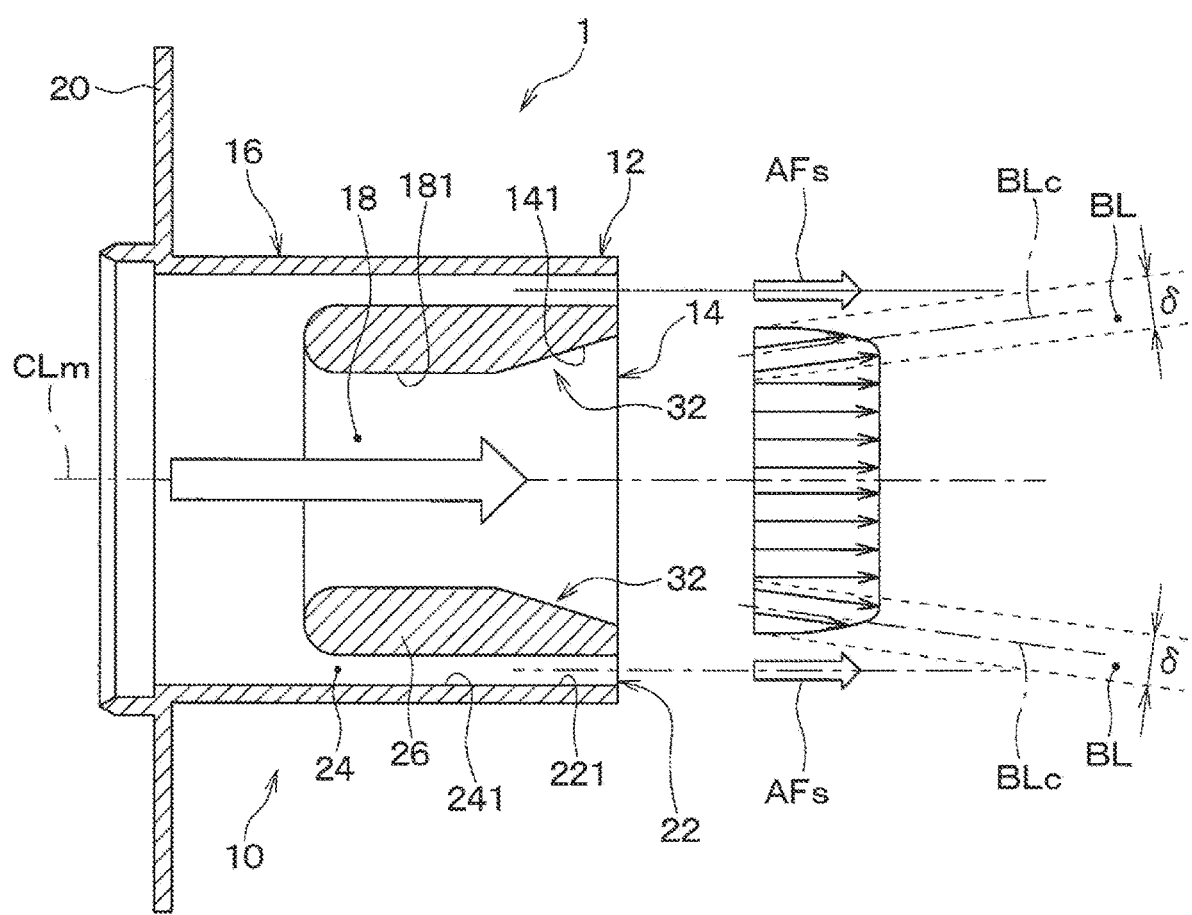
FIG. 17 is a diagram for explaining a velocity gradient of a working air flow at a downstream area of a main hole of the air discharge device, according to the fourth embodiment.
Figure 18:
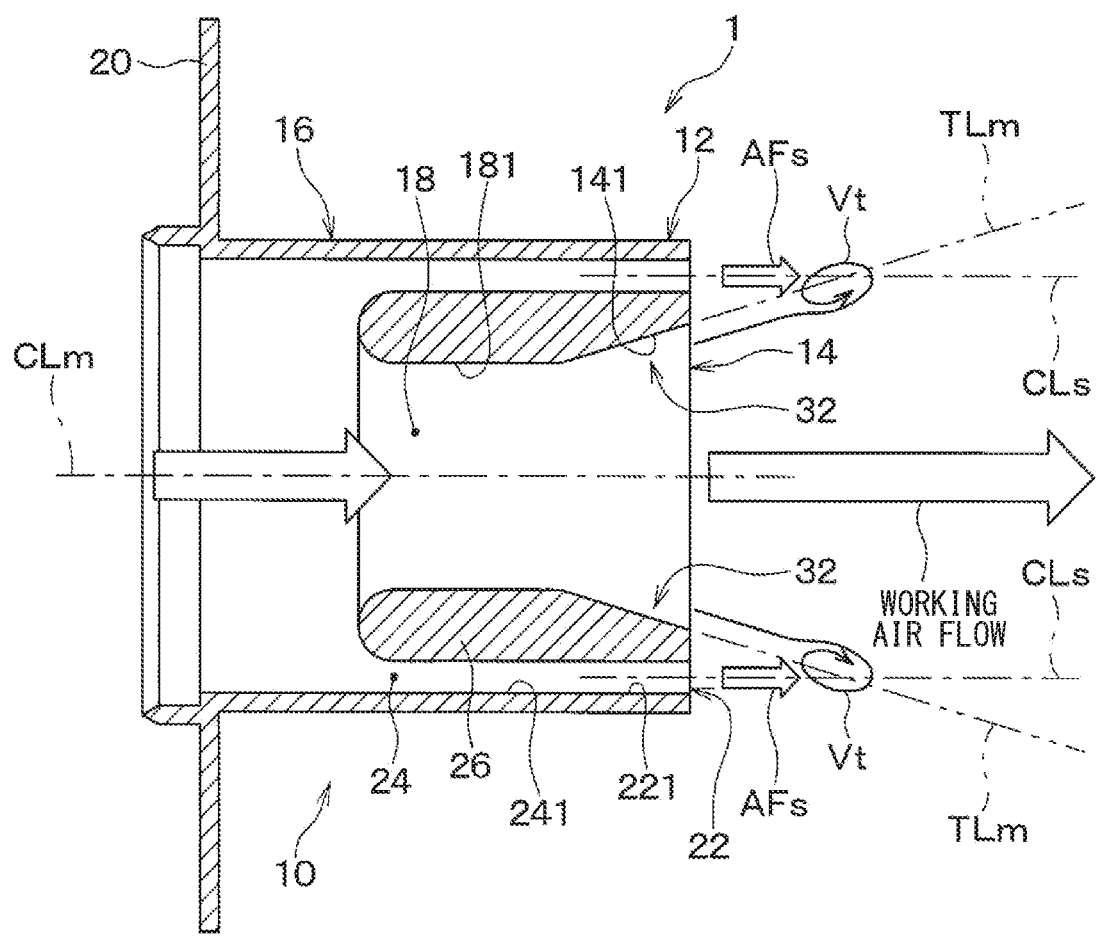
FIG. 18 is a diagram for explaining a state of the working air flow at the downstream area of the main hole of the air discharge device, according to the fourth embodiment.

In the air discharge unit 10 of the present embodiment configured as described above, when the conditioned air temperature-adjusted by the air conditioning unit flows into the duct 16, the conditioned air passes through the main flow passage 18 and flows into the main hole 14, as shown in FIG. 17. Then, the airstream flowing into the main flow passage 18 is blown out of the main hole 14. At this time, since the main hole 14 is expanded in a trumpet shape, a velocity boundary layer BL of the working air flow is formed downstream of the outlet of the main hole 14 to be separated from the center line CLm of the main hole 14. That is, at a downstream side of the outlet of the main hole 14, the central portion BLc of the velocity boundary layer BL of the working air flow approaches the mainstream of the support air flow blown out of the auxiliary hole 22.

That is, in the air discharge unit 10 of the present embodiment, the mainstream AFs of the support air flow blown out of the auxiliary hole 22 flows in a state of approaching the central portion BLc of the thickness δ of the velocity boundary layer BL. In such a case, because the mainstream of the support air flow is closer to the vortex center of the lateral vortex Vt generated in the velocity boundary layer BL, the lateral vortex Vt can be easily disturbed by the support air flow, and a suppression relative to the development of the lateral vortex Vt generated in the velocity boundary layer BL can be effectively obtained, as shown in FIG. 18. In the present embodiment, a main inclined structure 32 provided on the inner wall surface 141 of the main hole 14 functions as a vortex suppression structure.

In the air discharge device 1 of the present embodiment described above, the main inclined structure 32 is provided on the inner wall surface 141 forming the main hole 14. According to this, the flow velocity distribution near the inner wall surface 141 of the main hole 14 spreads to the support air flow discharged from the auxiliary hole 22 at a downstream side of the outlet of the main hole 14, and thus the central portion BLc of the thickness δ of the velocity boundary layer BL can be made closer to the support air flow discharged from the auxiliary hole 22 at a downstream side of the outlet of the main hole 14. As a result, the development of the lateral vortex Vt in the velocity boundary layer BL can be sufficiently suppressed by the support air flow blown out from the auxiliary hole 22.

In the air discharge device 1 of the present embodiment, the air suction from the surroundings of the working air flow blown out of the main hole 14 can be suppressed, and attenuation of the flow velocity of the working air flow blown out of the main hole 14 can be reduced. Therefore, the reaching distance of the working air flow discharged from the main hole 14 can be made longer.

(Modification of Fourth Embodiment)

In the above-described fourth embodiment, the inner wall surface 141 of the main hole 14 is inclined so that the tangent line TLm extending along the inner wall surface 141 intersects the center line CLm of the main hole 14, over the entire circumference. However, the present disclosure is not limited thereto. The air discharge device 1 may have a structure in which, for example, one portion of the inner wall surface 141 of the main hole 14 is inclined such that the tangent line TLm extending along the inner wall surface 141 intersects the center line CLm of the main hole 14.

In the above-described fourth embodiment, the inner wall surface 141 of the main hole 14 extends linearly, but the present invention is not limited to this. The inner wall surface 141 of the main hole 14 may extend in a curved shape. In this case, the tangent line TLm is a tangent line at a downstream end of the inner wall surface 141 of the main hole 14.

In the above-described fourth embodiment, the main inclined structure 32 is applied to the main hole 14, but the enlarged portion 180, the contraction fin 28, and the uneven portion 30 described in the first to third embodiments are not applied. However, the present disclosure is not limited to this. In the air discharge device 1, for example, at least one of the enlarged portion 180, the contraction fin 28, and the uneven portion 30 described in the first to third embodiments may be provided in the air discharge unit 10 in which the main inclined structure 32 is applied to the main hole 14.

Fifth Embodiment

Next, a fifth embodiment will be described with reference to FIGS. 19 to 21. The air discharge device 1 of the present embodiment has a structure different from the first embodiment, in which a tangent line TLs extending along the inner wall surface 221 of each of the plurality of auxiliary holes 22 intersects with the center line CLm of the main hole 14 at a downstream side of the outlet of the main hole 14. In the present embodiment, a difference part different from the first embodiment will be mainly described, and description for a part similar to the first embodiment will be omitted.

Figure 19:
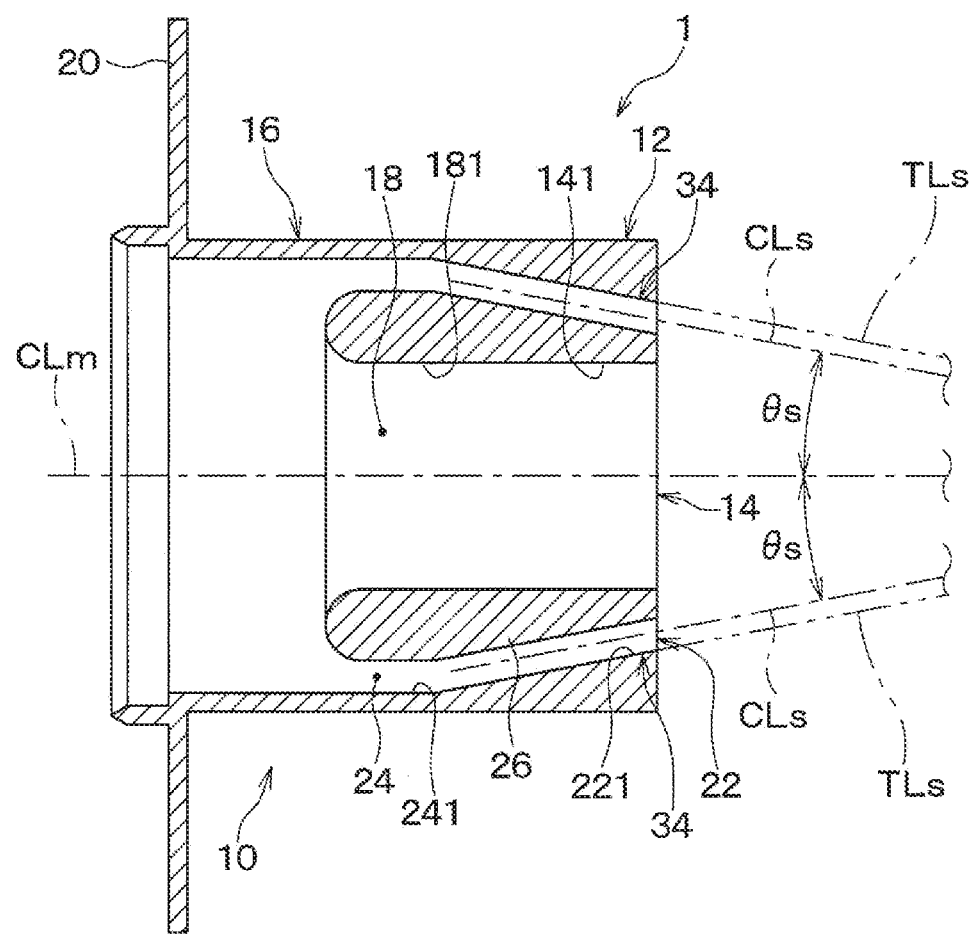
FIG. 19 is a schematic sectional view of an air discharge device according to a fifth embodiment.

As shown in FIG. 19, the air discharge unit 10 is configured such that the tangent line TLs extending along the inner wall surface 221 of each of the plurality of auxiliary holes 22 intersects with the center line CLm of the main hole 14 at the downstream side of the outlet of the main hole 14. Specifically, the tangent line TLs is a tangent line extending along the inner wall surface 221 at the downstream end portion of the inner wall surface 221 of each auxiliary hole 22.

Specifically, an auxiliary inclined structure 34 is provided in a part of the inner wall surface 221 of each auxiliary hole 22 so that the tangent line TLs extending along the inner wall surface 221 of the auxiliary hole 22 intersects with the center line CLm of the main hole 14 at a downstream side of the outlet of the main hole 14. In other words, the inner wall surface 221 of each auxiliary hole 22 is inclined such that the tangent line TLs extending along the inner wall surface 221 intersects the center line CLm of the main hole 14. For the same reason as in the fourth embodiment, the inner wall surface 221 of each auxiliary hole 22 is within a range in which the angle $\theta s$ formed by the tangent line TLs and the center line CLm is an acute angle (for example, in a range of 1° to 30°).

Further, in the air discharge unit 10 of the present embodiment, the cross-sectional area Sc of the main flow passage 18 at an upstream end is smaller than the open area Sm of the main hole 14. That is, the air discharge unit 10 of the present embodiment is not provided with a configuration corresponding to the enlarged portion 180 of the first embodiment.

Figure 20:
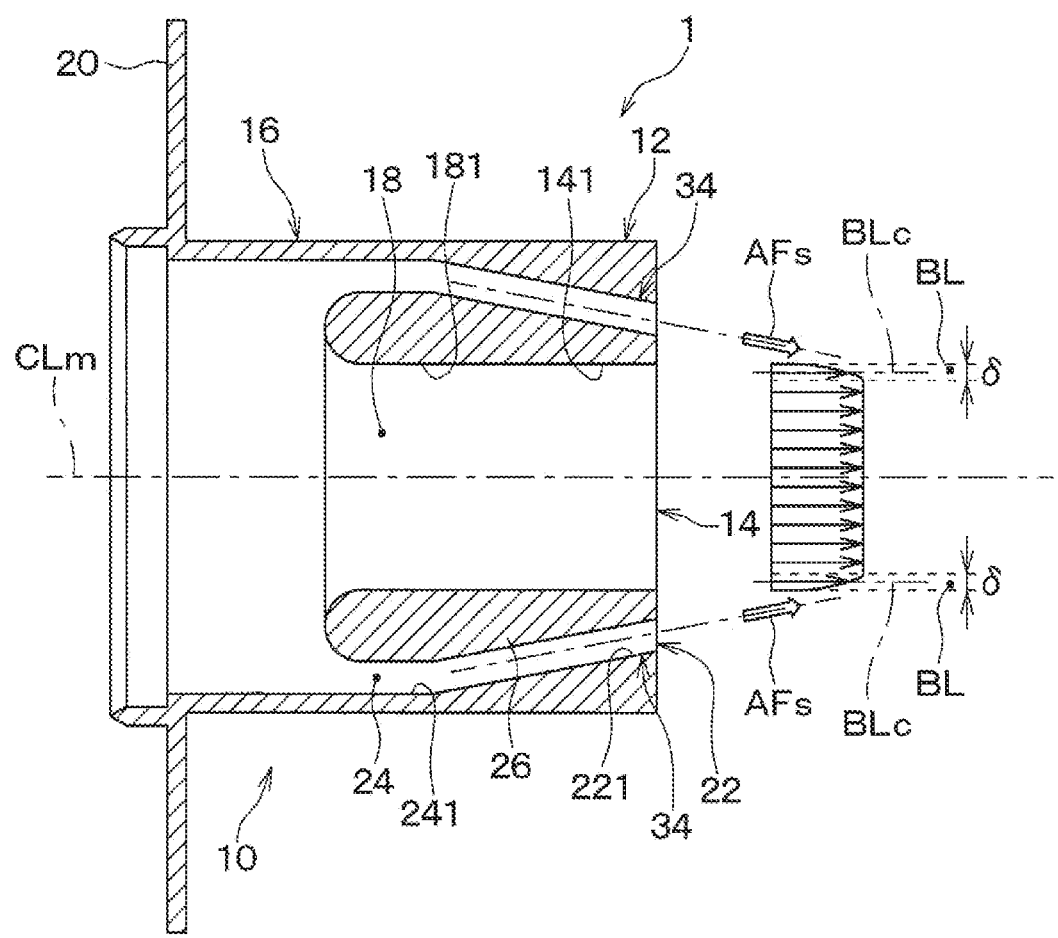
FIG. 20 is a diagram for explaining a velocity gradient of a working air flow at a downstream area of a main hole of the air discharge device, according to the fifth embodiment.
Figure 21:
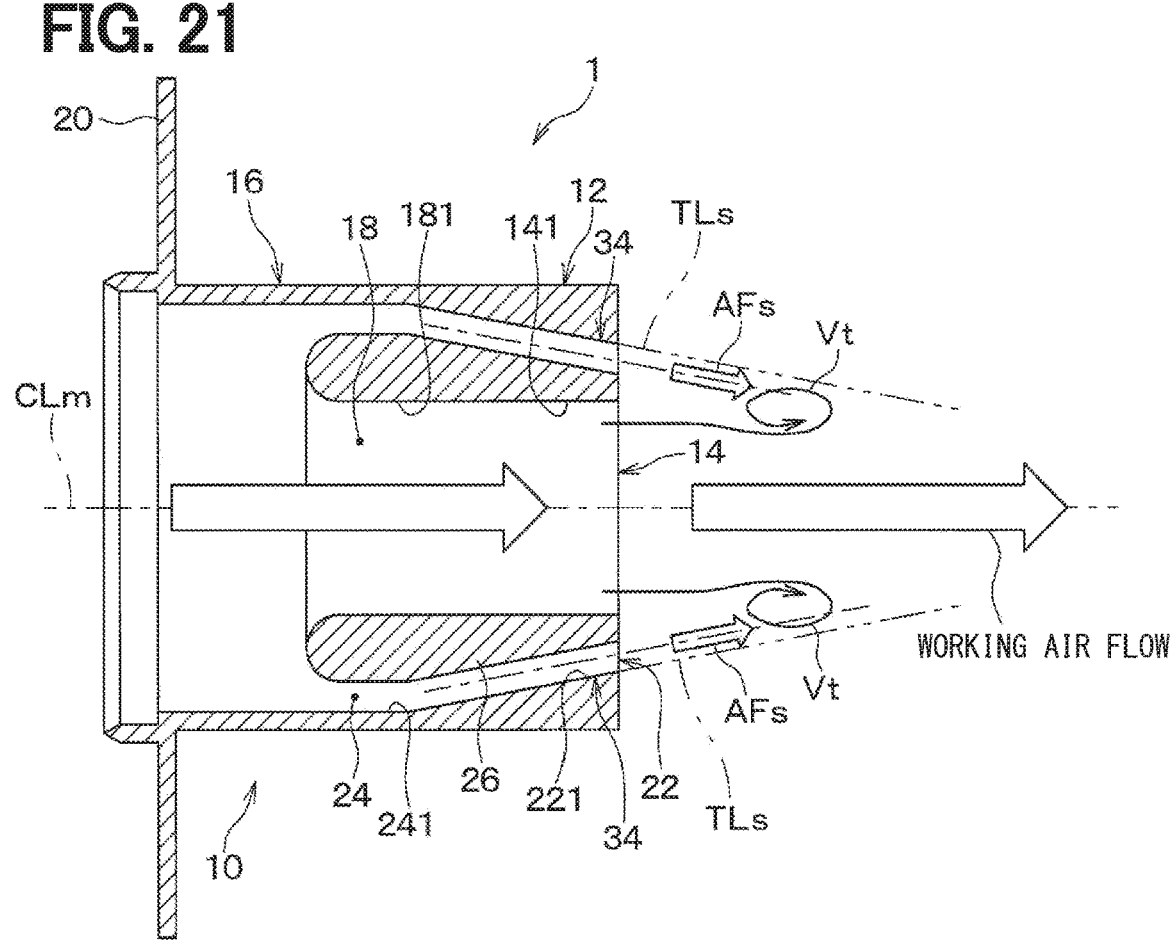
FIG. 21 is a diagram for explaining a state of the working air flow at the downstream area of the main hole of the air discharge device, according to the fifth embodiment.

In the air discharge unit 10 of the present embodiment configured as described above, when the conditioned air temperature-adjusted by the air conditioning unit flows into the duct 16, the conditioned air passes through the main flow passage 18 and flows into the main hole 14, as shown in FIG. 20. Then, the airstream flowing into the main flow passage 18 is blown out of the main hole 14 as the working air flow.

When the working air flow is blown from the main hole 14, a velocity boundary layer BL of the working air flow is formed along the inner wall surface 141 of the main hole 14 at a downstream side of the outlet of the main hole 14. It is considered that a lateral vortex Vt is likely to occur in the velocity boundary layer BL near the central portion BLc of the thickness $\delta$.

On the other hand, because the tangent line TLs extending along the inner wall surface 221 of the auxiliary hole 22 is inclined with respect to the center line CLm of the main hole 14, the mainstream of the support air flow blown out of the auxiliary hole 22 is closer to the central portion BLc of the velocity boundary layer BL of the working air flow.

That is, at a downstream side of the outlet of the main hole 14, the mainstream of the support air flow blown out of the auxiliary hole 22 approaches the central portion BLc of the velocity boundary layer BL of the working airflow.

That is, in the air discharge unit 10 of the present embodiment, the mainstream AFs of the support air flow blown out of the auxiliary hole 22 flows in a state of approaching the central portion BLc of the thickness $\delta$ of the velocity boundary layer BL. In such a case, because the mainstream of the support air flow is closer to the vortex center of the lateral vortex Vt generated in the velocity boundary layer BL, the lateral vortex Vt can be easily disturbed by the support air flow, and a suppression relative to the development of the lateral vortex Vt generated in the velocity boundary layer BL can be effectively obtained, as shown in FIG. 21. In the present embodiment, the auxiliary inclined structure 34 provided on the inner wall surface 221 of the auxiliary hole 22 functions as a vortex suppression structure.

In the air discharge device 1 of the present embodiment described above, the auxiliary inclined structure 34 is provided on the inner wall surface 241 forming the auxiliary hole 22. According to this, the supporting airstream blown out of the auxiliary hole 22 can be made closer to the central portion BLc of the thickness $\delta$ of the velocity boundary layer BL formed at the downstream side of the outlet of the main hole 14. As a result, the development of the lateral vortex Vt in the velocity boundary layer BL can be sufficiently suppressed by the support air flow blown out from the auxiliary hole 22. Thus, in the air discharge device 1 of the present embodiment, the air suction from the surroundings of the working air flow blown out of the main hole 14 can be suppressed, and attenuation of the flow velocity of the working air flow blown out of the main hole 14 can be reduced. Therefore, the reaching distance of the working air flow discharged from the main hole 14 can be made longer.
(Modification of the Fifth Embodiment)

In the above-described fifth embodiment, the inner wall surface 221 of each auxiliary hole 22 is exemplified such that the tangent line TLs extending along the inner wall surface 221 is inclined to intersect the center line CLm of the main hole 14, but the present disclosure is not limited thereto. The air discharge device 1 may be configured, for example, in a structure in which the inner wall surface 221 of some of the plurality of auxiliary holes 22 is inclined such that a tangent line TLs extending along the inner wall surface 221 intersects with the center line CLm of the main hole 14.

In the above-described fifth embodiment, the inner wall surface 221 of the auxiliary hole 22 extends linearly, but the present disclosure is not limited to this. The inner wall surface 221 of the auxiliary hole 22 may extend in a curved shape. In this case, the tangent line TLs becomes a tangent line at the downstream end of the inner wall surface 221 of the auxiliary hole 22.

In the above-described fifth embodiment, the auxiliary inclined structure 34 is applied to the auxiliary hole 22, but the enlarged portion 180, the contraction fin 28, and the uneven portion 30 described in the first to third embodiments are not applied. However, the present disclosure is not limited to this. In the air discharge device 1, for example, a layer reduction structure of at least one of the enlarged portion 180, the contraction fin 28, and the uneven portion 30 described in the first to third embodiments may be provided in the air discharge unit 10 in which the auxiliary inclined structure 34 is applied to the auxiliary hole 22.

Further, in the air discharge device 1, the inclined structure 32 provided in the main hole 14 described in the fourth embodiment may be applied to the air discharge unit 10 in which the auxiliary inclined structure 34 is provided in the auxiliary hole 22 as in the above-described fifth embodiment.

Sixth Embodiment

Next, a sixth embodiment will be described with reference to FIGS. 22 to 25. In the present embodiment, a positional relationship between the main hole 14 and the auxiliary hole 22 in the hole forming member 12 is different from that in the first embodiment. In the present embodiment, a difference part different from the first embodiment will be mainly described, and description for a part similar to the first embodiment will be omitted.

Figure 22:
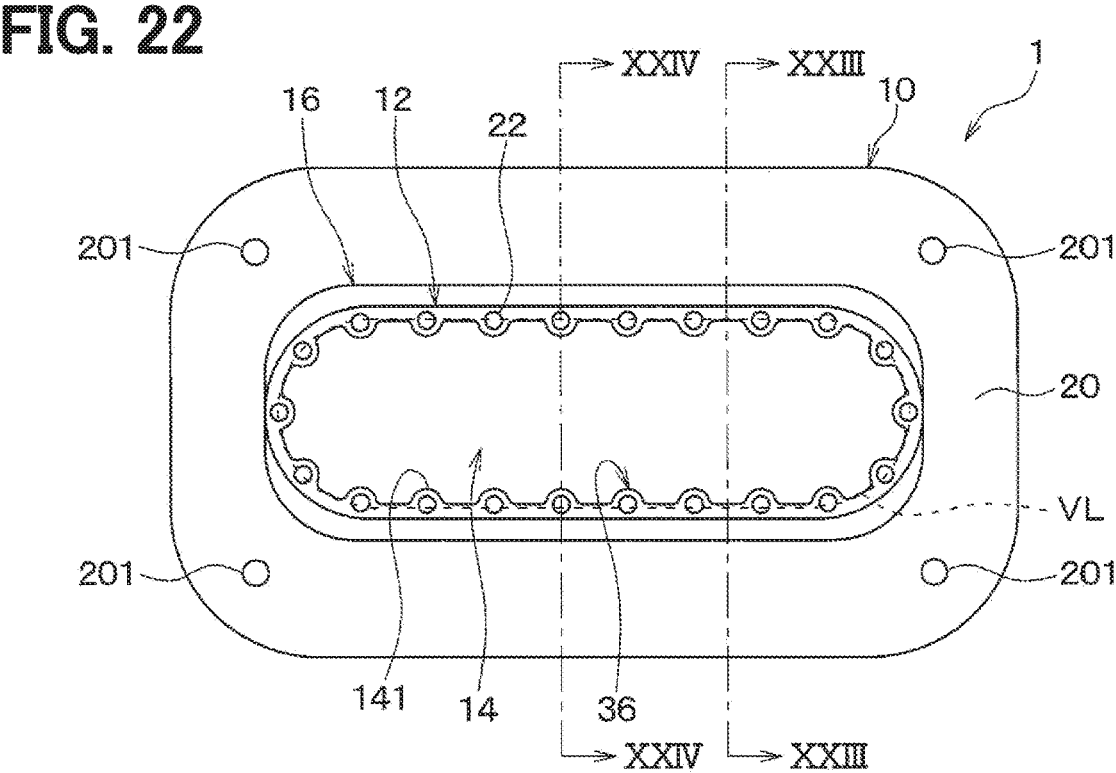
FIG. 22 is a schematic front view of an air discharge device according to a sixth embodiment.

As shown in FIG. 22, in the air discharge unit 10 of the present embodiment, a part of the main hole 14 and a part of the auxiliary hole 22 overlap each other in the circumferential direction around the center line CLm of the main hole 14, to have an overlapped structure 36.

Specifically, the main hole 14 has an oval shape as a whole, and an outer edge of the main hole 14 has a wave shape curved in meandering. Then, the plurality of auxiliary holes 22 are formed in a portion protruding inward in the wave-shaped outer edge of the main hole 14, to be overlapped with a part of the main hole 14. That is, the plurality of auxiliary holes 22 are formed in the hole forming member 12 so that at least a part of the auxiliary holes 22 is located inside a virtual line VL connecting the outermost edges of the main hole 14.

Figure 23:
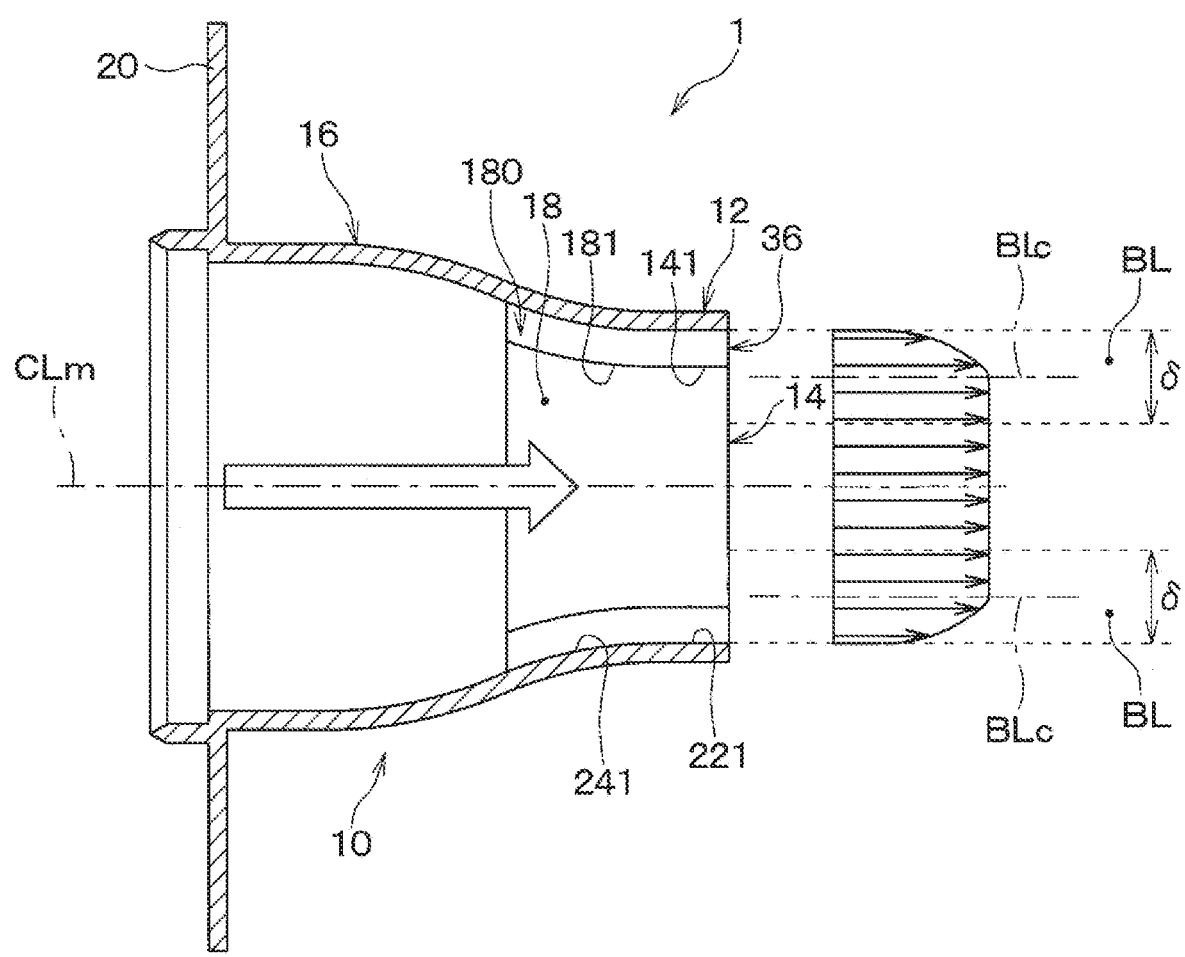
FIG. 23 is a diagram for explaining a velocity gradient of a working air flow at a downstream area of a main hole of the air discharge device, according to the sixth embodiment.
Figure 24:
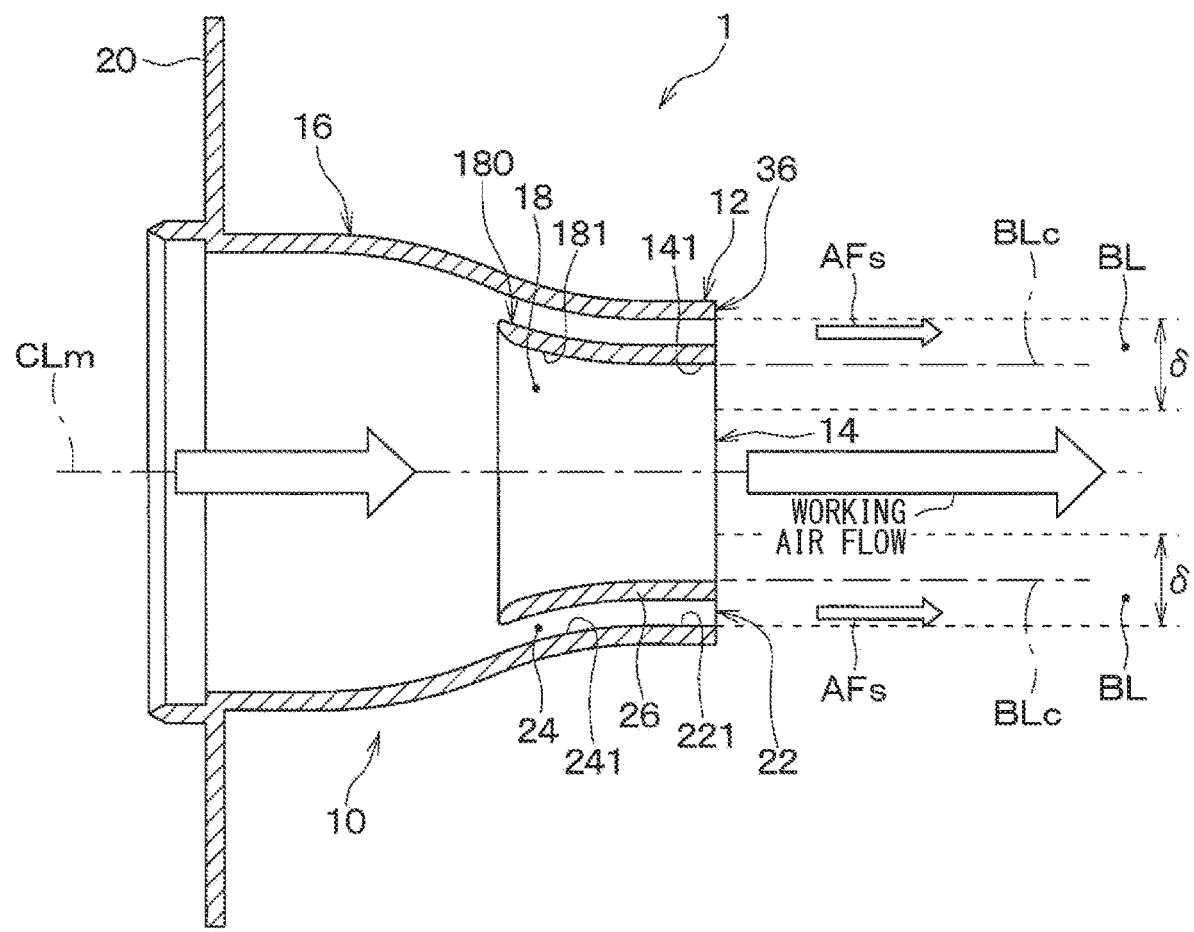
FIG. 24 is a diagram for explaining a relationship between the working air flow and a support air flow at the downstream area of the main hole of the air discharge device, according to the sixth embodiment.

In the air discharge unit 10 of the present embodiment configured as described above, when the conditioned air temperature-adjusted by the air conditioning unit flows into the duct 16, the conditioned air passes through the main flow passage 18 and flows into the main hole 14, as shown in FIGS. 23 and 24. Then, the airstream flowing into the main flow passage 18 is blown out of the main hole 14 as the working air flow. FIG. 23 is a cross-sectional view taken along a line XXIII-XXIII of FIG. 22. FIG. 24 is a cross-sectional view taken along a line XXIV-XXIV of FIG. 22.

When the working air flow is blown from the main hole 14, a velocity boundary layer BL of the working air flow is formed along the inner wall surface 141 of the main hole 14 at a downstream side of the outlet of the main hole 14. It is considered that a lateral vortex Vt is likely to occur in the velocity boundary layer BL near the central portion BLc of the thickness δ.

On the other hand, a part of the main hole 14 and a part of the auxiliary holes 22 overlap each other in the circumferential direction centered on the center line CLm of the main hole 14. Therefore, the mainstream of the support air flow blown out of the auxiliary hole 22 approaches the central portion BLc of the velocity boundary layer BL of the working air flow blown out of the main hole 14. That is, at a downstream side of the outlet of the main hole 14, the mainstream of the support air flow blown out of the auxiliary hole 22 approaches the central portion BLc of the velocity boundary layer BL of the working air flow.

Figure 25:
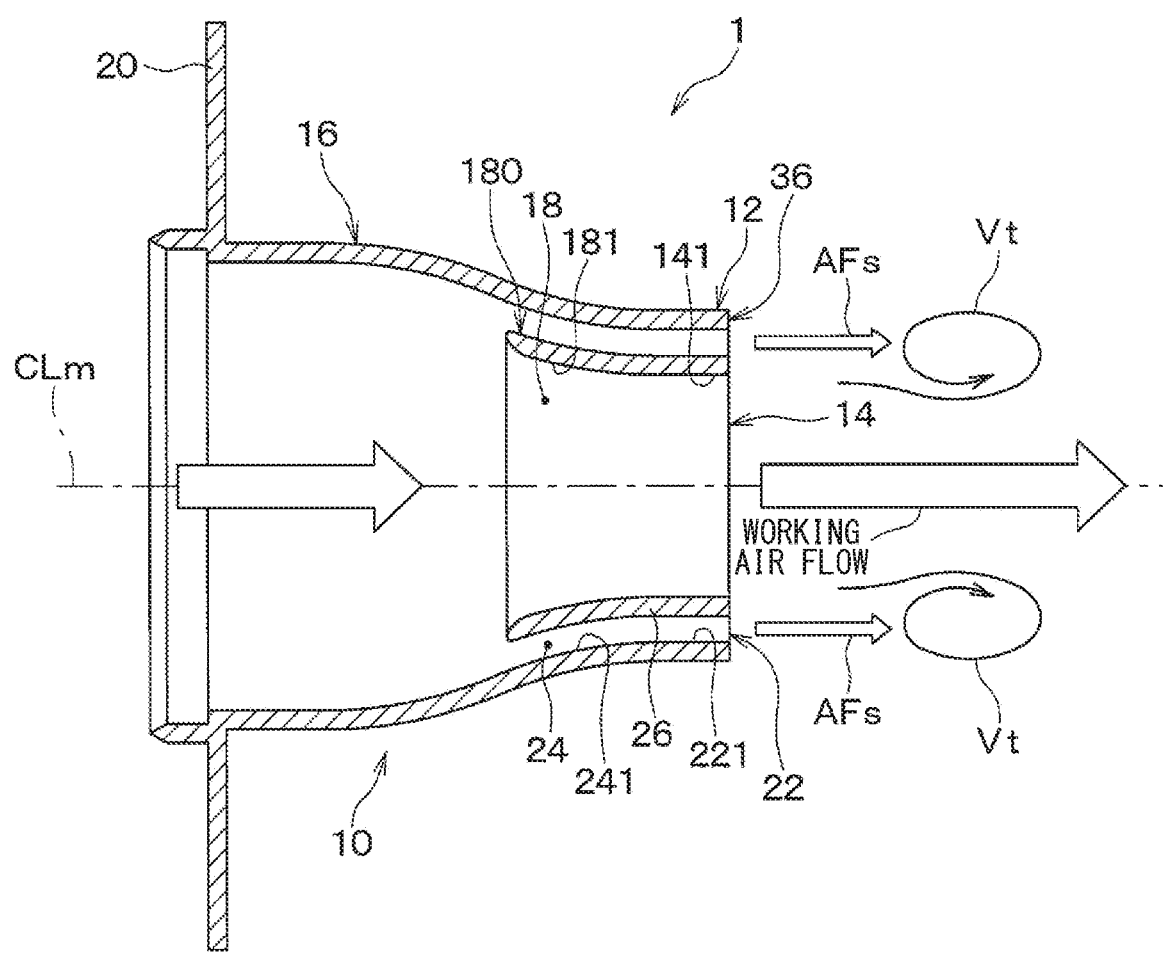
FIG. 25 is a diagram for explaining a state of the working air flow at the downstream area of the main hole of the air discharge device, according to the sixth embodiment.

That is, in the air discharge unit 10 of the present embodiment, the mainstream AFs of the support air flow blown out of the auxiliary hole 22 flows in a state of approaching the central portion BLc of the thickness δ of the velocity boundary layer BL. In such a case, because the mainstream of the support air flow is closer to the vortex center of the lateral vortex Vt generated in the velocity boundary layer BL, the lateral vortex Vt can be easily disturbed by the support air flow, and a suppression relative to the development of the lateral vortex Vt generated in the velocity boundary layer BL can be effectively obtained, as shown in FIG. 25. In the present embodiment, the enlarged portion 180 and the overlapped structure 36 function as a vortex suppression structure.

In the air discharge device 1 of the present embodiment described above, the overlapped structure 36 in which the main hole 14 and the auxiliary hole 22 overlap each other in the circumferential direction centering on the center line CLm of the main hole 14 is provided in the air discharge unit 10. According to this, the supporting airstream blown out of the auxiliary hole 22 can be made closer to the central portion BLc of the thickness δ of the velocity boundary layer BL formed at the downstream side of the outlet of the main hole 14. As a result, the development of the lateral vortex Vt in the velocity boundary layer BL can be sufficiently suppressed by the support air flow blown out from the auxiliary hole 22. Thus, in the air discharge device 1 of the present embodiment, the air suction from the surroundings of the working air flow blown out of the main hole 14 can be suppressed, and attenuation of the flow velocity of the working air flow blown out of the main hole 14 can be reduced. Therefore, the reaching distance of the working air flow discharged from the main hole 14 can be made longer.
(Modification of Sixth Embodiment)

In the above-described sixth embodiment, as the overlapped structure 36, an example in which a part of the main hole 14 and a part of the auxiliary holes 22 overlap each other in the circumferential direction centered on the center line CLm of the main hole 14 has been described; however, the present disclosure is not limited to this. The overlapped structure 36 may have a structure in which a part of the main hole 14 and the entire auxiliary holes 22 overlap each other in the circumferential direction centered on the center line CLm of the main hole 14.

In the above-described sixth embodiment, an example in which the enlarged portion 180 is provided in the main flow passage 18 has been described, but the present disclosure is not limited to this. The air discharge device 1 may have a configuration in which only the overlapped structure 36 is arranged with respect to the main flow passage 18 but the enlarged portion 180 may be not provided with respect to the main flow passage 18.

In the above-described sixth embodiment, the enlarged portion 180 and the overlapped structure 36 are applied to the air discharge unit 10, but the contraction fin 28 and the uneven portion 30 described in the second and third embodiments are not applied thereto. However, the present disclosure is not limited to this. In the air discharge device 1, for example, at least one of the contraction fin 28, and the uneven portion 30 described in the second and third embodiments may be provided in the air discharge unit 10 in which the overlapped structure 36 is configured. Further, in the air discharge device 1, the inclined structure 32 provided in the main hole 14 described in the fourth embodiment may be applied to the air discharge unit 10 in which the overlapped structure 36 is configured.

Seventh Embodiment

Next, a seventh embodiment will be described with reference to FIG. 26. The present embodiment is different from the first embodiment in that communication holes 261 for communicating the main flow passage 18 and the auxiliary flow passage 24 are provided in the partition portion 26. In the present embodiment, a difference part different from the first embodiment will be mainly described, and description for a part similar to the first embodiment will be omitted.

Figure 26:
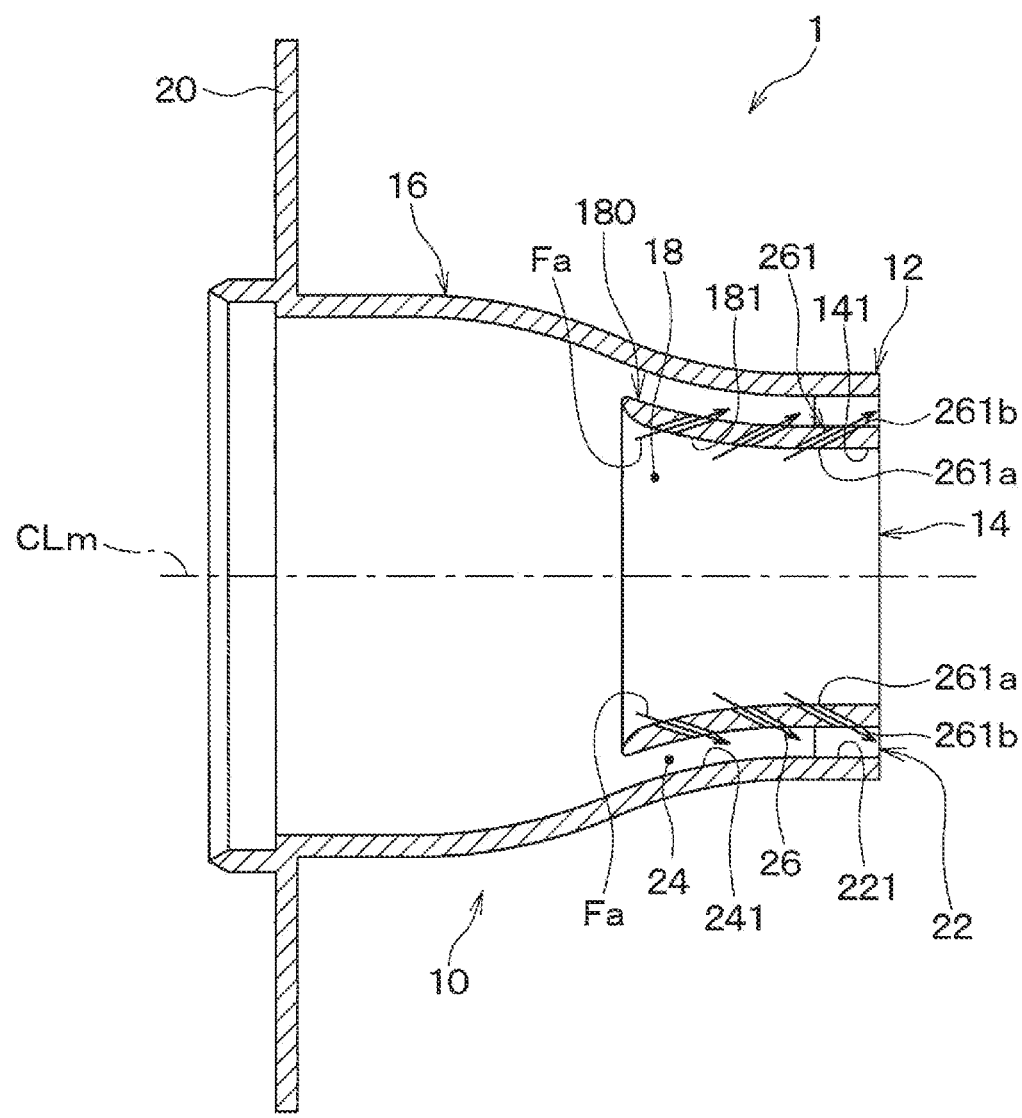
FIG. 26 is a schematic sectional view of an air discharge device according to a seventh embodiment.

As shown in FIG. 26, in the air discharge unit 10 of the present embodiment, the communication hole 261, through which the main flow passage 18 and the auxiliary flow passage 24 communicate with each other, is provided in the partition portion 26 that partitions the main flow passage 18 and the auxiliary flow passage 24 from each other. A plurality of communication holes 261 are formed in the partition portion 26 from the upstream side to the downstream side of the air flow.

The communication hole 261 is a through hole through which a part of the air flowing through the main flow passage 18 is guided to the auxiliary flow passage 24. The communication hole 261 has a main open 261a that is open to the main flow passage 18 of the partition portion 26 and an auxiliary open 261b that is open to the auxiliary flow passage 24 of the partition portion 26. The communication hole 261 is provided such that the main open 261a is on an upstream side of the air flow with respect to the auxiliary open 261b.

In the air discharge unit 10 of the present embodiment configured as described above, the partition portion 26 is provided with the communication hole 261. Therefore, as shown by the arrow Fa in FIG. 26, a part of the air flowing through the main flow passage 18 is guided to the auxiliary flow passage 24 through the communication hole 261. The air stream passing through the communication holes 261 facilitates the air flow along the inner wall surface 181 forming the main flow passage 18. As a result, in the main flow passage 18, a flow velocity difference between the vicinity of the center line CLm of the main hole 14 and the vicinity of the inner wall surface 181 defining the main flow passage 18 becomes small. Thus, the thickness δ of the velocity boundary layer BL formed downstream of the outlet of the main hole 14 can be smaller than that in the first embodiment.

In the air discharge unit 10 of the present embodiment, the mainstream of the support air flow blown out of the auxiliary hole 22 flows in a state of approaching the central portion BLc of the thickness δ of the velocity boundary layer BL. In such a case, because the mainstream of the support air flow is closer to the vortex center of the lateral vortex Vt generated in the velocity boundary layer BL, a suppression relative to the development of the lateral vortex Vt generated in the velocity boundary layer BL at the outlet side of the main hole 14 can be effectively obtained by the support air flow. In the present embodiment, the enlarged portion 180 provided in the main flow passage 18 and the communication hole 261 provided in the partition portion 26 function as a vortex suppression structure.

Although the air discharge device 1 of the present embodiment described above has the communication holes 261 provided in the partition portion 26, the other configurations may be common to the first embodiment. For that reason, the air discharge device 1 according to the present embodiment can obtain the same advantages as those in the first embodiment, based on the configuration in common with the first embodiment.

In particular, in the present embodiment, the vortex suppression structure is configured to have not only the enlarged portion 180 but also the communication hole 261 formed in the partition portion 26. According to this, it is possible to reduce the thickness δ of the velocity boundary layer BL without using additional parts, and therefore, it is suitable to be used for a moving body such as a vehicle in which an installation space is largely limited.

(Modification of the Seventh Embodiment)

In the above-described seventh embodiment, an example in which a plurality of communication holes 261 are formed in the partition portion 26 has been described, but the present disclosure is not limited to this. The air discharge unit 10 may have a single communication hole 261 formed in the partition portion 26. Further, the main open 261a and the auxiliary open 261b of the communication hole 261 may be formed at the same position in the air flow direction as long as the air flowing through the main flow passage 18 can be guided to the auxiliary flow passage 24.

In the above-described seventh embodiment, an example in which the enlarged portion 180 is provided in the main flow passage 18 has been described, but the present disclosure is not limited to this. The air discharge device 1 may have a configuration in which the enlarged portion 180 is not provided for the main flow passage 18.

Eighth Embodiment

Next, an eighth embodiment will be described with reference to FIGS. 27 and 28. The present embodiment is different from the first embodiment in that a vertical vortex generation mechanism 263 is provided at the upstream end 262 of the partition portion 26. In the present embodiment, a difference part different from the first embodiment will be mainly described, and description for a part similar to the first embodiment will be omitted.

Figure 27:
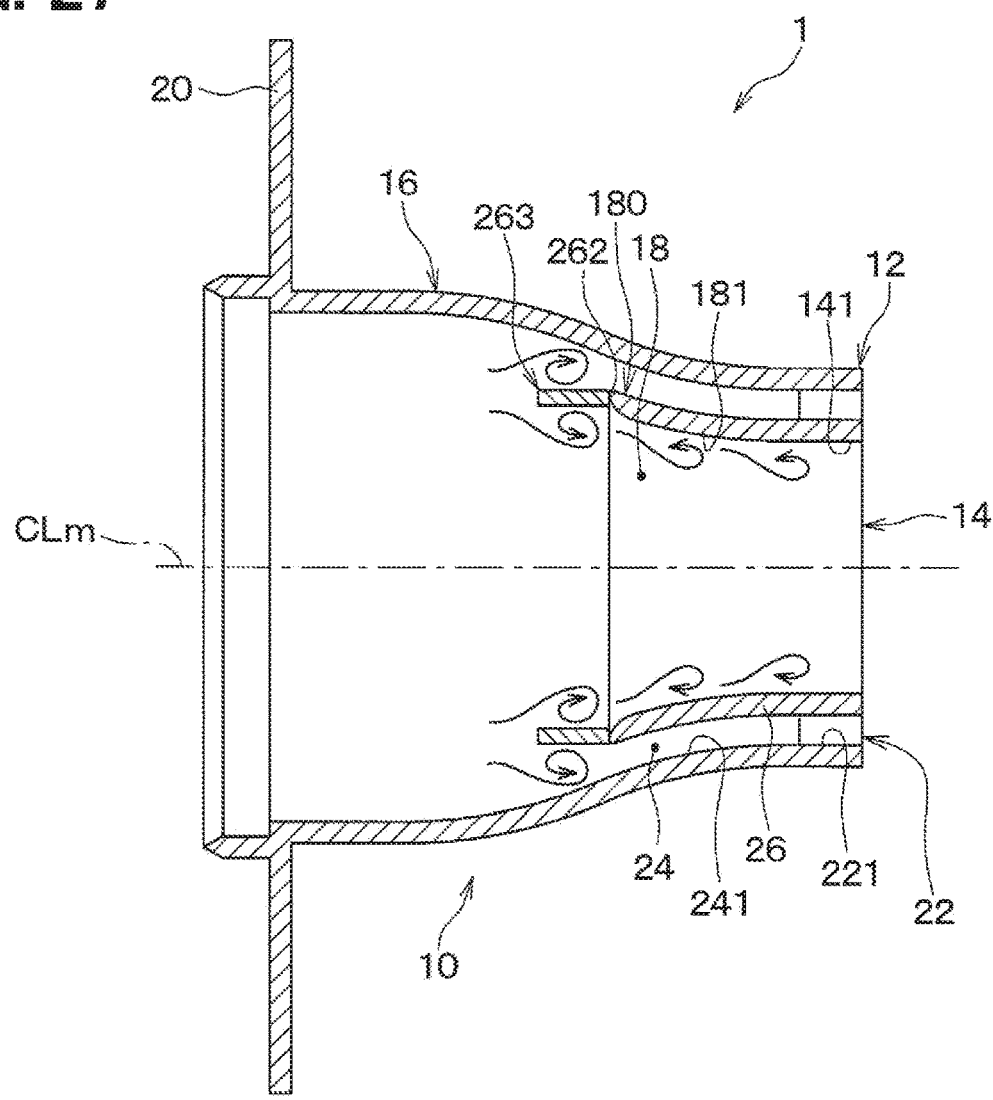
FIG. 27 is a schematic sectional view of an air discharge device according to an eighth embodiment.
Figure 28:
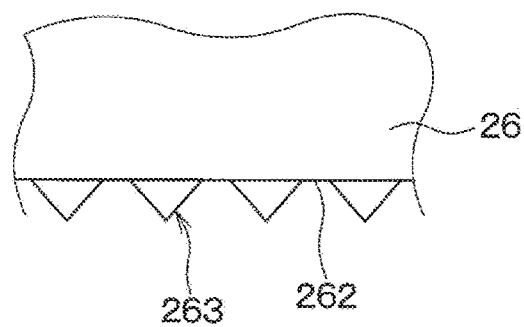
FIG. 28 is a schematic top view of a vertical vortex generation mechanism added to an air discharge device according to a ninth embodiment.

As shown in FIG. 27, the partition portion 26 is provided with a vertical vortex generation mechanism 263 having an uneven shape at an upstream end 262 located upstream of the partition portion 26 in the air flow direction. The vertical vortex generation mechanism 263 is configured to generate a vertical vortex near the upstream end 262 of the partition portion 26. The vertical vortex is a spiral vortex having a vortex center oriented in the same direction as the mainstream air flow direction.

The vertical vortex generation mechanism 263 is configured by a plurality of uneven-shaped protrusion pieces protruding from the upstream end 262 of the partition portion 26. Specifically, as shown in FIG. 28, the vertical vortex generation mechanism 263 is made of a plurality of triangular protrusion pieces formed at the upstream end 262. The protrusion piece has a sharpened shape by linearly intersecting two sides extending toward the tip.

In the air discharge unit 10 configured as above, the vertical vortex generation mechanism 263 is provided at the upstream end 262 of the partition part 26. Therefore, a vertical vortex is generated when the air passes near the upstream end 262 of the partition 26. The vertical vortex generated by the vertical vortex generation mechanism 263 is a spiral vortex having a vortex center oriented in the same direction as the airstream flowing around the partition portion 26, and includes a velocity component toward the surface of the partition portion 26. Therefore, the airstream flowing around the partition portion 26 is pressed toward the surface of the partition portion 26 by the vertical vortex generated by the vertical vortex generation mechanism 263, so as to easily flow along the inner wall surface 181 forming the main flow passage 18. As a result, in the main flow passage 18, a flow velocity difference between the vicinity of the center line CLm of the main hole 14 and the vicinity of the inner wall surface 181 defining the main flow passage 18 becomes small. Thus, the thickness δ of the velocity boundary layer BL formed downstream of the outlet of the main hole 14 can be smaller than that in the first embodiment.

The other configurations are similar to those of the first embodiment. Since the air discharge device 1 of the present embodiment has the same configuration as that of the first embodiment, it is possible to obtain the same operational effect as that of the first embodiment by the common configuration.

Particularly, in the air discharge device 1 of the present embodiment, the vertical vortex generation mechanism 263 is provided at the upstream end 262 of the partition portion 26. According to this, the airstream flowing around the partition portion 26 easily flows along the surface of the partition portion 26 (that is, the inner wall surface 181 forming the main flow passage 18) by the vertical vortex generated by the vertical vortex generation mechanism 263. Therefore, it is possible to realize a structure in which the central portion BLc of the thickness δ of the velocity boundary layer BL of the working air flow formed downstream of the outlet of the main hole 14 is brought close to the mainstream of the support air flow.

(Modification of the Eighth Embodiment)

In the above-described eighth embodiment, an example in which the enlarged portion 180 is provided in the main flow passage 18 has been described, but the present disclosure is not limited to this. The air discharge device 1 may have a configuration in which the enlarged portion 180 is not provided for the main flow passage 18. The vertical vortex generation mechanism 263 may be added to the upstream end of the contraction fin 28 described in the above second embodiment. According to this, the airstream flowing around the contraction fins 28 easily flows along the surface of the contraction fins 28 by the vertical vortices generated by the vertical vortex generation mechanism 263. As a result, it is possible to sufficiently suppress a turbulence of the working air flow by the addition of the contraction fins 28.

Ninth Embodiment

Figure 29:
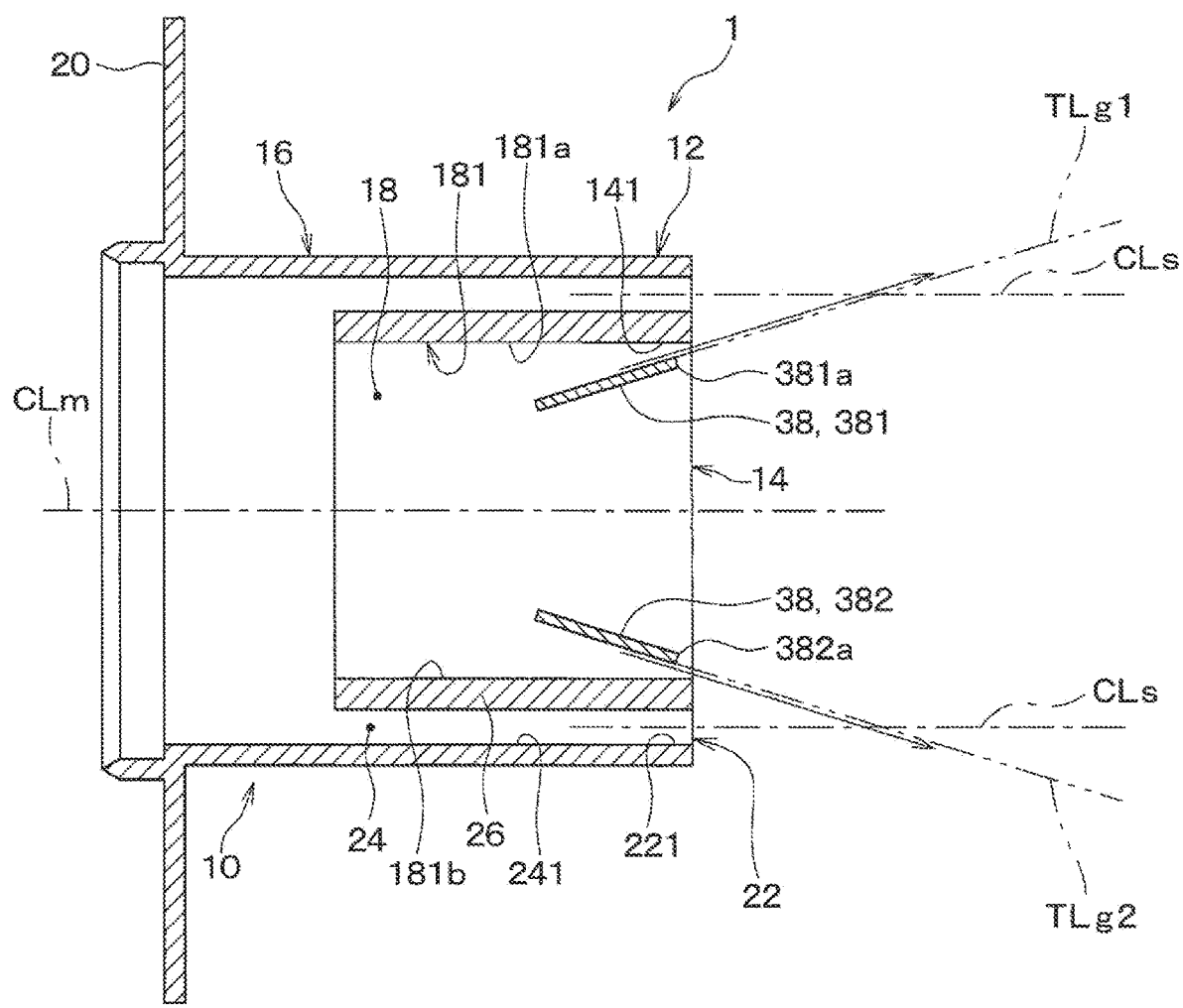
FIG. 29 is a schematic sectional view of the air discharge device according to the ninth embodiment.

Next, a ninth embodiment will be described with reference to FIG. 29. The present embodiment differs from the first embodiment in that a mainstream guide 38 is provided in the main flow passage 18. In the present embodiment, a difference part different from the first embodiment will be mainly described, and description for a part similar to the first embodiment will be omitted.

Further, in the air discharge unit 10 of the present embodiment, the cross-sectional area Sc of the main flow passage 18 at an upstream end is substantially equal to the open area Sm of the main hole 14. That is, the air discharge unit 10 of the present embodiment is not provided with a configuration corresponding to the enlarged portion 180 of the first embodiment.

Further, the air discharge unit 10 includes the mainstream guide 38 that guides the airstream flowing along the inner wall surface 181 forming the main flow passage 18 to the downstream side of the outlet of the auxiliary hole 22. The mainstream guide 38 is made of an upper main plate 381 and a lower main plate 382.

The upper main plate 381 guides the airstream flowing along an upper wall surface 181a of the inner wall surface 181 forming the main flow passage 18 to the downstream side of the auxiliary hole 22 positioned near the upper wall surface 181a. The upper main plate 381 is arranged between the upper wall surface 181a forming the main flow passage 18 and the center line CLm of the main flow passage 18. The upper main plate 381 is arranged in a posture inclined with respect to the center line CLs of the auxiliary hole 22 so that a tangent line TLg1 at the downstream end 381a of the upper main plate 381 intersects with the center line CLs of the auxiliary hole 22 at a downstream side of the outlet of the auxiliary hole 22. The upper main plate 381 is arranged inside the duct 16 so that the downstream end 381a thereof does not protrude from the main hole 14.

The lower main plate 382 guides the airstream flowing along a lower wall surface 181b of the inner wall surface 181 forming the main flow passage 18 to the downstream side of the auxiliary hole 22 positioned near the lower wall surface 181b. The lower main plate 382 is arranged between the lower wall surface 181b forming the main flow passage 18 and the center line CLm of the main flow passage 18. The lower main plate 382 is arranged in a posture inclined with respect to the center line CLs of the auxiliary hole 22 so that a tangent line TLg2 at the downstream end 382a of the lower main plate 382 intersects with the center line CLs of the auxiliary hole 22 at a downstream side of the outlet of the auxiliary hole 22. The lower main plate 382 is arranged inside the duct 16 so that the downstream end 382a thereof does not protrude from the main hole 14.

Each of the main plates 381 and 382 extends along the long side of the inner wall surface 141 of the main hole 14 at a substantially central portion of the short side of the inner wall surface 141 of the main hole 14. Although not shown, each of the main plates 381 and 382 has two ends in a longitudinal direction connected to the inside of the duct 16.

In the air discharge unit 10 of the present embodiment configured as described above, when the conditioned air temperature-adjusted by the air conditioning unit flows into the duct 16, the conditioned air passes through the main flow passage 18 and flows into the main hole 14. Then, the airstream flowing into the main flow passage 18 is blown out of the main hole 14. At this time, the airstream flowing along the inner wall surface 181 forming the main flow passage 18 is vertically diffused and blown by the mainstream guide 38. Thus, a velocity boundary layer BL of the working air flow is formed downstream of the outlet of the main hole 14 to be separated from the center line CLm of the main hole 14.

That is, in the air discharge unit 10 of the present embodiment, similarly to the fourth embodiment, the mainstream AFs of the support air flow blown out of the auxiliary hole 22 flows in a state of approaching the central portion BLc of the thickness δ of the velocity boundary layer BL. In such a case, because the mainstream of the support air flow is closer to the vortex center of the lateral vortex Vt generated in the velocity boundary layer BL, the lateral vortex Vt can be easily disturbed by the support air flow, and a suppression relative to the development of the lateral vortex Vt generated in the velocity boundary layer BL can be effectively obtained. In the present embodiment, the mainstream guide 38 functions as a vortex suppression structure.

In the air discharge device 1 of this embodiment described above, the main flow guide 38 is provided in the main flow passage 18. According to this, the flow velocity distribution near the inner wall surface 141 of the main hole 14 spreads to the support air flow discharged from the auxiliary hole 22 at a downstream side of the outlet of the main hole 14, and thus the central portion BLc of the thickness δ of the velocity boundary layer BL can be made closer to the support air flow discharged from the auxiliary hole 22 at a downstream side of the outlet of the main hole 14. As a result, the development of the lateral vortex Vt in the velocity boundary layer BL can be sufficiently suppressed by the support air flow blown out from the auxiliary hole 22.

Tenth Embodiment

Next, a tenth embodiment will be described with reference to FIG. 30. The present embodiment differs from the first embodiment in that an auxiliary guide 40 is provided for the auxiliary flow passage 24. In the present embodiment, a difference part different from the first embodiment will be mainly described, and description for a part similar to the first embodiment will be omitted.

Figure 30:
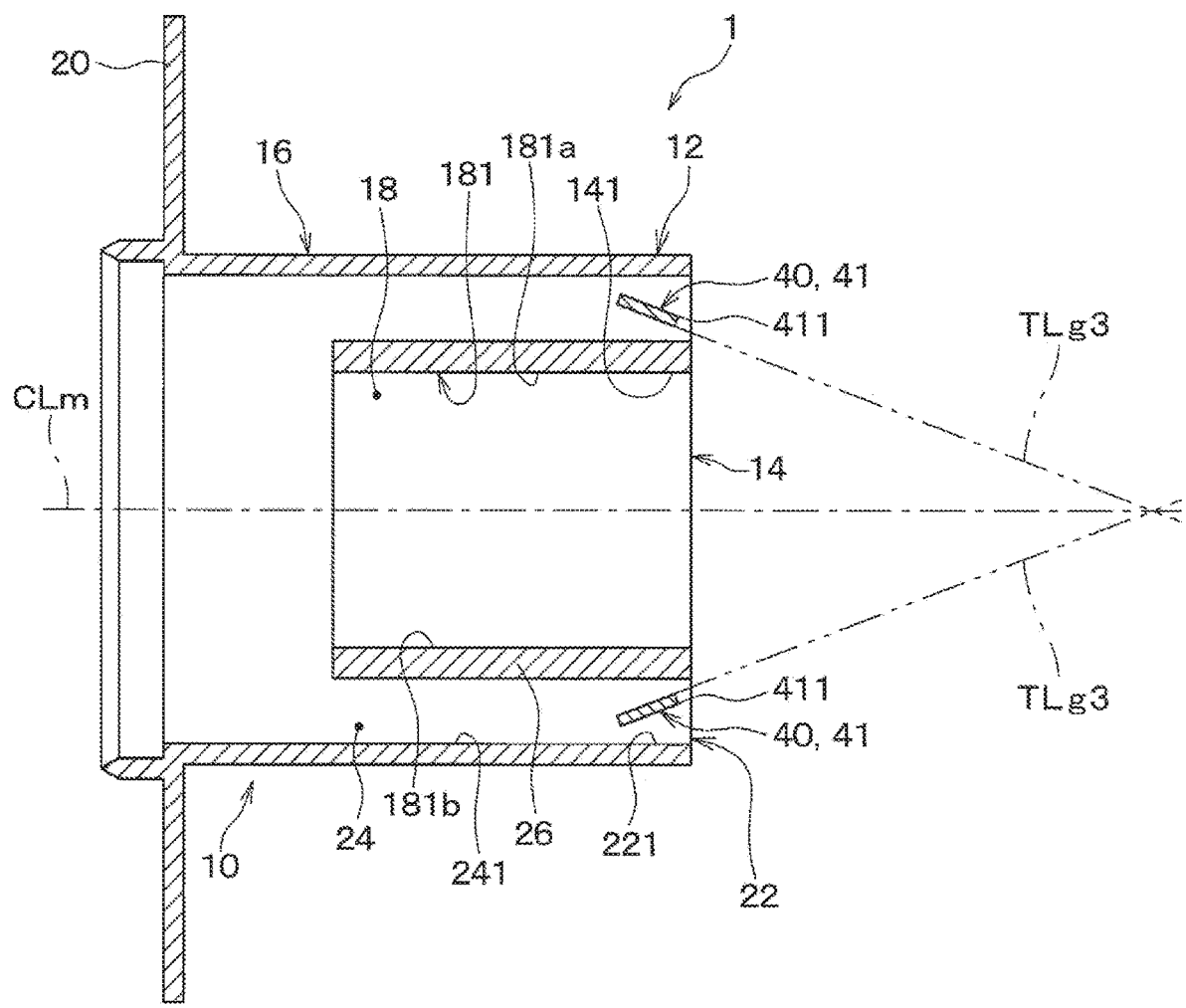
FIG. 30 is a schematic sectional view of an air discharge device according to a tenth embodiment.

Further, in the air discharge unit 10 of the present embodiment, similarly to the ninth embodiment, the cross-sectional area Sc of the main flow passage 18 is substantially equal to the open area Sm of the main hole 14, as shown in FIG. 30. That is, the air discharge unit 10 of the present embodiment is not provided with a configuration corresponding to the enlarged portion 180 of the first embodiment.

Further, the air discharge unit 10 has an auxiliary guide 40 that guides the airstream flowing along the inner wall surface 241 forming the auxiliary flow passage 24 to the downstream side of the outlet of the main hole 14. The auxiliary guide 40 is made of a plurality of auxiliary plates 41 arranged in the auxiliary flow passage 24.

The plurality of auxiliary plates 41 are arranged in a posture inclined with respect to the center line CLm of the main hole 14 so that a tangent line TLg3 at the downstream end 411 of the auxiliary plate 41 intersects with the center line CLm of the main hole 14 downstream of the outlet of the main hole 14. The plurality of auxiliary plates 41 are arranged inside the duct 16 so that downstream ends 411 thereof do not protrude from the main hole 14.

In the air discharge unit 10 of the present embodiment configured as described above, when the conditioned air temperature-adjusted by the air conditioning unit flows into the duct 16, the conditioned air passes through the main flow passage 18 and flows into the main hole 14. Then, the airstream flowing into the main flow passage 18 is blown out of the main hole 14.

On the other hand, the mainstream of the support air flow blown out of the auxiliary hole 22 flows in a state of being inclined with respect to the center line CLm of the main hole 14 by the auxiliary guide 40. That is, at a downstream side of the outlet of the main hole 14, the mainstream of the support air flow blown out of the auxiliary hole 22 approaches the central portion BLc of the velocity boundary layer BL of the working airflow.

That is, in the air discharge unit 10 of the present embodiment, similarly to the fifth embodiment, the mainstream AFs of the support air flow blown out of the auxiliary hole 22 flows in a state of approaching the central portion BLc of the thickness δ of the velocity boundary layer BL. In such a case, because the mainstream of the support air flow is closer to the vortex center of the lateral vortex Vt generated in the velocity boundary layer BL, the lateral vortex Vt can be easily disturbed by the support air flow, and a suppression relative to the development of the lateral vortex Vt generated in the velocity boundary layer BL can be effectively obtained. In the present embodiment, the auxiliary guide 40 functions as a vortex suppression structure.

In the air blowing device 1 of the present embodiment described above, the auxiliary guide 40 is provided in the auxiliary flow passage 24. Thus, similarly to the fifth embodiment, the main stream of the support air flow blown out of the auxiliary hole 22 can be made closer to the central portion BLc of the thickness δ of the velocity boundary layer BL formed at the downstream side of the outlet of the main hole 14.

Eleventh Embodiment

An eighth embodiment will be described with reference to FIGS. 31 and 32. In the present embodiment, the open shape of the main hole 14 suitable for increasing a reaching distance of the working air flow discharged from the main hole 14 will be described.

Figure 31:
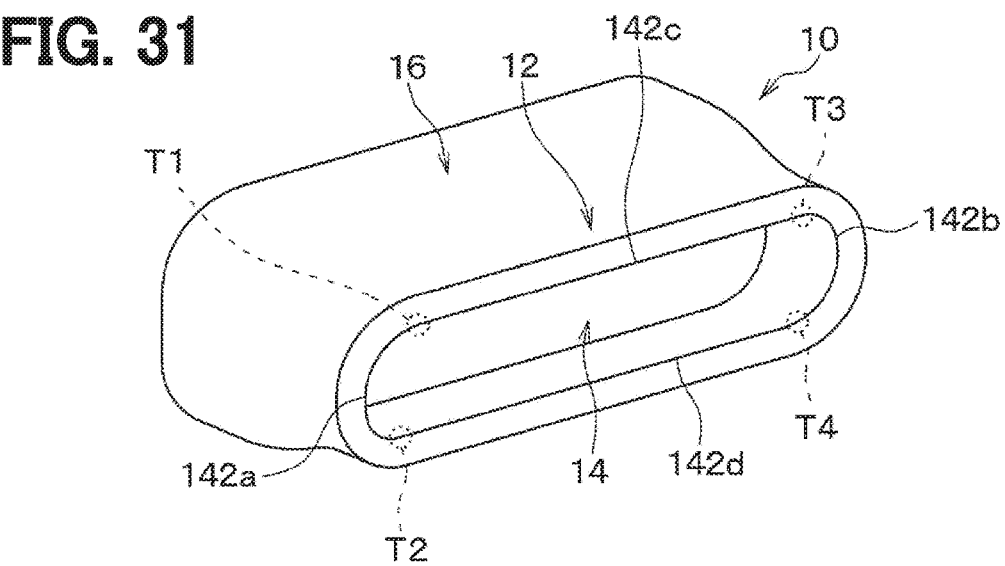
FIG. 31 is a schematic perspective view of an air discharge device according to an eleventh embodiment.
Figure 32:
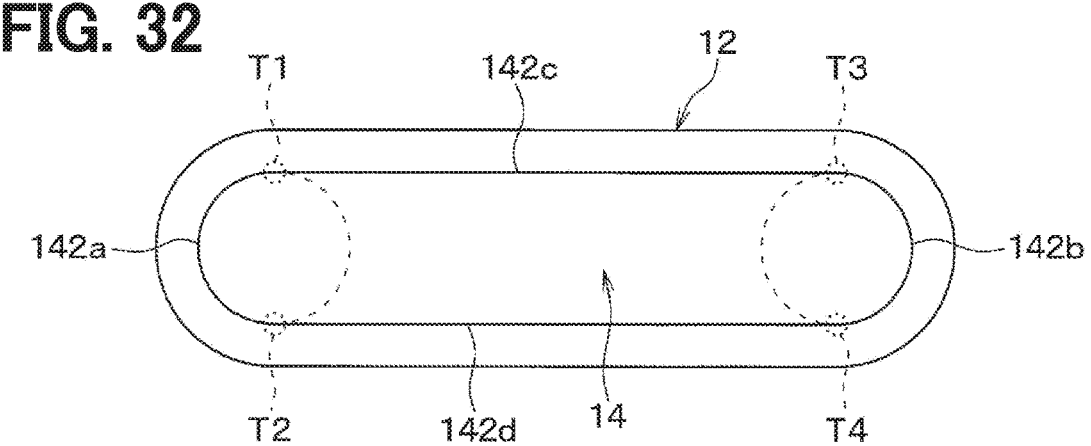
FIG. 32 is a diagram for explaining an open shape of a main hole of the air discharge device according to the eleventh embodiment.

As shown in FIG. 31, in the hole forming member 12 of the present embodiment, the main hole 14 is opened as a single hole similarly to the first embodiment; however, the plurality of auxiliary holes 22 are not formed, which is different from the first embodiment.

The main hole 14 has a plurality of edges 142a, 142b, 142c, 142d forming the open edge thereof. The plurality of edges 142a, 142b, 142c, 142d are defined by dividing the open edge of the main hole 14 at change points of the curvature.

According to the studies by the present inventors, when the open edge of the main hole 14 has a corner portion, the lateral vortex Vt tends to develop into a large-scale one at the corner portion, so that the working air flow blown out of the main stream is likely to occur, and the reaching distance is shortened. If the amount of change in the curvature at the open edge of the main hole 14 is large, the numerous vortex rings formed when the air flow is blown out from the main hole 14 easily interfere with each other, and the reaching distance of the working air flow blown out of the main flow tents to become shorter.

In consideration of these, in the main hole 14 of the present embodiment, the edges 142a to 142d having different curvatures are adjacent to each other, and the connecting portions of the adjacent edges 142a to 142d are circularly connected so as to have a roundness.

Specifically, the main hole 14 of the present embodiment is configured to include arc-shaped edges 142a and 142b having the same radius and arc length and straight edges 142c and 142d having a curvature of zero, which are alternately connected to form an ellipse open edge. The main hole 14 of the present embodiment is made of two types of edges 142a to 142d having different curvatures. Further, the main hole 14 of the present embodiment is made of four edges 142a to 142d, and the four edges 142a to 142d are connected at four connection positions T1 to T4.

In the air discharge unit 10 in which the main hole 14 is formed, the connection portion of the respective edges 142a to 142d, which is the change point of the curvature at the open edge of the main hole 14, has a roundness. Therefore, the main hole 14 is an open shape with no corners. As a result, the development of the lateral vortex Vt in the vicinity of the downstream side of the main hole 14 can be sufficiently suppressed, and the reaching distance of the working air flow blown out of the main hole 14 can be lengthened.

The main hole 14 of the present embodiment is made of two types of edges 142a to 142d having different curvatures. According to this, because the amount of change in the curvature at the open edge of the main hole 14 is small, the interference between the innumerable vortex rings formed when the air flow is blown out of the main hole 14 can be suppressed, and the reaching distance of the working air flow can be improved.

Further, the main hole 14 of the present embodiment is made of the four edges 142a to 142d, and the four edges 142a to 142d are connected at the four connection positions T1 to T4. According to this, because the amount of change in the curvature at the open edge of the main hole 14 is small, the interference between the innumerable vortex rings formed when the air flow is blown out of the main hole 14 can be suppressed, and the reaching distance of the working air flow can be improved.

Here, when the radius of the arc-shaped edges 142a and 142b is less than a predetermined value (specifically, 0.1 mm), the lateral vortex Vt may easily develop into a large-scale one, similarly to the corners. For this reason, when the plurality of edges 142a to 142d include arc-shaped edges 142a and 142b, the radius of the arc is preferably set to 0.1 mm or more.

(Modification of the Eleventh Embodiment)

The eleventh embodiment described above exemplifies a case where the open edge of the main hole 14 is an ellipse, but the present disclosure is not limited to this. When the main hole 14 is made of four edges 142a to 142d, each of the edges 142a to 142d may have an arc shape.

Figure 33:
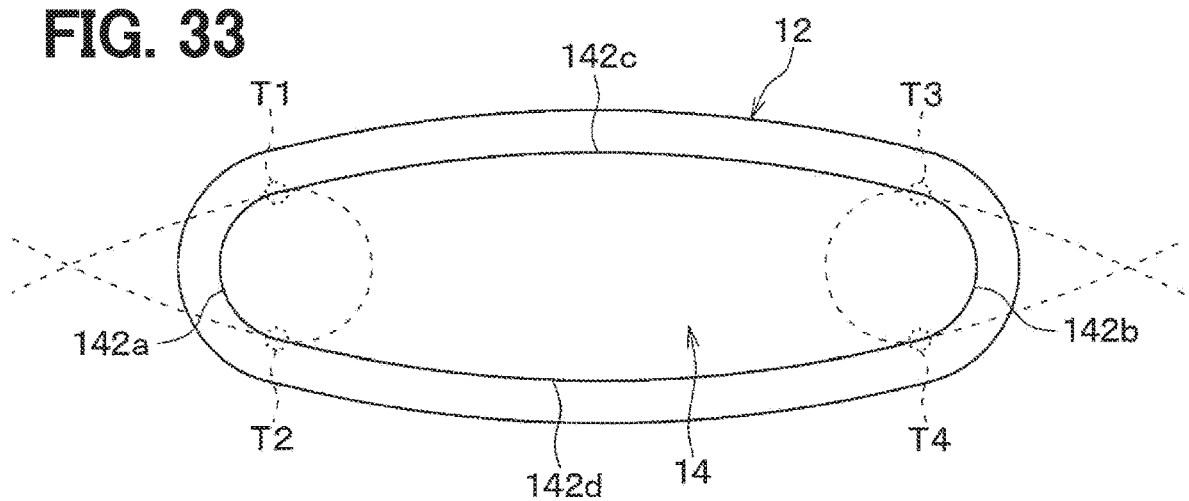
FIG. 33 is a diagram for explaining a main hole of a first modification of the air discharge device according to the eleventh embodiment.
Figure 34:
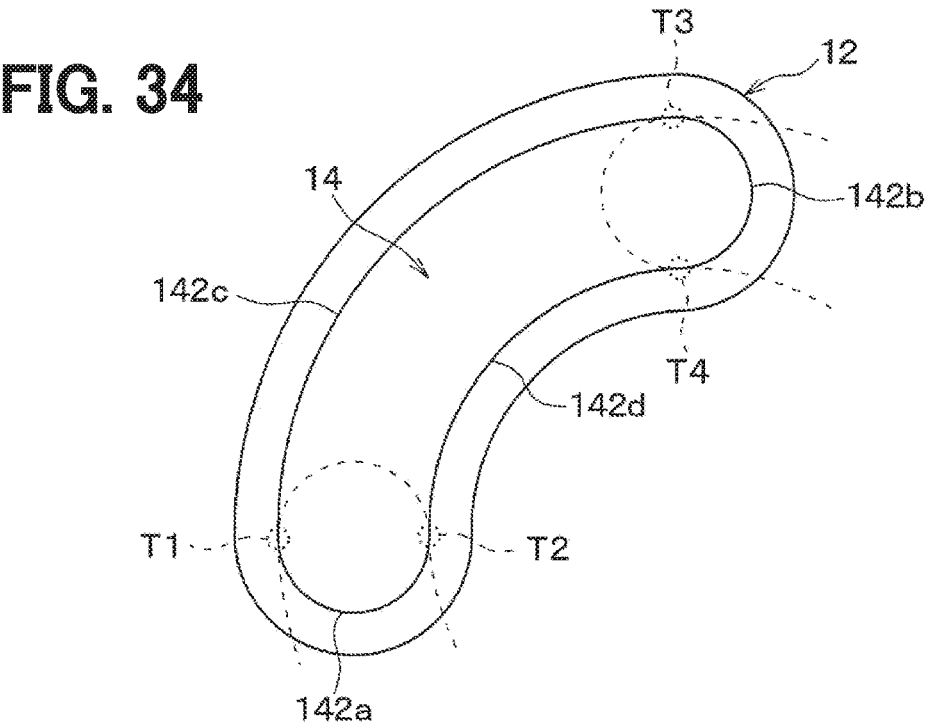
FIG. 34 is a diagram for explaining a main hole of a second modification of the air discharge device according to the eleventh embodiment.
Figure 35:
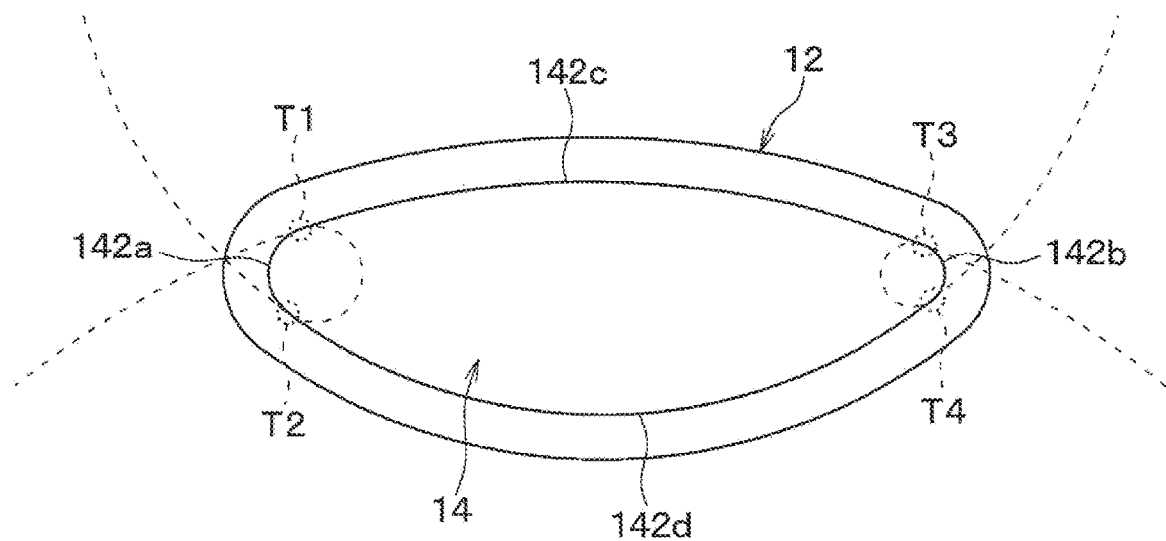
FIG. 35 is a diagram for explaining a main hole of a third modification of the air discharge device according to the eleventh embodiment.
Figure 36:
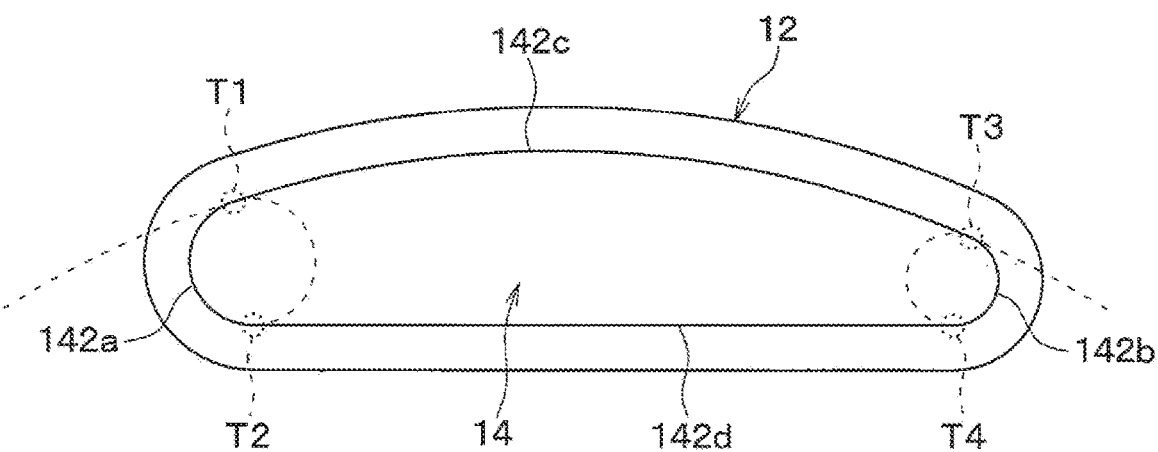
FIG. 36 is a diagram for explaining a main hole of a fourth modification of the air discharge device according to the eleventh embodiment.

For example, the main hole 14 may have an open shape in which two types of arc-shaped edges 142a to 142d having different curvatures are annularly connected, as shown in a first modification of FIG. 33. As shown in a second modification of FIG. 34, the main hole 14 may have an open shape in which three types of arc-shaped edges 142a to 142d having different curvatures are connected in a circular shape. As shown in a third modification of FIG. 35, the main hole 14 may have an open shape in which four types of arc-shaped edges 142a to 142d having different curvatures are connected in a circular shape. When the main hole 14 is made of four edges 142a to 142d as shown in a fourth modification of FIG. 36, one of the edges 142a to 142d may be a linear.

Figure 37:
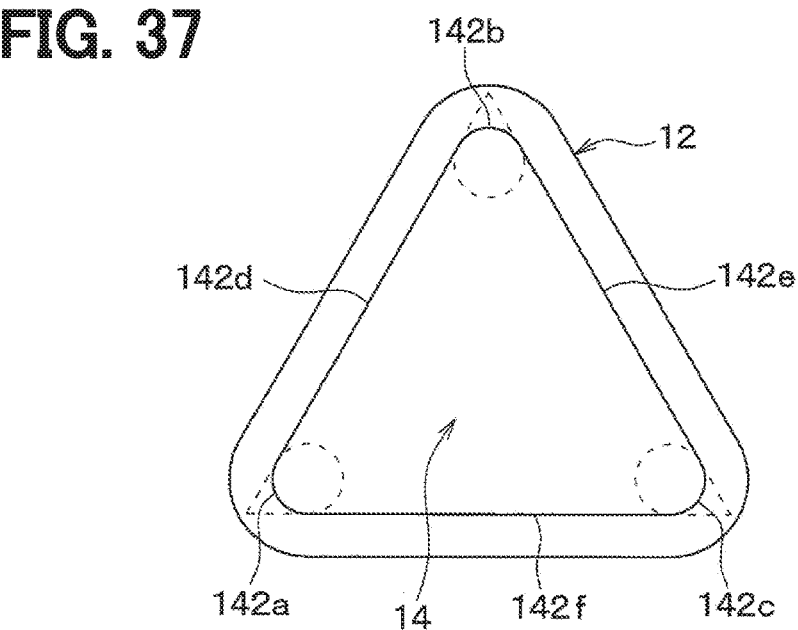
FIG. 37 is a diagram for explaining a main hole of a fifth modification of the air discharge device according to the eleventh embodiment.
Figure 38:
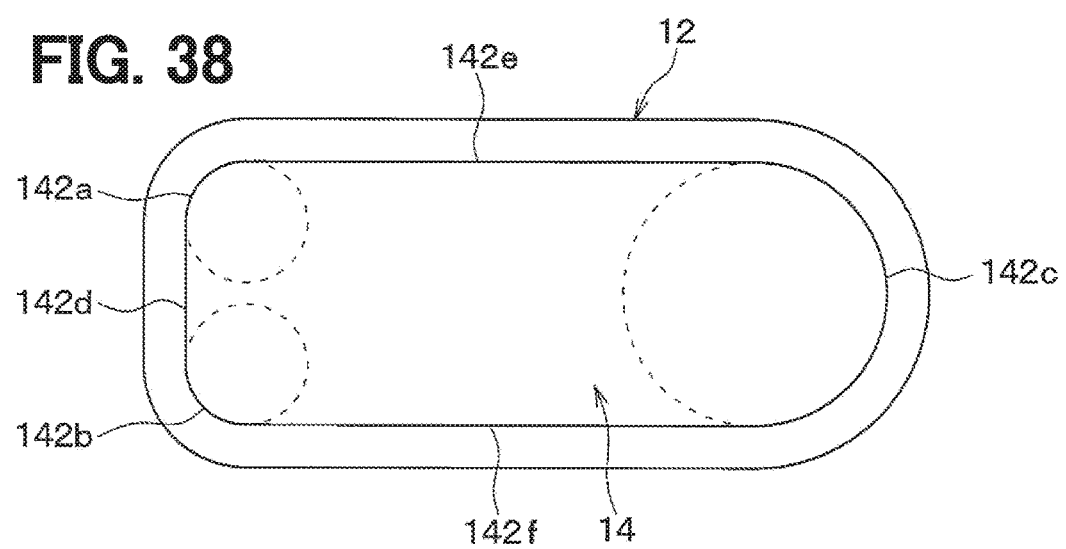
FIG. 38 is a diagram for explaining a main hole of a sixth modification of the air discharge device according to the eleventh embodiment.

Further, the main hole 14 may be made of six edges 142a to 142f, instead of the four edges 142a to 142d. Specifically, as shown in the fifth modification of FIG. 37, the main hole 14 may be configured by three arc-shaped edges 142a to 142c having the same radius and arc length and three straight edges 142d to 142f, which are connected in a circular shape to form an open shape. Alternatively, as shown in the sixth modification of FIG. 38, the main hole 14 may be configured by three arc-shaped edges 142a to 142c having different radius in some edges, and three straight edges 142d to 142f, which are connected in a circular shape to form an open shape.

Figure 39:
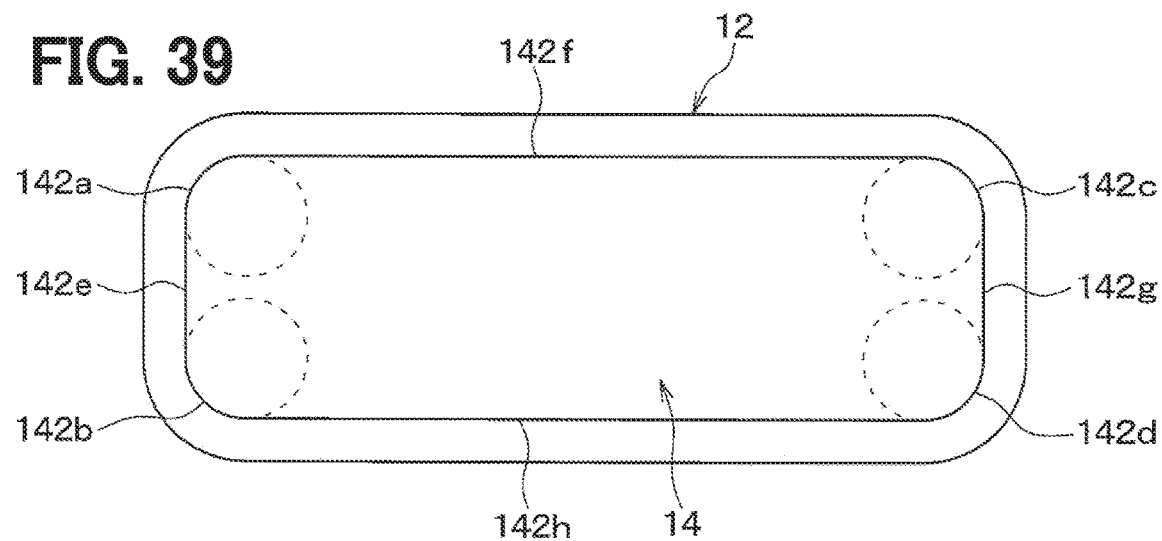
FIG. 39 is a diagram for explaining a main hole of a seventh modification of the air discharge device according to the eleventh embodiment.
Figure 40:
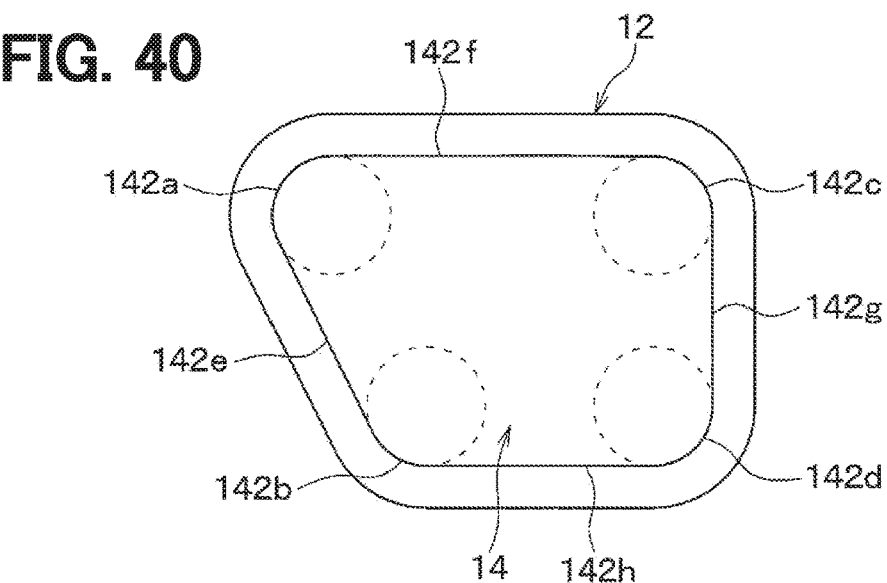
FIG. 40 is a diagram for explaining a main hole of an eighth modification of the air discharge device according to the eleventh embodiment.
Figure 41:
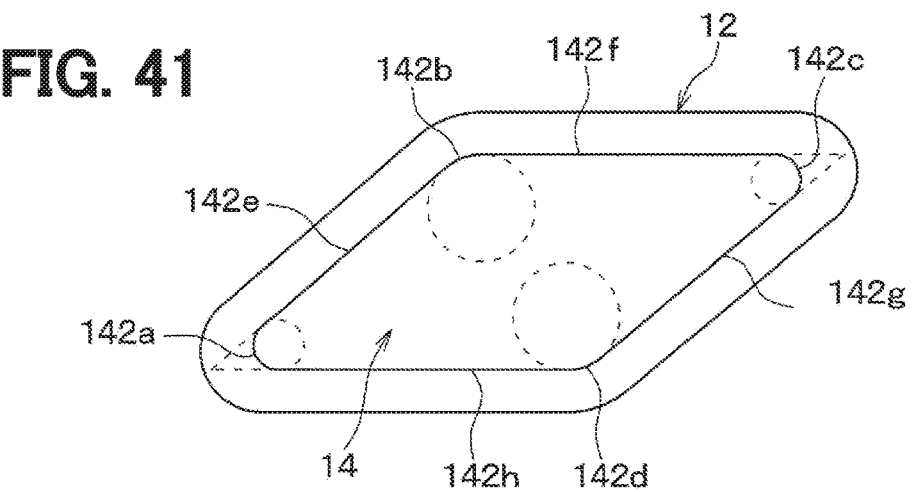
FIG. 41 is a diagram for explaining a main hole of a ninth modification of the air discharge device according to the eleventh embodiment.
Figure 42:
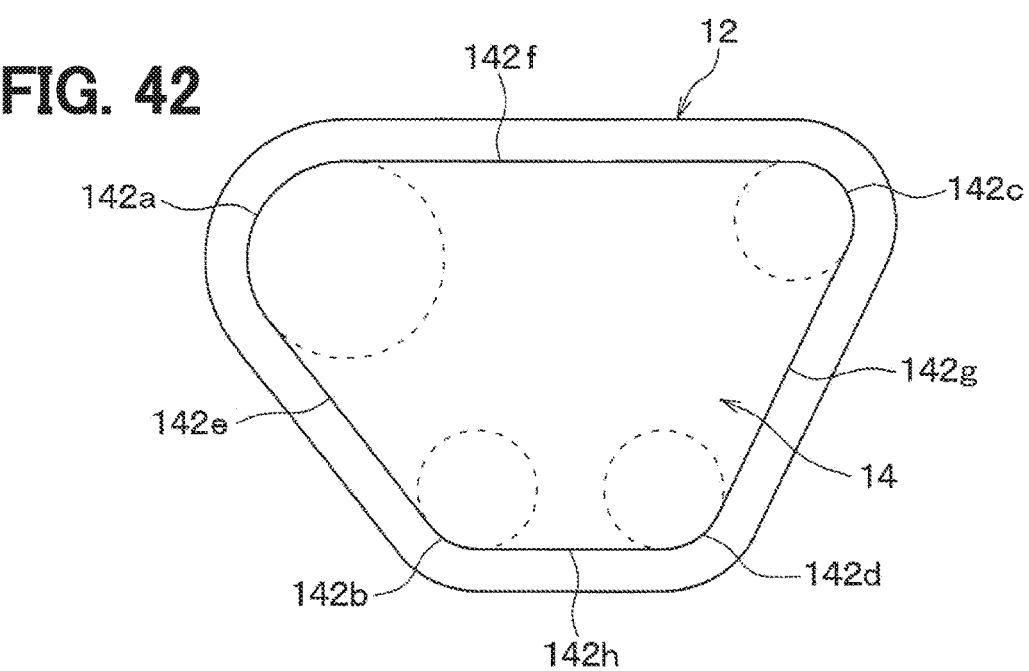
FIG. 42 is a diagram for explaining a main hole of a tenth modification of the air discharge device according to the eleventh embodiment.
Figure 43:
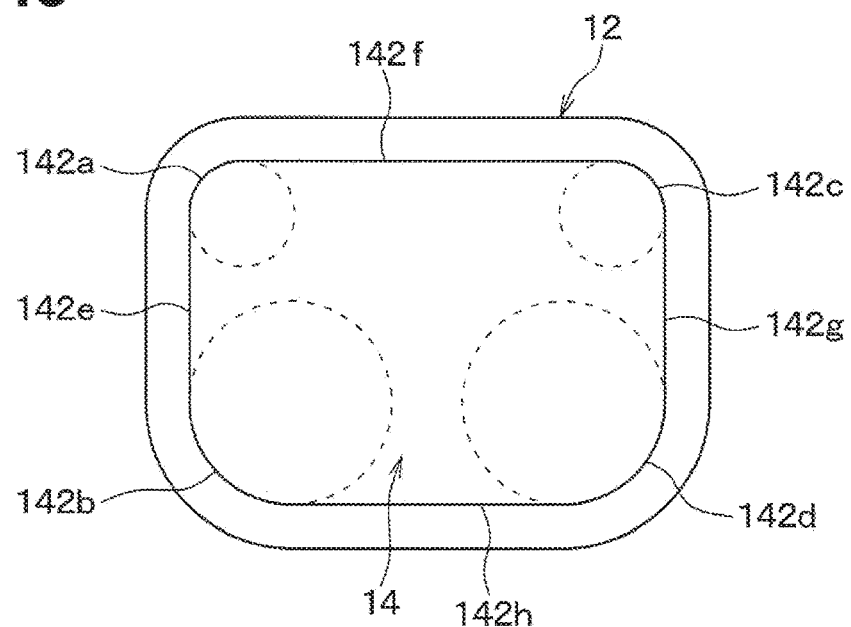
FIG. 43 is a diagram for explaining a main hole of an eleventh modification of the air discharge device according to the eleventh embodiment.
Figure 44:
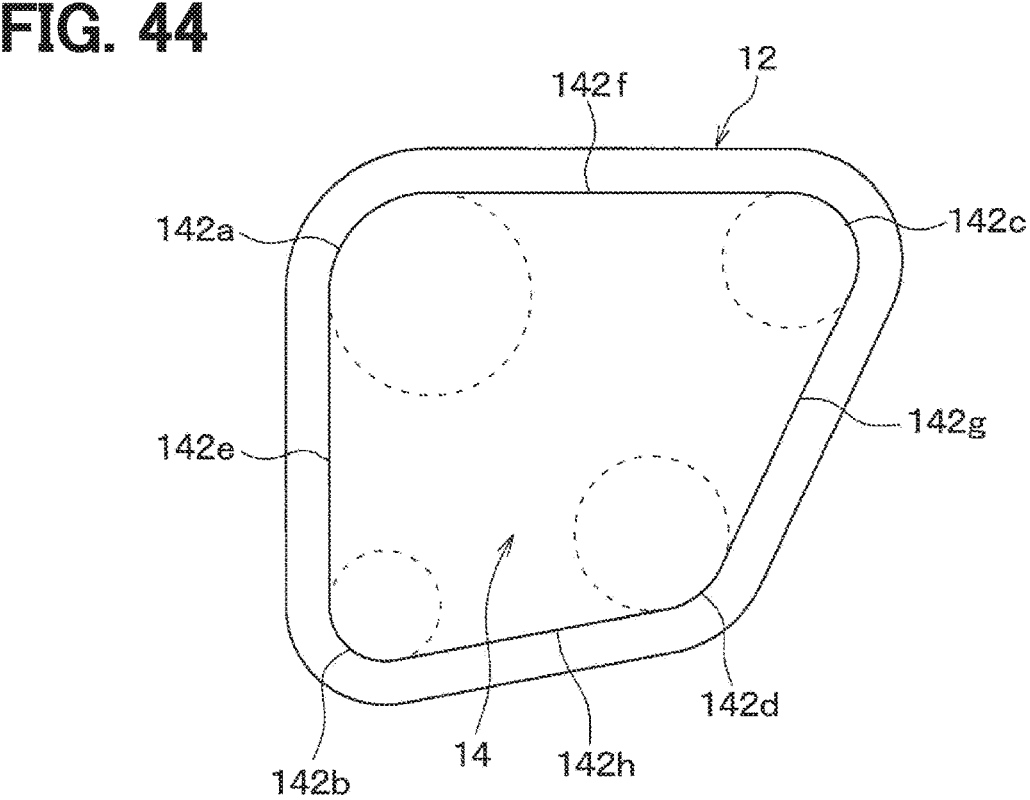
FIG. 44 is a diagram for explaining a main hole of a twelfth modification of the air discharge device according to the eleventh embodiment.

Further, the main hole 14 may be made of eight edges 142a to 142h. Specifically, as shown in the seventh modification of FIG. 39, the main hole 14 has four arc-shaped edges 142a to 142d having the same radius and arc length, and four straight edges 142e to 142h having opposite edges with the same length, which are connected in a circular shape to form an open shape. Alternatively, as shown in the eighth modification of FIG. 40, the main hole 14 has four arc-shaped edges 142a to 142d having the same radius and arc length, and four straight edges 142e to 142h having opposite edges with the different lengths, which are connected in a circular shape to form an open shape. Alternatively, as shown in the ninth modification of FIG. 41, the main hole 14 may be configured by four arc-shaped edges 142a to 142d having different radius in some edges, and four straight edges 142e to 142h having the same length, which are connected in a circular shape to form an open shape. Alternatively, as shown in the tenth modification of FIG. 42, the main hole 14 may be configured by four arc-shaped edges 142a to 142d having different radius in some edges, and four straight edges 142e to 142h having the different length, which are connected in a circular shape to form an open shape. Alternatively, as shown in the eleventh modification of FIG. 43, the main hole 14 may be configured by four arc-shaped edges 142a to 142d having different radius in some edges, and four straight edges 142e to 142h having the same length in opposite edges, which are connected in a circular shape to form an open shape. Alternatively, as shown in the twelfth modification of FIG. 44, the main hole 14 may be configured by four arc-shaped edges 142a to 142d having respective radiuses different from each other, and four straight edges 142e to 142h having respective lengths different from each other, which are connected in a circular shape to form an open shape.

Twelfth Embodiment

Figure 45:
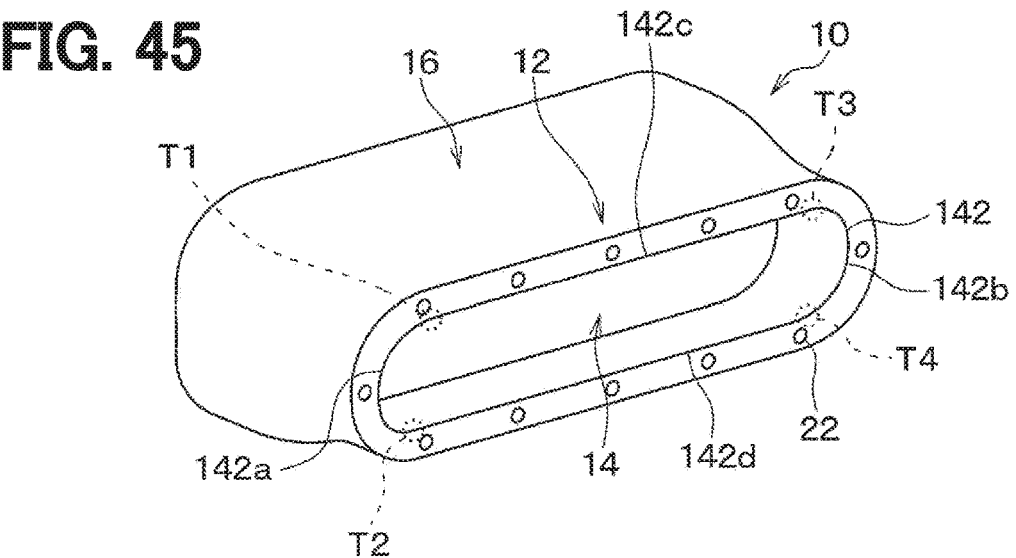
FIG. 45 is a schematic perspective view of an air discharge device according to a twelfth embodiment.
Figure 46:
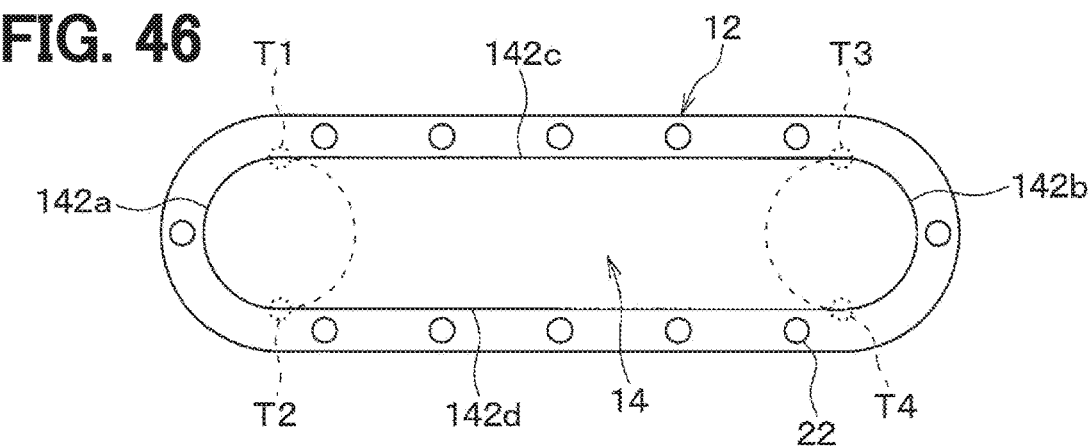
FIG. 46 is a diagram for explaining a shape around a main hole of the air discharge device according to the twelfth embodiment.

Next, a twelfth embodiment will be described with reference to FIGS. 45 and 46. As shown in FIGS. 45 and 46, in the air discharge unit 10 of the present embodiment, a plurality of auxiliary holes 22 are formed around the main hole 14 of the air discharge unit 10 of the eleventh embodiment.

Specifically, a plurality of auxiliary holes 22 are formed around the main hole 14 having an elliptical open edge, to surround the main hole 14. The other configurations are the same as those of the eleventh embodiment. According to the air discharge unit 10 of the present embodiment, it is possible to suppress an air suction action of the working air flow by a support air flow blown out of the auxiliary holes 22.

(Modification of the Twelfth Embodiment)

Figure 47:
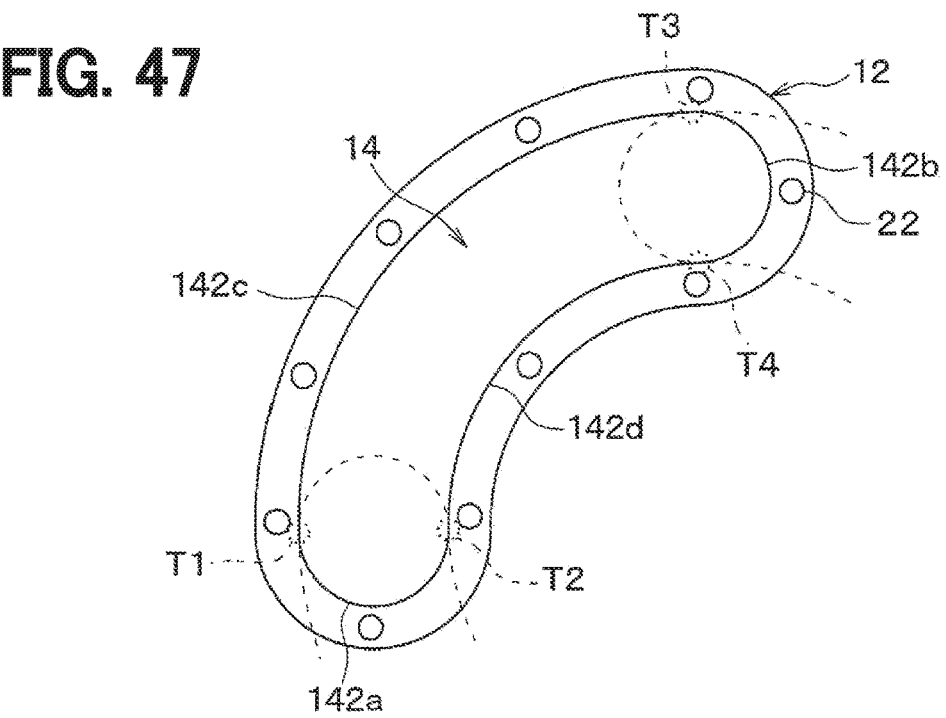
FIG. 47 is a diagram for explaining a main hole of a modification of the air discharge device according to the twelfth embodiment.

In the twelfth embodiment described above, the auxiliary hole 22 is formed around the main hole 14 with an elliptical edge, but the present disclosure is not limited to this. For example, as shown in FIG. 47, the air discharge unit 10 may have a configuration in which auxiliary holes 22 are formed around the main hole 14 in a shape different from an elliptical shape.

Other Embodiments

The representative embodiments of the present disclosure have been described above. However, the present disclosure is not limited to the above-described embodiments, and may be variously modified as follows.

In the above embodiment, an example in which a single main hole 14 is formed in the hole forming member 12 has been described, but the present disclosure is not limited to this. The air discharge device 1 may have a structure in which a plurality of main holes 14 are formed in the hole forming member 12. In this case, for example, a plurality of auxiliary holes 22 may be arranged to surround the plurality of main holes 14 as a single group, or may be arranged to surround each of the main holes 14.

In the above-described embodiment, an example in which the auxiliary holes 22 made of round holes has been described, but the present disclosure is not limited to this. The auxiliary holes 22 may be configured by, for example, curved slit holes that surround the periphery of the main hole 14. In this case, the auxiliary hole 22 is not limited to a plurality of slit holes, but may be a single slit hole.

In the above-described embodiment, the main flow passage 18 and the auxiliary flow passage 24 are formed inside the single duct 16, but the present disclosure is not limited to this. In the air discharge device 1, for example, a portion of the duct 16 forming the main flow passage 18 and a portion of the duct 16 forming the auxiliary flow passage 24 may be separately configured.

In the above-described embodiment, the air discharge unit 10 having the flange 20 is illustrated, but the air discharge unit 10 is not limited to this. The air discharge unit 10 may be configured, for example, to a structure having the hole forming member 12 and the duct 16 but without having the flange 20.

In the above-described embodiment, an example in which the air discharge device 1 of the present disclosure is applied to the air outlet of the air conditioning unit that air-conditions the passenger compartment is described, but the present disclosure is not limited to this. The air blowing device 1 of the present disclosure is not limited to a moving body such as a vehicle, but can be widely applied to an air outlet of an installed air conditioning unit for a home use. In addition, the air discharge device 1 of the present disclosure is not limited to be applied to an air conditioning unit that air-conditions a room, but may be applied to, for example, an air outlet of a humidifying device that humidifies a room or an air outlet of a temperature adjusting device for adjusting an air temperature that adjusts the temperature of a heat generator or the like.

In the embodiments described above, it is needless to say that the elements configuring the embodiments are not necessarily essential except in the case where those elements are clearly indicated to be essential in particular, the case where those elements are considered to be obviously essential in principle, and the like.

In the embodiments described above, the present disclosure is not limited to the specific number of components of the embodiments, except when numerical values such as the number, numerical values, quantities, ranges, and the like are referred to, particularly when it is expressly indispensable, and when it is obviously limited to the specific number in principle, and the like.

In the embodiments described above, when referring to the shape, positional relationship, and the like of a component and the like, the present disclosure is not limited to the shape, positional relationship, and the like, except for the case of being specifically specified, the case of being fundamentally limited to a specific shape, positional relationship, and the like.

(Overview)

According to a first aspect shown in some or all of the above-described embodiments, an air discharge device includes an air discharge unit including at least a main hole and at least an auxiliary hole formed around the main hole. The air discharge unit is provided with a vortex suppression structure configured to suppress development of lateral vortices generated in a velocity boundary layer of a working air flow at a downstream side of an outlet of the main hole. This vortex suppression structure is configured to make a central portion of the thickness of the velocity boundary layer of the working air flow at the downstream side of the outlet of the main hole to be closer to a mainstream air flow, at the downstream side of the outlet of the main hole.

According to a second aspect, the vortex suppression structure of the air discharge device includes a layer reduction structure configured to reduce the thickness of the velocity boundary layer formed along the inner wall surface of the main hole. As described above, according to the vortex suppression structure in which the thickness of the velocity boundary layer formed along the inner wall surface of the main hole is reduced, it is possible for the central portion of the thickness of the velocity boundary layer formed at the downstream side of the main hole to be closer to the mainstream of air flow discharged from the auxiliary hole.

According to a third aspect, the air discharge unit of the air discharge device includes a main flow passage through which the air flow to be discharged from the main hole passes. Then, the main flow passage is provided with an enlarged portion having a cross-sectional area larger than an opening area of the main hole, as a layer reduction structure. In this way, if a structure with the enlarged portion is provided for the main flow passage, a flow velocity difference between the vicinity of the center line of the main hole and the vicinity of the inner wall surface is reduced due to the contraction flow in the main flow passage, and the thickness of the velocity boundary layer can be reduced. It is possible to realize a structure in which the central portion of the thickness of the velocity boundary layer of the working air flow formed downstream of the outlet of the main hole is made close to the mainstream of the support air flow.

According to a fourth aspect, in the air discharge device, the main flow passage is provided with a contraction fin configured to contract the air flow flowing through the main flow passage as a layer reduction structure. If the layer reduction structure includes not only the enlarged portion but also the contraction fin, it is possible to reduce the thickness of the velocity boundary layer due to the contraction flow while suppressing an increase in the size of the device due to the expansion of the main flow passage. Such a configuration is suitable when an installation space is greatly limited, for example in a moving body.

According to a fifth aspect, the air discharge unit of the air discharge device includes a main flow passage through which the air flow to be discharged from the main hole passes. Further, the main flow passage is provided with a contraction fin configured to contract the air flow flowing through the main flow passage as a layer reduction structure. In this way, if a structure with the contraction fin is provided for the main flow passage, a flow velocity difference between the vicinity of the center line of the main hole and the vicinity of the inner wall surface is reduced due to the contraction flow in the main flow passage, and the thickness of the velocity boundary layer can be reduced. It is possible to realize a structure in which the central portion of the thickness of the velocity boundary layer of the working air flow formed downstream of the outlet of the main hole is made close to the mainstream of the support air flow.

According to a sixth aspect, the air discharge unit of the air discharge device includes a main flow passage through which the air flow to be discharged from the main hole passes. At least a part of the main flow passage is provided with an uneven portion as a layer reduction structure in which concave portions and convex portions are alternately arranged along an air flow direction in the main flow passage. In this way, when the uneven portion is provided on a part of the inner wall surface of the main flow passage, the vortex generated inside the uneven portion plays a role of a ball bearing, so that the coefficient of friction on the inner wall surface of the main flow passage can be made smaller. Therefore, a difference in the flow velocity between the vicinity of the center line of the main hole and the vicinity of the inner wall surface can be reduced, and the thickness of the velocity boundary layer can be reduced. It is possible to realize a structure in which the central portion of the thickness of the velocity boundary layer of the working air flow formed downstream of the outlet of the main hole is made close to the mainstream of the support air flow.

According to a seventh aspect, the uneven portion of the air discharge device is formed by a plurality of grooves provided on the inner wall surface of the main flow passage. Because the uneven portion is configured by the plurality of grooves, the size of the main flow passage can be secured, and the pressure loss in the main flow passage can be reduced, as compared with a case where the uneven portion is configured by a plurality of protrusions. This greatly contributes to the improvement of the reaching distance of the working air flow.

According to an eighth aspect, the air discharge unit of the air discharge device includes a main flow passage through which the air flow to be discharged from the main hole passes, an auxiliary flow passage through which an air flow to be discharged from the auxiliary hole passes, and a partition portion configured to partition the main flow passage and the auxiliary flow passage from each other. The partition portion is provided with at least one communication hole, through which a part of the air flow passing through the main flow passage is guided to the auxiliary flow passage, as a vortex suppression structure.

According to this, air easily flows along the inner wall surface of the main flow passage by the airstream flowing from the main flow passage to the auxiliary flow passage through the communication hole. Therefore, a difference in the flow velocity between the vicinity of the center line of the main hole and the vicinity of the inner wall surface can be reduced, and the thickness of the velocity boundary layer can be reduced. It is possible to realize a structure in which the central portion of the thickness of the velocity boundary layer of the working air flow formed downstream of the outlet of the main hole is made close to the mainstream of the support air flow.

According to a ninth aspect, an air discharge unit of the air discharge device includes a main flow passage through which an air flow to be discharged from the main hole passes, an auxiliary flow passage through which an air flow to be discharged from the auxiliary hole passes, and a partition portion configured to partition the main flow passage and the auxiliary flow passage from each other. The partition portion is provided with a vertical vortex generation mechanism having an uneven shape at an upstream end located upstream of the partition portion in the air flow direction.

According to this, the airstream flowing around the partition portion easily flows along the surface of the partition portion (that is, the inner wall surface forming the main flow passage) by the vertical vortex generated by the vertical vortex generation mechanism. Therefore, a difference in the flow velocity between the vicinity of the center line of the main hole and the vicinity of the inner wall surface can be reduced, and the thickness of the velocity boundary layer can be reduced. It is possible to realize a structure in which the central portion of the thickness of the velocity boundary layer of the working air flow formed downstream of the outlet of the main hole is made close to the mainstream of the support air flow.

According to a tenth aspect, a main hole of the air discharge device may have a main inclined structure inclined with respect to a center line of an auxiliary hole such that a tangent line extending along the inner wall surface of the main hole at least at a part forming the inner wall surface intersects with the center line of the auxiliary hole at a downstream side of the auxiliary hole. The vortex suppression structure may include a main inclined structure. According to this, the flow velocity distribution near the inner wall surface of the main hole spreads to the support air flow discharged from the auxiliary hole at a downstream side of the outlet of the main hole, and thus the central portion of the thickness of the velocity boundary layer can be made closer to the support air flow discharged from the auxiliary hole at a downstream side of the outlet of the main hole. The "center line of the auxiliary hole" is a line that passes through the center of the auxiliary hole and extends along the main stream of the air flow blown out of the auxiliary hole.

According to an eleventh aspect, the air discharge unit of the air discharge device includes a main flow passage through which an air flow to be discharged from the main hole passes, and a main flow guide configured to guide the air flowing along the inner wall surface defining the main flow passage to a downstream side of the auxiliary hole. The vortex suppression structure includes a mainstream guide. According to this, the flow velocity distribution near the inner wall surface of the main hole spreads to the support air flow discharged from the auxiliary hole at a downstream side of the outlet of the main hole, and thus the central portion of the thickness of the velocity boundary layer can be made closer to the support air flow discharged from the auxiliary hole at a downstream side of the outlet of the main hole.

According to a twelfth aspect, the auxiliary hole of the air discharge device includes an auxiliary inclined structure inclined with respect to the center line of the main hole, such that a tangent line extending along the inner wall surface of the auxiliary hole at least at a position defining the inner wall surface intersects the center line of the main hole at a downstream side of the main hole. The vortex suppression structure may include an auxiliary inclined structure. According to this, the airstream blown out of the auxiliary hole can be made closer to the central portion of the thickness of the velocity boundary layer BL formed at the downstream side of the main hole. The "center line of the main hole" is a line that passes through the center of the main hole and extends along the main stream of the air flow blown out of the main hole.

According to a thirteenth aspect, the air discharge unit of the air discharge device includes an auxiliary flow passage through which an air flow to be discharged from the auxiliary hole passes, and an auxiliary flow guide configured to guide the air flowing along the inner wall surface defining the auxiliary flow passage to a downstream side of the main hole. The vortex suppression structure includes an auxiliary guide. According to this, the airstream of the support air flow blown out of the auxiliary hole can be made closer to the central portion of the thickness of the velocity boundary layer formed at the downstream side of the main hole.

According to a fourteenth aspect, the air discharge unit of the air discharge device includes an overlapped structure in which a part of the main hole and at least a part of the auxiliary hole overlap each other in a circumferential direction centered on the center line of the main hole. The vortex suppression structure may include the overlapped structure. According to this, the airstream of the support air flow blown out of the auxiliary hole can be made closer to the central portion of the thickness of the velocity boundary layer formed at the downstream side of the main hole.

According to a fifteenth aspect, the main hole of the air discharge device has a plurality of edges defining an open edge of the main hole. The plurality of edges adjacent to each other have a different curvature, and are circularly connected to have a roundness at a connection portion of the adjacent edges. Because the connection portion of the respective edges, which is the change point of the curvature at the open edge of the main hole, has a roundness, the main hole is an open shape with no corners. Thus, development of the lateral vortex in the vicinity of the downstream side of the outlet of the main hole can be sufficiently suppressed, and the reaching distance of the working air flow discharged from the main hole can be lengthened.

According to a sixteenth aspect, the air discharge device includes an air discharge unit configured to discharge an air flow. The air discharge unit includes at least one main hole configured to discharge an air stream as a working air flow. The main hole has a plurality of edges that define an open edge of the main hole. The plurality of edges adjacent to each other have a different curvature, and are connected to have a roundness at a connection portion of the adjacent edges.

According to a seventeenth aspect, the air discharge unit of the air discharge device has at least an auxiliary hole that is provided around the main hole to discharge a support air flow and to suppress an air suction due to the working air flow discharged from the main hole. Thus, it is possible to suppress the air suction action of the working air flow by the support air flow blown out of the auxiliary holes.

According to the eighteenth aspect, the open edge of the main hole of the air discharge device is configured by two types of the edges having different curvatures. Because the amount of change in the curvature at the open edge of the main hole is small, an interference between the innumerable vortex rings formed when the air flow is blown out of the main hole can be suppressed, and the reaching distance of the working air flow can be improved.

According to a nineteenth aspect, the main hole of the air discharge device is configured by four edges, and the four edges are connected at four locations. According to this, because the amount of change in the curvature at the open edge of the main hole is small, interference between the innumerable vortex rings formed when the air flow is blown out of the main hole can be suppressed, and the reaching distance of the working air flow can be improved.

What is claimed is:

1. An air discharge device comprising:
an air discharge unit configured to discharge air, wherein the air discharge unit includes
at least one main hole from which an air flow is blown out as a working air flow,
at least one auxiliary hole provided around the main hole to blow out a support air flow for suppressing an air suction action of the working air flow blown from the main hole, and
a vortex suppression structure configured to suppress a development of lateral vortices generated in a velocity boundary layer of the working air flow at a downstream side of an outlet of the main hole,
the vortex suppression structure is configured to make a central portion of the thickness of the velocity boundary layer of the working air flow formed at the downstream side of the outlet of the main hole to be closer to a mainstream of the support air flow at the downstream side of the outlet of the main hole,
the air discharge unit further includes an overlapped structure in which a part of the main hole and at least a part of the auxiliary hole overlap with each other in a circumferential direction centered on a center line of the main hole, and
the vortex suppression structure includes the overlapped structure.

2. The air discharge device according to claim 1, wherein the vortex suppression structure includes a layer reduction structure configured to reduce the thickness of the velocity boundary layer formed along an inner wall surface of the main hole.

3. The air discharge device according to claim 2, wherein the air discharge unit includes a main flow passage through which the working air flow to be blown from the main hole passes, and
the layer reduction structure includes an enlarged portion provided in the main flow passage, the enlarged portion having a cross-sectional area larger than an open area of the main hole.

* * * * *